United States Patent
Zerbe et al.

(10) Patent No.: US 7,308,058 B2
(45) Date of Patent: Dec. 11, 2007

(54) TRANSPARENT MULTI-MODE PAM INTERFACE

(75) Inventors: Jared L. Zerbe, Woodside, CA (US); Carl W. Werner, Los Gatos, CA (US); William F. Stonecypher, San Jose, CA (US); Fred F. Chen, San Francisco, CA (US)

(73) Assignee: Rambus Inc., Los Altos, CA (US)

( * ) Notice: Subject to any disclaimer, the term of this patent is extended or adjusted under 35 U.S.C. 154(b) by 755 days.

(21) Appl. No.: 10/805,413

(22) Filed: Mar. 19, 2004

(65) Prior Publication Data

US 2005/0089126 A1 Apr. 28, 2005

Related U.S. Application Data

(60) Provisional application No. 60/515,179, filed on Oct. 27, 2003.

(51) Int. Cl.
*H03K 9/02* (2006.01)
(52) U.S. Cl. .................. 375/353; 375/286; 375/259
(58) Field of Classification Search .............. 375/353, 375/286, 224, 219, 259
See application file for complete search history.

(56) References Cited

U.S. PATENT DOCUMENTS

| | | | |
|---|---|---|---|
| 7,072,415 B2 * | 7/2006 | Zerbe et al. | 375/286 |
| 7,124,221 B1 * | 10/2006 | Zerbe et al. | 710/106 |
| 2002/0075968 A1 | 6/2002 | Zerbe et al. | |

FOREIGN PATENT DOCUMENTS

| EP | 0 407 031 A2 | 1/1991 |
|---|---|---|
| WO | WO 01/58035 A1 | 8/2001 |

OTHER PUBLICATIONS

J. Zerbe, C. Werner, V. Stojanovic, F. Chen, J. Wei, G. Tsang, D. Kim, W. Stonecypher, A. Ho, T. Thrush, R. Kollipara, G-J. Yeh, M. Hororwitz, K. Donnelly Equalization and Clock Recovery for a 2.5—10Gb/s 2-PAM/4-PAM Backplane Transceiver Cell, IEEE International Solid-State Circuits Conference, Feb. 2003,.*
International Search Report re: International Application No. PCT/US2004/035990, International Filing Date Oct. 26, 2004.
Zerbe J. et al., "Equalization and Clock Recovery for a 2.5—10Gb/s 2-PAM/4-PAM Backplane Transceiver Cell," *IEEE International Solid-State Circuits Conference*, Feb. 2003, San Francisco.

* cited by examiner

*Primary Examiner*—Mohammed Ghayour
*Assistant Examiner*—Sonia J King
(74) *Attorney, Agent, or Firm*—Morgan, Lewis & Bockius LLP

(57) ABSTRACT

Provided are a method and apparatus for high-speed, multi-mode PAM symbol transmission. A multi-mode PAM output driver drives one or more symbols, the number of levels used in the PAM modulation of the one or more symbols depending on the state of a PAM mode signal. Additionally, the one or more symbols are driven at a symbol rate, the symbol rate selected in accordance with the PAM mode signal so that a data rate of the driven symbols is constant with respect to changes in the state of the PAM mode signal. Further provided are methods for determining the optimal number of PAM levels for symbol transmission and reception in a given physical environment.

55 Claims, 33 Drawing Sheets

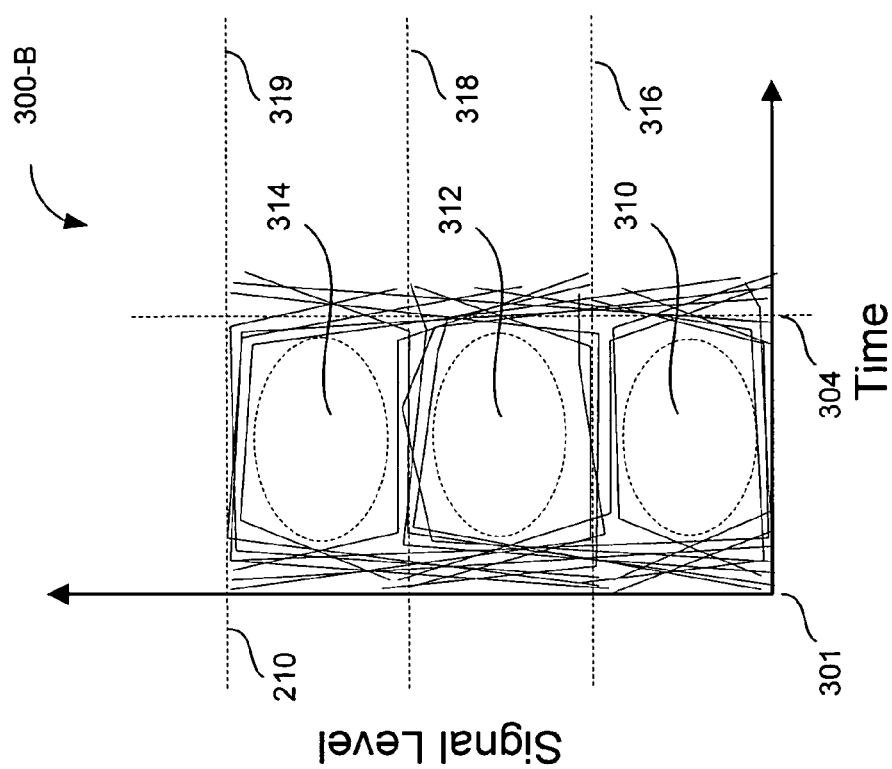
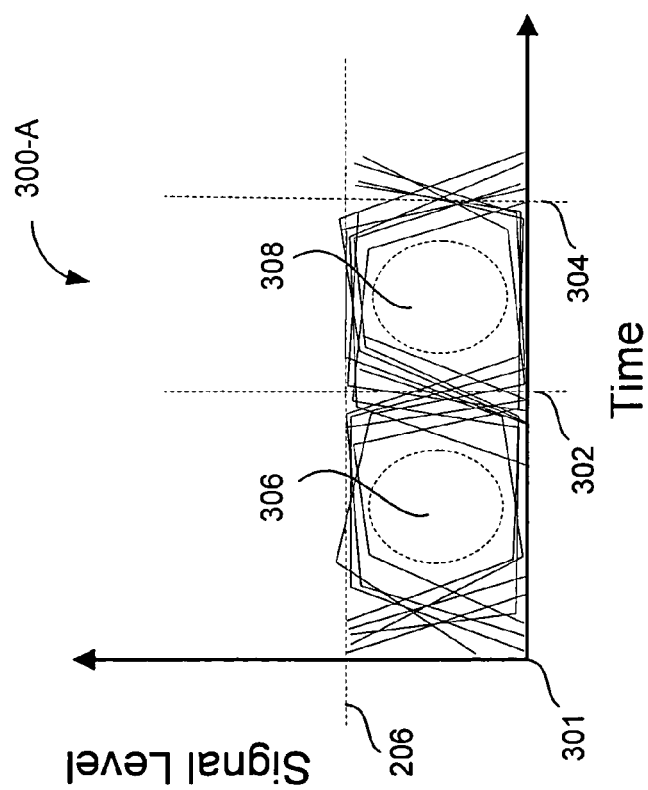
Fig. 3B
Fig. 3A

DivClk Generation 660

TRANSPARENT MULTI-MODE PAM INTERFACE

This application claims priority on U.S. provisional patent application 60/515,179, filed Oct. 27, 2003, which is hereby incorporated by reference.

FIELD OF THE INVENTION

The present invention relates to the field of systems for data transmission and reception, and in particular the present invention relates to a system and method of providing an interface to a high-speed, multi-PAM mode serial data link.

BACKGROUND OF THE INVENTION

The continually increasing demand for high-speed data transmission, together with the continually increasing speeds of central processors, requires the development of low-latency, high-speed data links. Use of low-speed and high-latency data links in modern systems often results in bottlenecks to performance originating in the data links.

Not only are high-speeds and low-latencies required for modern data transmission, performance in a wide variety of physical conditions is also critical. For example, starting in 2004, the serial link-based PCI Express interconnect will be deployed as a replacement to today's PCI bus in chip-to-module, and board-to-board and backplane connections. The PCI Express specification defines a raw data rate of 2.5 gigabits per second (Gbps). The PCI Express roadmap anticipates up to 32-lane wide interfaces and faster (5.0 Gbps) connections. The XAUI serial-link interface is primarily intended for module and board connections in 10 Gbps Ethernet systems. XAUI supports a 3.125 Gbps per pin raw data rate on four transmit and four receive lanes. Since it is defined to drive 20 inches over FR4-based boards with two connectors, XAUI links are starting to be used for backplane connections. The InfiniBand™ switch-fabric architecture is targeted to connected server clusters and server blades in data centers. It supports a 2.5 Gbps wire-speed connection with 1-, 2- or up to 12-wire link widths, over copper, fiber and cable connections. Thus, although a number of interconnection standards for serial links exist, they share in common demands for high-speed (more than 2 Gbps) data rates over wide varieties of transmission media.

Presently, backplanes using serial link technologies can reach speeds of approximately three Gbps. However, demand for port capacities of 40 Gbps and aggregate port capacities of 200 Gbps exist. Backplane environments are especially difficult to signal over. For example, backplane environments in high-speed WAN routers, enterprise and storage area network switches, blade servers and telecommunications equipment typically include, as part of the signaling path, vias, daughterboard-to-motherboard connectors, and meandering signal lines.

In the design of a data transmission system, a key design decision is the election of either a parallel or serial link structure. Generally, parallel data links enjoy low-latency. At the physical interface of the parallel bus, data is instantly available on each clock edge for load-store applications. Parallel data is available to the control functions inside the processor without going through serialization conversions or decoding. However, the low latency of parallel buses inflicts costs on a system design. The multiple data lines of the parallel bus must have traces matched in length and matched with the clock signal to minimize timing skew. This trace-matching wastes valuable real estate on a printed circuit board, may require extra board layers, and considerably complicates system-level design.

Serial links, in contrast, have historically enjoyed higher transmission rates at the expense of increased latency. Presently, serial links are able to support data rates of approximately three Gbps, across 20 inches of board and two connectors, and thus have become suitable for lowering the cost of board-to-board and chip-to-module connections. Recently, the traditional disadvantages of serial links, i.e. the additional die area and latency required for serializing-deserializing, encoding-decoding, and clock recovery of the symbol stream, have been mitigated by the development of compact, low-latency transceivers.

A key factor that impacts the costs of both parallel and serial data links is manufacturability. Traditionally, serial link transceivers have been regarded as difficult to implement, requiring mixed signal expertise, tuned integrated circuit (IC) processes and special care during the silicon design flow. For serial-link interfaces to be adopted in high-volume applications, they must be widely available in foundries using standard processes, and compatible with standard chip packages and board designs. Additionally, it is desirable that serial-link interfaces have a robust design, are easily manufactured in a high-yield process, and are interoperable with a wide variety of companion devices. Specifically, desirable features of a serial link include: ability to function in both low- and high-loss environments, adjustable voltage swing, tunable equalization coefficients, transparent functionality, and ability to choose the most appropriate signaling scheme on a channel-by-channel basis.

It is well-known that in high-speed signaling environments, traditional binary signaling, employing symbols that have one of two values, sometimes limits the achievable data transfer rate. Previous serial data links generally do not include the ability to select either a binary (non return to zero (NRZ) or 2-PAM) or a 4-level (4-PAM) pulse amplitude modulation signaling scheme to achieve the optimum signal to noise ratio and bandwidth for each channel in the system. One reason that few such systems have emerged is that, to achieve a particular data rate over a communications channel, a system that is capable of transmitting both 2-PAM and 4-PAM symbols while maintaining a transparent interface to application logic must be operable at both a first symbol rate (for 2-PAM symbols) and at a second symbol rate (for 4-PAM symbols), the second symbol rate being one-half of the first symbol rate. In this way, a total data rate of the serial data link would remain constant in both a first PAM mode and in a second PAM mode. Further, such systems would have to provide a multiplicity of clocks whose frequency depends on the PAM mode. This complexity, however, is not compatible with the large installed base of application logic.

Thus, there is a need in the art for a communications system that provides transparent, multi-PAM and binary serial data transmission and reception over a wide variety of different connectors, materials, and trace lengths. A transparent system would provide a constant interface for application logic irrespective of the PAM mode in which it operates, enabling compatibility with legacy application logic. Additionally, it is desirable that a communications interface be able to automatically determine the mode that can achieve the highest data rate for a particular physical channel. Desirable are interfaces capable of providing the mode so determined as a recommendation to the application logic employing the interface. Also desirable are interfaces capable of fully automatically configuring a communications channel for operation in the determined mode and optimally completing such configuration in a way that is transparent to the systems connected to the communications channel.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the drawings.

FIG. 3A is an eye-diagram of an exemplary 2-PAM signaling system.

FIG. 3B is an eye-diagram of an exemplary 4-PAM signaling system.

Like reference numerals refer to corresponding parts throughout the several views of the drawings.

DESCRIPTION OF EMBODIMENTS

Figure 1:
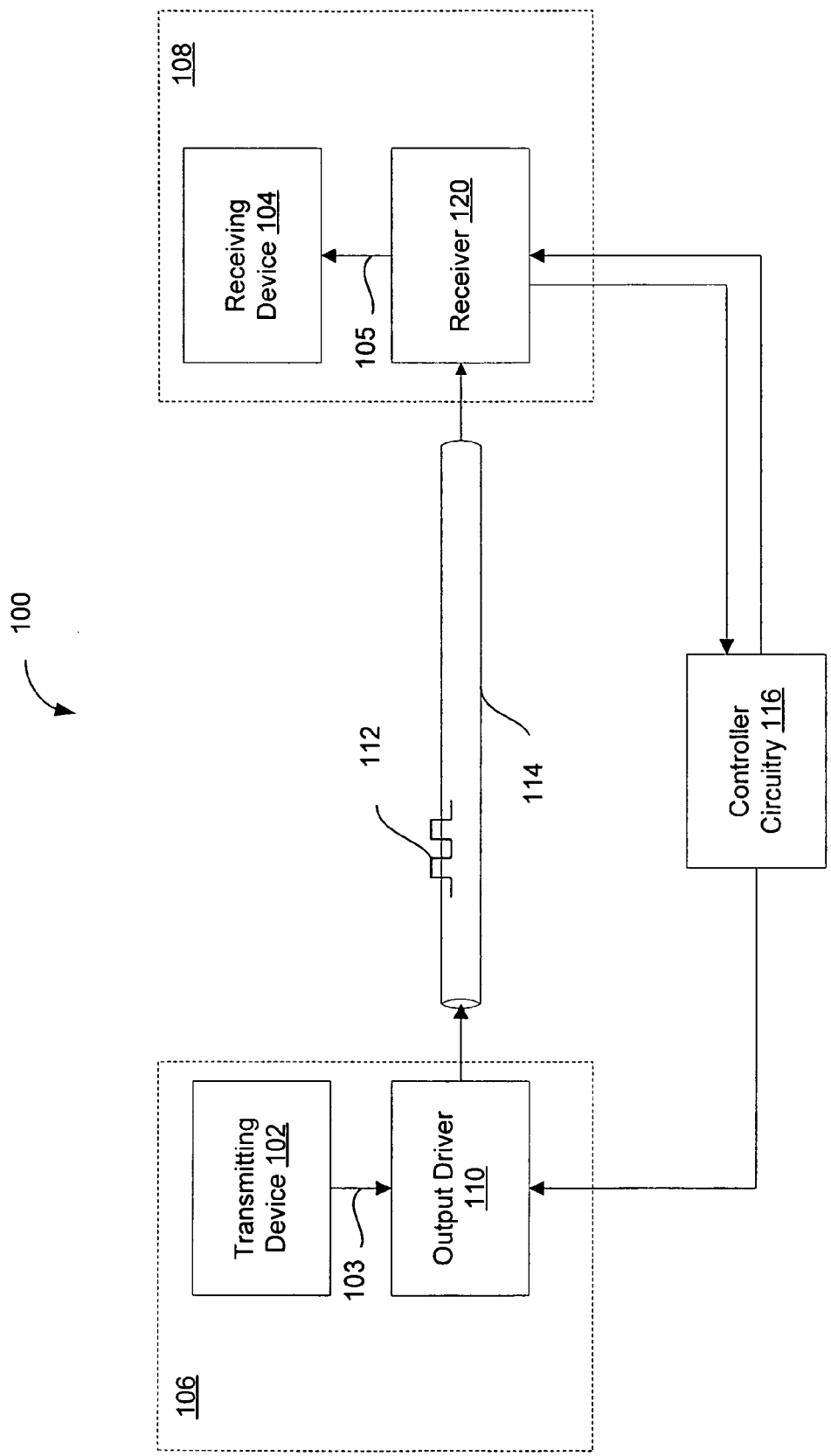
FIG. 1 depicts a signaling system, including optional control circuitry for determining and setting a mode of a multi-mode output driver and multi-mode receiver.

One aspect of the present invention provides a multi-mode PAM output driver for driving a sequence of symbols. The output driver includes an input interface configured to receive data to be output as the sequence of symbols. Additionally, a PAM mode signal specifies a PAM mode. The output driver further includes multiplexer circuitry configured to output the received data in an order determined by the PAM mode signal. Additionally, a clock circuit is configured to generate an output clock having a clock rate determined by the PAM mode signal. The output driver also includes a driver circuit coupled to the clock circuit and to an output of the multiplexer circuit. The driver circuit is configured to drive the received data as ordered by the multiplexer circuit so as to output the sequence of symbols. Some embodiments of the multi-PAM mode output driver further include control circuitry configured to determine the PAM mode.

In some embodiments, the sequence of symbols are N-PAM symbols when the PAM mode is a first PAM mode and M-PAM symbols when the PAM mode is a second mode. Typically, N and M are each selected from the group consisting of 2, 4, 8, 16, and 32, but are not equal to one another.

Some embodiments of the multi-mode PAM output driver include multiplexer circuitry and clock circuit configured so that a total output data rate of the multi-mode PAM output driver is the same for a first PAM mode and a second PAM mode. Some embodiments achieve this by setting the clock rate in the first PAM mode at twice the clock rate in the second PAM mode, when each symbol in the sequence of symbols output in the second PAM mode carries twice as much information as each symbol in the sequence of symbols output in the first PAM mode. For example, each symbol output in the second PAM mode may be a 4-PAM symbol, while each symbol output in the first PAM mode is a 2-PAM symbol.

Another aspect provides a multi-mode PAM receiver for receiving a sequence of symbols. The receiver includes a mode input for a PAM mode signal specifying a PAM mode. Additionally, the receiver is configured to receive the sequence of symbols at a clock rate of a receive clock signal and to generate a corresponding data stream. The multi-mode PAM receiver further includes multiplexer circuitry configured to order data from the data stream in accordance with the PAM mode signal so as to produce a formatted data stream. An output interface is coupled to an output of the multiplexer circuitry. The output interface is configured to output data words from the formatted data stream at a rate determined, at least in part, by the PAM mode.

Some embodiments of the multi-mode PAM receiver receive a sequence of N-PAM symbols when the PAM mode is a first PAM mode and a sequence of M-PAM symbols when the PAM mode is a second PAM mode. Typically, N and M are each selected from the group consisting of 2, 4, 8, 16, and 32, but are not equal to one another. In some embodiments, the receiver is configured such that a total data rate of the multi-mode PAM receiver is the same for the first PAM mode and the second PAM mode.

Some embodiments of the multi-mode PAM receiver are configured to disable a portion of the receiver circuit when the PAM mode is the first PAM mode. Some embodiments include a receive equalizer circuit having a delay circuit configured to have a first symbol length when the PAM mode is the first PAM mode and to have a second symbol length when the PAM mode is the second PAM mode. In some of these embodiments, the first symbol length is longer than the second symbol length. For example, the first symbol length may be twice the second symbol length.

Another aspect provides a multi-mode PAM transceiver. The multi-mode PAM transceiver includes a multi-mode PAM output driver, configured to output a first sequence of symbols and to receive a PAM mode signal specifying a PAM mode. The transceiver further includes a multi-mode PAM receiver, configured to receive a second sequence of symbols and to receive the PAM mode signal. The first sequence of symbols includes an N-PAM symbol when the PAM mode is a first PAM mode and includes an M-PAM symbol when the PAM mode is a second PAM mode, where N is not equal to M.

In some embodiments of the multi-mode PAM transceiver, the multi-mode PAM output driver and multi-mode PAM receiver are embodied on a single integrated circuit. In other embodiments of the multi-mode PAM transceiver, the multi-mode PAM output driver and multi-mode PAM receiver are embodied on a single printed circuit board.

In some embodiments of the multi-mode PAM transceiver, the first sequence of symbols is output at a first symbol rate when the PAM mode is a first PAM mode, while the first sequence of symbols is output at a second symbol rate when the PAM mode is a second PAM mode. In these embodiments, the first symbol rate is greater than the second symbol rate. In some of these embodiments, N, M, the first symbol rate and the second symbol rate are related in such a way that a data rate of the first sequence of symbols, when the multi-PAM transceiver is in the first PAM mode, is equal to the data rate of the first sequence of symbols when the multi-PAM transceiver is in the second PAM mode.

Some embodiments of the multi-mode PAM transceiver further include control circuitry configured to generate the PAM mode signal. In some of these embodiments, the control circuitry is coupled to the multi-PAM receiver, the control circuitry is configured to read, from the multi-PAM receiver, data derived from the second sequence of symbols, and the control circuitry is further configured to generate the PAM mode signal based, at least in part, on the read data. In some of these embodiments, the read data contains information about an eye diagram. In some of these embodiments, the read data contains information about an error rate.

Some embodiments of the multi-mode PAM transceiver further include a clock circuit configured to generate an output clock having a clock rate determined by the PAM mode signal. In some of these embodiments, the clock circuit comprises a phase-locked loop (PLL).

Another aspect provides a method of symbol transmission. A multi-mode PAM output driver is configured to operate in a specified PAM mode selected from a plurality of predefined PAM modes. The multi-mode PAM output driver outputs a sequence of symbols. The sequence of symbols includes an N-PAM symbol when the PAM mode is a first PAM mode. The sequence of symbols includes an M-PAM symbol when the PAM mode if a second PAM mode, with N not equal to M. In some embodiments, M and N are both integers selected from the group consisting of 2, 4, 8, and 16.

Some embodiments provide a method that includes operating the multi-mode PAM output driver so as to drive a sequence of symbols onto a first signal path at a predetermined symbol rate. The sequence includes a plurality of symbols, each symbol having a respective level of a predetermined number of PAM levels. At a multi-mode PAM receiver, the sequence of symbols is received from a second signal path. Based on a relationship between the sequence of driven symbols and the sequence of received symbols, an error metric is determined. When the error metric is greater than an error metric threshold, the symbol rate, the number of PAM levels, or both are changed. Subsequently, operating the multi-mode PAM output driver, receiving at the multi-mode PAM receiver, and determining the error metric are repeated.

In some of these embodiments of the method, the symbol rate is determined by selecting the symbol rate from amongst the plurality of available symbol rates, the plurality of available rates including a first symbol rate and a second symbol rate, wherein the second symbol rate is twice the first symbol rate. In some embodiments, the ratio between the second symbol rate and the first symbol rate is equal to $\log_2(N)/\log_2(M)$.

In some embodiments of the method, the multi-mode PAM output driver drives a first sequence of symbols at a first symbol rate selected from a plurality of predetermined symbol rates. The sequence comprising a plurality of symbols, each symbol having a respective level of a first number of PAM levels. The first number of PAM levels selected from a plurality of available PAM levels. At a multi-mode PAM receiver the first sequence of symbols is received. Based on voltage and timing characteristics of the first sequence of received symbols, a first set of signal characteristics is determined. The set of signal characteristics corresponding to the first symbol rate and to the first number of PAM levels. Subsequently, the multi-mode PAM driver drives a second sequence of symbols at a second symbol rate selected from the plurality of predetermined symbol rates, each symbol in the second sequence of symbols having a respective level of a second number of PAM levels. The second sequence of symbols is received at the multi-mode PAM receiver. A second set of signal characteristic is determined based on voltage and timing characteristics of the second sequence of received symbols. Finally, based on the first and the second set of characteristics, choosing a mode of operation of the system, the mode of operation specified, at least, by a symbol rate and a number of PAM levels.

Data Transmission System. Referring to FIG. 1, an embodiment of a data transmission system 100 is shown. Transmitting device 102, which could be any kind of digital or analog processing system, provides signals 103 to output driver 110. Signals 103 typically include data to be transmitted. In some embodiments, a system clock ("SysClk") may also be provided from transmitting device 102 to driver 110. In other embodiments, transmitting device 102 and output driver 110 receive a system clock SysClk from external clock circuitry (not depicted). Output driver 110 drives one or more symbols 112 onto channel 114. Channel 114 could be a trace on a printed circuit board, a set of twisted pair wires, a complicated signal path from a daughtercard onto a motherboard and back to another daughtercard, or any one of a number of other physical environments over which data transmission is to be achieved. Typically, transmitting device 102 and output driver 110 are embodied on a single printed circuit board 106. In some embodiments, device 102 and driver 110 may be embodied on the same integrated circuit.

Symbols 112 propagate on channel 114, and are received by receiver 120. Receiver 120 decodes symbols 112 and provides resulting signals 105 to receiving device 104. Typically, signals 105 include data decoded from symbols 112. Channel 114 can be any one of a number of types of links, including, but not limited to, coaxial cable, of series a metallic traces on printed circuit board, a path through which microwave or radio frequency signals propagate, and so on. Additionally, signals 105 may also contain a receiver clock ("RxClk"). Some embodiments include, as part of channel 114, a dedicated line for symbols representing the receiver clock RxClk. The receiver clock, in other embodiments, is received directly as part of symbols 112. In some embodiments, the receiver clock, RxClk, is derived from symbols 112 by receiver 120. In these embodiments, receiver 120 typically includes clock recovery circuitry. Receiving device 104 could be any kind of analog or digital processing unit. In some embodiments, as shown in FIG. 1, receiving device 104 and receiver 120 are embodied on a single printed circuit board 108. In other embodiments, device 104 and receiver 120 are embodied on a single integrated circuit.

The operation of output driver 110 is optionally influenced by controller circuitry 116. For example, the rate of output of the one or more symbols 112 and the modulation scheme by which symbols 112 encode data in signals 103 may vary depending on the state of one or more mode signals provided to output driver 110 by controller circuitry 116. Controller circuitry 116 may reside on printed circuit board 106, printed circuit board 108, partially on board 106 and partially on board 108, or on neither board 106 nor board 108. Controller circuitry 116 optionally influences the operation of receiver 120. For example, receiver 120 may contain a plurality of subcircuits configured to decode symbols 112 modulated by various modulation schemes. Controller circuitry 116, in some embodiments, provides one or more mode signals to receiver 120, allowing receiver 120 to disable any subcircuits not needed to decode symbols 112 in the present modulation scheme, saving power. In some embodiments, controller circuitry 116 determines a state of one or more mode signals, at least in part, based on information provided by receiver 120. Receiver 120 provides information about the received symbols 112 to controller circuitry 116. In some embodiments, the information provided refers to various aspects of the timing of received symbols 112 including, but not limited to, jitter, rise time, fall time, overshoot, and undershoot, or a subset of these. As another example, controller circuitry 116 may direct output driver 110 to drive a predetermined test sequence of data as symbols 112 onto channel 114. Receiver 120 then decodes symbols 112 which, when received, have undergone various types of distortion imparted by channel 114. Receiver 120 then may provide the decoded data to controller circuitry 116. Based on differences between the test data and received data, controller circuitry 116 may then change the state of a mode signal to achieve lower error-rate transmission through channel 114. In some embodiments, controller circuitry selects a pulse amplitude modulation (PAM) scheme in this way.

The data transmission system depicted in FIG. 1 represents only one of many typical systems in which high data-rate signaling over a complex communications channel 114 is desirable. For example, in other data transmission systems, channel 114 is bidirectional, capable of propagating symbols in both directions along its length. In some of these systems, devices on opposite ends of the channel (e.g. board 106 and board 108 in FIG. 1) each send and receive symbols to the other. These systems may exploit the bidirectionality of the channel 114 by simultaneously propagating symbols in both directions on channel 114. In other systems, symbols travel only in one direction at any given time on channel 114. In some embodiments, boards 106 and 108 each include an output driver 110 and a receiver 120. In these embodiments, channel 114 may comprise one or more unidirectional channels, one or more bidirectional channels, or some combination thereof.

Pulse Amplitude Modulation (PAM). Pulse amplitude modulation is one of a number of digital modulation schemes (others including pulse duration modulation (PDM) and pulse position modulation (PPM)) used to transmit analog and/or digital data over a channel. A multi-level version of this modulation scheme provides a means of increasing the amount of data that may be transmitted without increasing the frequency of transmitted symbols. Hereinafter, a PAM modulation scheme in which a symbol may assume any one of N levels will be referred to as N-PAM. Thus, in a 4-PAM modulation scheme, a symbol may assume any one of four levels. For example, relative to a maximum reference voltage Vref, data could be gray coded in a 4-PAM scheme. In an exemplary gray coded 4-PAM modulation scheme, the symbol representing the bit-pair (00) has an ideal voltage level of 0, the symbol representing the bit-pair (01) has an ideal voltage level of Vref/3, the symbol representing the bit-pair (11) has an ideal voltage level of 2*Vref/3, and the symbol representing the bit-pair (10) has an ideal voltage level of Vref. In some embodiments, symbols are encoded and driven as various currents on a pair of conductors in the transmission channel (differential current-mode signaling). In other embodiments, the symbols are driven as currents on a single conductor (single-ended current-mode signaling). In still other embodiments, the symbols are driven as voltage levels on one or more conductors.

Traditional 2-PAM modulation schemes drive symbols that assume one of only two distinct levels. Each symbol in a 4-PAM serial link carries twice as much data as each symbol in a 2-PAM scheme. For a fixed maximum signal level, 2-PAM has traditionally yielded optimal data transfer rates, as larger noise margins exist amongst possible symbol levels. The larger noise margins, in turn, permit higher levels of noise to corrupt the signal before ambiguity exists in decoding the symbol.

As system designers move to serial link technologies operating above 1 Gbps, however, multi-level signaling schemes offer a convenient means of either increasing data transmission rates while sending symbols at a fixed symbol rate or maintaining a given data transmission rate while sending symbols at a lower symbol rate. This flexibility allows minimization of bit-error rates (the probability with which the receiver incorrectly decodes a symbol). At higher data and symbol rates, various sources of signal degradation complicate the choice of the optimal number of levels for PAM modulation. For example, the so-called "skin effect," in which alternating currents or brief pulses of current flow mostly near the outer surface of a solid electrical conductor, tends to increase the effective resistance of the conductor at higher frequencies. The loss resulting from skin effect is approximately proportional to the square root of the frequency, lowering noise margins as the symbol rate (and, consequentially, frequency) increases. As another example, dielectric loss causes signal energy on a board trace to be lost as heat to the surrounding board dielectric. In this case, an electric field induced by the signal on the trace causes electron flow within the dielectric. This loss increases linearly with the frequency. Furthermore, crosstalk, originating from the capacitive coupling of signals from one conductor to another, imparts noise onto transmitted symbols in a complicated way that depends, for example, on the precise geometry of a closely spaced array of signal traces. Reflection due to impedance mismatches may occur for a variety of reasons, as new boards, materials or line widths are introduced in the symbol path. As with the other problems, the higher the frequency, in general, the greater the signal loss.

Figure 2:
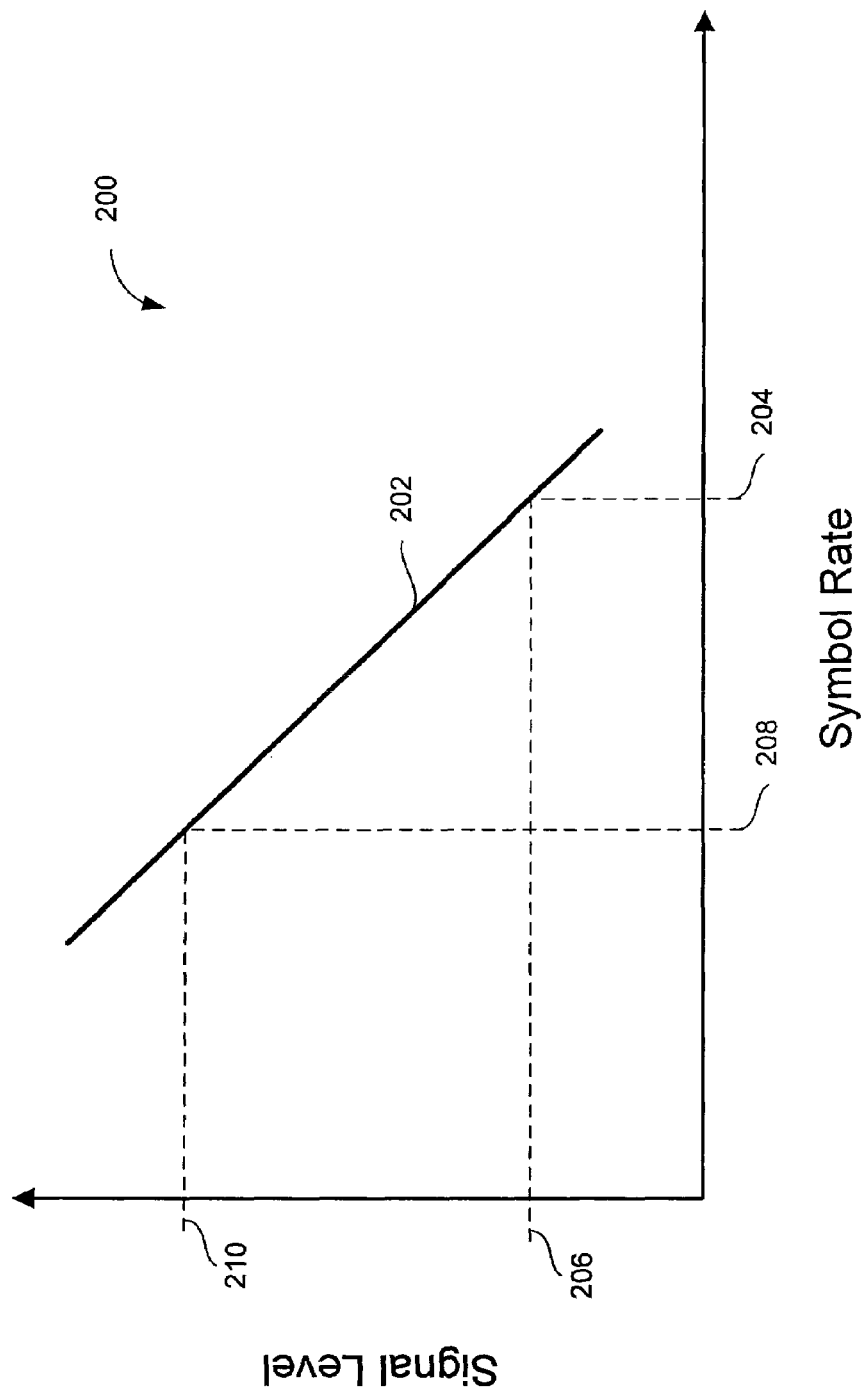
FIG. 2 depicts typical channel response characteristics for a lossy channel, wherein, for a fixed input signal, the output signal available decreases as a function of signaling rate.

2-PAM versus 4-PAM for optimal data transmission. Referring to FIG. 2, the magnitude 202 of the transfer function 200 of a typical transmission channel is illustrated. The magnitude 202 of the transfer function 200 corresponds to ratio of the signal level (which could be a voltage level or a current level, for example) that would be measured at the output of a transmission channel to the signal level driven into the channel. At a first symbol rate 204, the channel response has a first magnitude 206. At a second symbol rate 208, the channel response has a second magnitude 210. Second magnitude 210 is typically larger than first magnitude 206 due to the increase of losses (including dielectric loss, skin effect, and so on) with frequency and, therefore, symbol rate. In the particular situation depicted in FIG. 2, second symbol rate 208 is half of first rate 204, and second magnitude 210 is three times that of first magnitude 206.

Under these circumstances, the noise margins associated with a 4-PAM scheme operating at second symbol rate 208 will be the same, under a first-order approximation, as those associated with a 2-PAM scheme operating at first rate 204. Higher-order effects will generally result in the latter noise margins (of 2-PAM operating at rate 204) that differ from the former noise margins (of 4-PAM operating at a rate 208). Thus, there is a need for automatic detection and selection of PAM mode and symbol rate.

To examine the performance of a 2-PAM scheme operating at twice the symbol rate of a 4-PAM scheme, attention is now directed to FIGS. 3A and 3B. In FIG. 3A, the so-called "eye diagram" 300-A of a 2-PAM system is depicted. The eye diagram, in essence, is an overlay of the time history of a plurality of received symbols in a data transmission system. The length and width of the "eye" 306 or 308 serves as a figure of merit for the transmission system, as these determine the level of complexity required to unambiguously decode the symbols. The eye diagram 300-A is for a pair of adjacent symbols, spanning a time interval measured from time 301 to time 304 that is twice the inverse of the symbol rate. The symbol width (defined by the time interval spanning time 301 to time 302) is the inverse of the symbol rate. Symbols in a 2-PAM system have one of two levels: 0 (corresponding to the horizontal axis) or maximum level (corresponding to first magnitude 206), as measured relative to the maximum input level of a symbol. The widths of eyes 306 and 308 are each less than the symbol width (the interval between time 301 and time 302) due to a variety of effects including, but not limited to, timing jitter, intersymbol interference (ISI), and dispersion in the transmission channel. The heights of eyes 306 and 308 are both less than first magnitude 206 due to a number of effects, many of which are related to losses in a band limited transmission channel.

Turning attention to FIG. 3B, an eye diagram 300-B for a 4-PAM system is depicted. In the 4-PAM system depicted, the symbol width (defined by the interval between time 301 and time 304) is twice the symbol width of the 2-PAM system of FIG. 3A. Thus, the total data transmission rate of the 4-PAM system depicted in FIG. 3B is the same as that of the 2-PAM system of FIG. 3A. The maximum received signal level (approximately equal to second magnitude 210) in the 4-PAM system is higher than the maximum signal level (approximately equal to first magnitude 206) of the 2-PAM system, in accordance with the channel characteristics depicted in FIG. 2. This is because, for many channels (for example, channels having the characteristics of FIG. 2), higher-frequency signals are more heavily attenuated than lower-frequency signals. Thus, as the symbol rate increases, for a fixed input symbol magnitude, the maximum output symbol magnitude decreases. In particular, and as depicted in FIGS. 3A and 3B, second magnitude 210 is three times higher than first magnitude 206. Under these circumstances (i.e., assuming constant peak-to-peak voltage amplitude at the transmitter), the noise margins of the 4-PAM system, which are directly related to the permissible signal levels 316, 318 and 319 are substantially equivalent to those of the 2-PAM system. In a 4-PAM system, there are three eyes 310, 312, and 314 for each symbol. Under the particular assumptions of FIGS. 3A and 3B (that the magnitude of the channel response triples when the symbol width is doubled), there is no definite first-order advantage in employing 4-PAM or 2-PAM signaling.

Figure 3D:
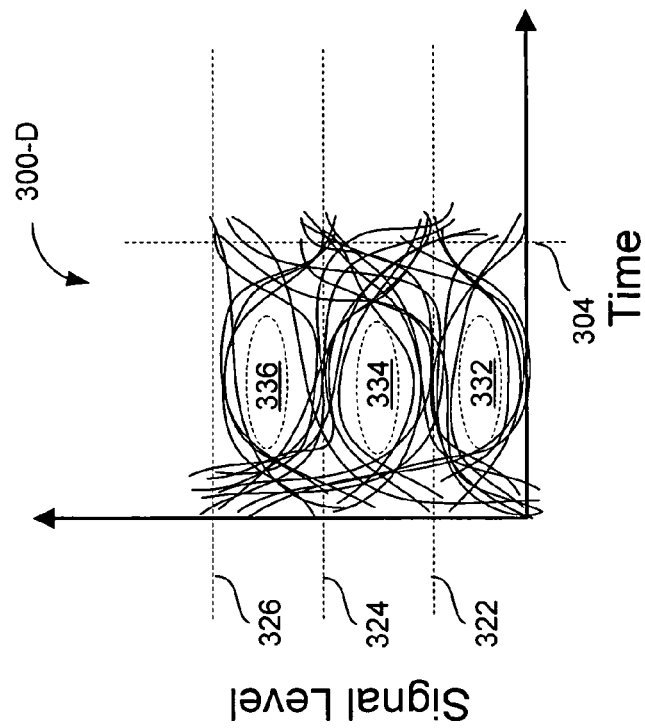
FIG. 3D is an eye-diagram of an exemplary 4-PAM signaling system in a high-loss, low-capacitance channel.
Figure 3C:
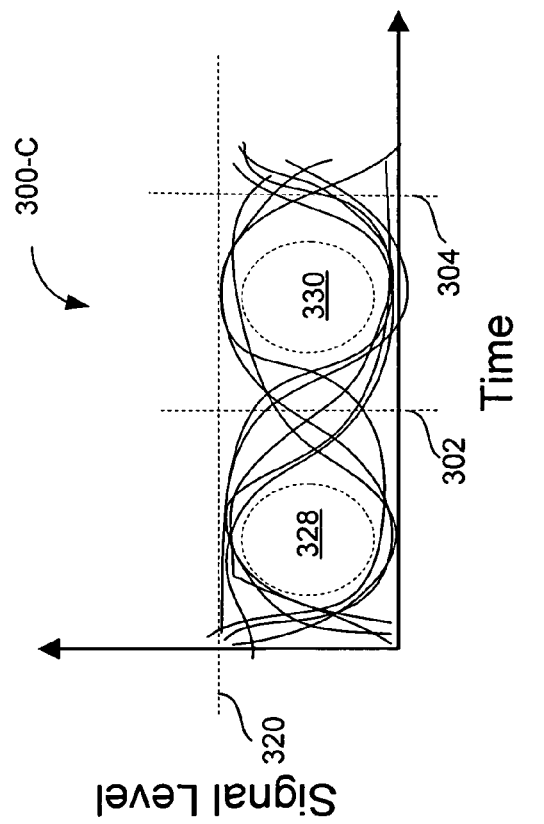
FIG. 3C is an eye-diagram of an exemplary 2-PAM signaling system in a high-loss, low-capacitance channel.

In the complicated transmission channels encountered in modern data transmission systems, however, there frequently is a distinct advantage to using either 2-PAM or 4-PAM signaling. The advantages may result from either differences in voltage margins or timing margins, or both. For example, FIG. 3C depicts a typical 2-PAM eye diagram 300-C of a transmission channel in a printed circuit board environment. FIG. 3D illustrates a typical 4-PAM eye diagram 300-D of the same transmission channel. Referring to FIG. 3C, in the 2-PAM system, the symbol width (from time 301 to time 302) limits the maximum equalized signal level to level 320. Referring to FIG. 3D, the longer symbol width (from time 301 to time 304), and thus lower frequency content, results in a higher maximum equalized signal level 326. However, level 326 is not three times as large as the 2-PAM maximum level 320 and, as a result, intermediate signal levels 322 and 324 are also relatively low. Thus, the eyes 328 and 330 associated with the 2-PAM scheme of FIG. 3C are significantly larger in voltage than the eyes 332, 334, and 336 associated with the 4-PAM scheme of FIG. 3D. For this physical transmission channel at the depicted symbol rates, then, 2-PAM signaling will likely yield a higher error-free data reception rate, even though the data transmission rates of the two systems are identical. In a different channel with a more steep attenuation characteristic the 4-PAM eyes would be larger than the 2-PAM eyes and the 4-PAM eyes would likely yield the higher error-free data rate.

Figure 3F:
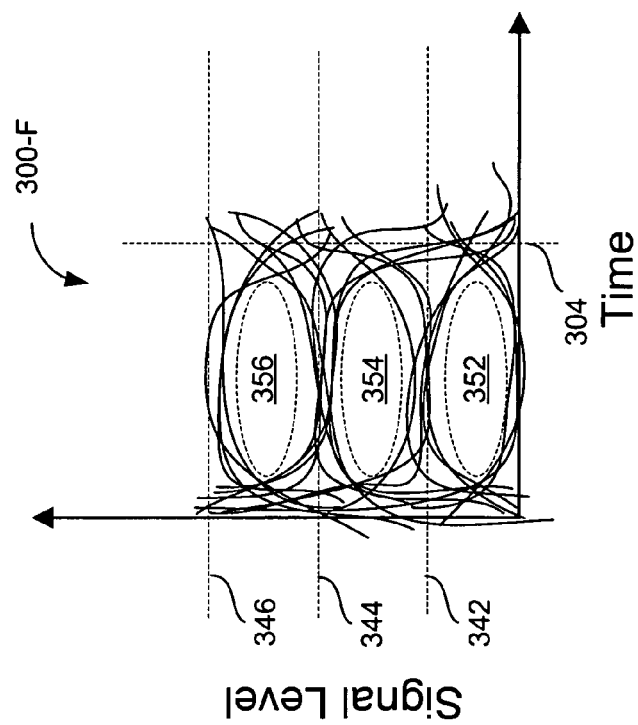
FIG. 3F is an eye-diagram of an exemplary 4-PAM signaling system in a lossy channel.
Figure 3E:
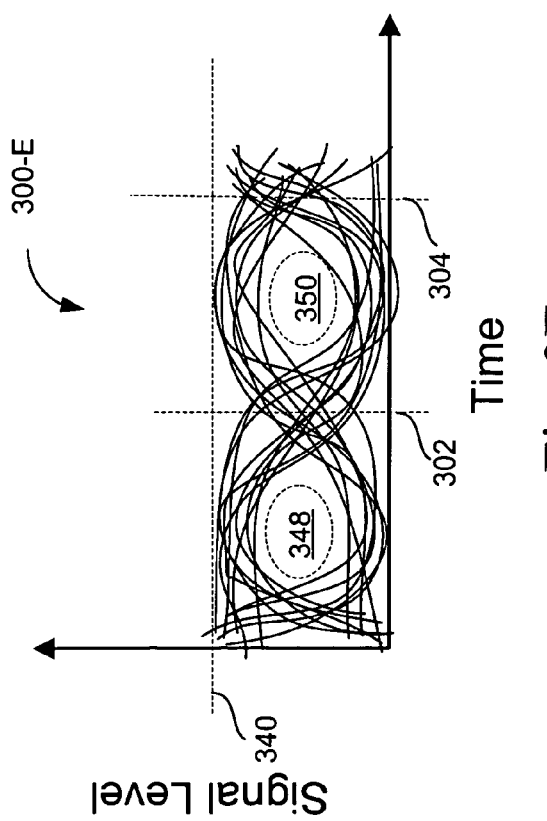
FIG. 3E is an eye-diagram of an exemplary 4-PAM signaling system in a lossy channel.

FIGS. 3E and 3F depict the eye diagram 300-E and eye diagram 300-F of a 2-PAM and 4-PAM system in which the error free data rate is limited by the timing margin of the system. The eyes 348 and 350 of the 2-PAM system depicted in FIG. 3E are not as wide as those of the 2-PAM system of the top layer trace, depicted in FIG. 3C. In fact, the eyes 352, 354, and 356 in the eye diagram 300-F are significantly wider than those of the 2-PAM system depicted in FIG. 3E due to the lower Nyquist frequency and reduced inter-symbol-interference of 4-PAM operation. Thus, for this system, 4-PAM signaling offers a higher error-free data reception rate than 2-PAM signaling, even though, again, the data transmission rate of the two signaling schemes is the same. To yield the optimal error-free data reception rate over a particular physical transmission channel then, a data transmission system may be configured to choose between 4-PAM and 2-PAM signaling. An interface to such a data transmission system makes this choice transparent to the application logic. Referring back to FIG. 1, in some embodiments of data transmission system 100, output driver 110 is a multi-mode PAM output driver, capable of driving multi-PAM symbols at a variety of symbol rates. Similarly, receiver 120 is a multi-mode PAM receiver, capable of receiving multi-PAM symbols at a variety of symbol rates.

Figure 4:
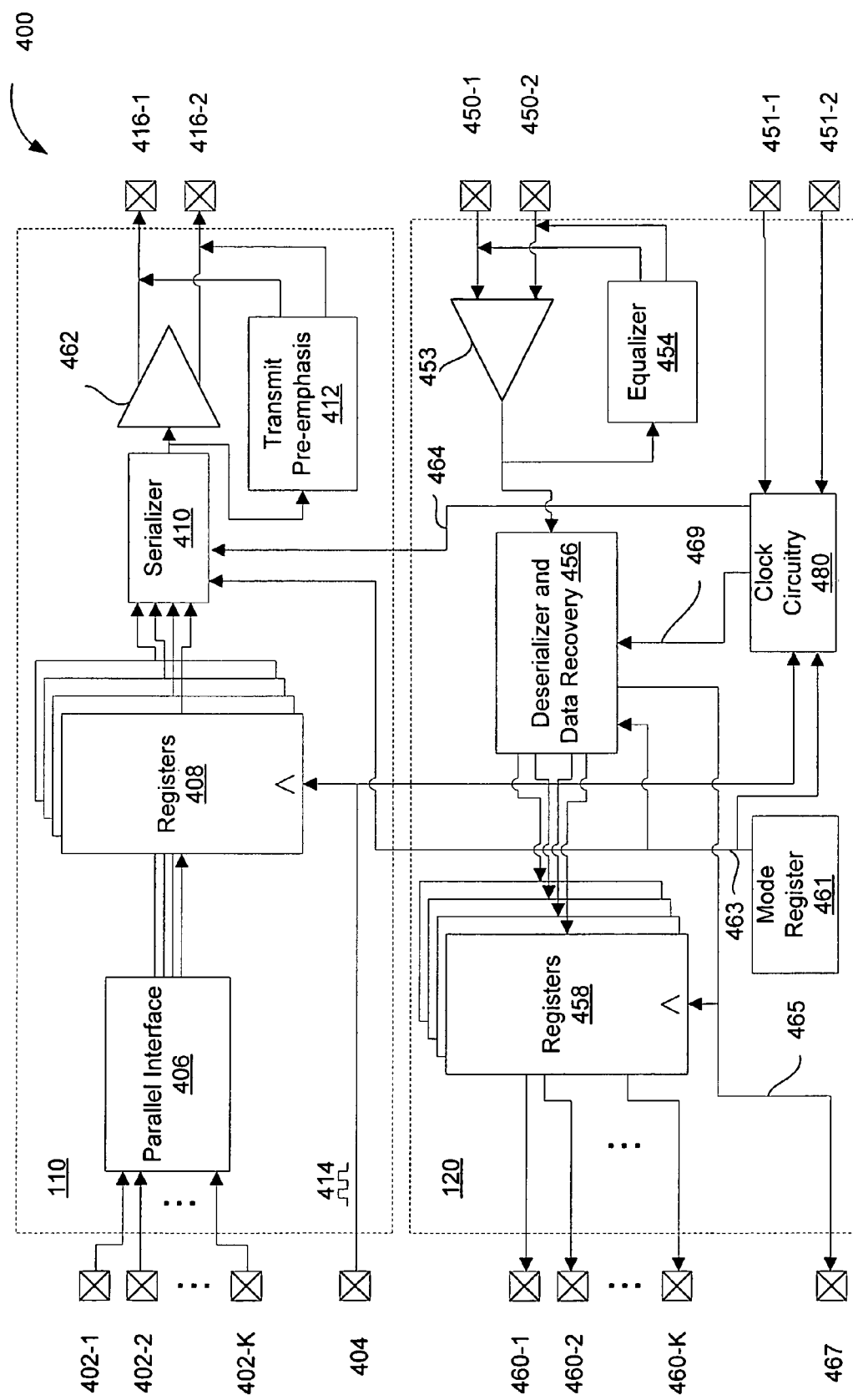
FIG. 4 illustrates the architecture of an embodiment of a transceiver.

A multi-mode PAM transceiver. Referring to FIG. 4, an embodiment of a multi-mode PAM transceiver 400 is shown. Such a transceiver 400 may be employed as part of a data transmission system 100 (FIG. 1) as an embodiment of output driver 110, an embodiment of receiver 120, or as an embodiment of both output driver 110 and receiver 120. Referring again to FIG. 4, an embodiment of multi-mode PAM transceiver 400 comprises a multi-mode PAM output driver 110 and a multi-mode PAM receiver 120. Parallel data is presented to the transceiver via data input pins 402. In some embodiments, there are forty input data pins 402-1 through 402-40. In other embodiments, the number of pins is variously 16, 20, or 32, corresponding to various modes of the transceiver. It is noted that pins 402 and pin 404, as well as other pins to be described below, are, in some embodiments, pins on an integrated circuit package. However, the use of a package and pins is not essential to the present invention. In other embodiments, pins 402, 404, and all other pins described herein may also be ports, or any other type of coupling used to input or output data.

Parallel interface 406 performs, in some modes of operation, processing of data from pins 402. For example, some embodiments of transceiver 400 have at least two distinct word modes of operation. In a first word mode, groups of 8 bits are designated as words for transmission over a transmission channel. In a second word mode, groups of 10 bits are designated as words for transmission over a transmission channel. In some embodiments, it may be desirable that the device supplying data via input data pins 402 need not be aware of the word mode in which transceiver 400 is currently operating. Thus, in some embodiments, parallel interface receives one or more groups of 8 bits via pins 402 and encodes the groups into corresponding error-correcting coded groups of 10 bits when transceiver 400 is in a second word mode. When transceiver 400 is in a first word mode, groups of eight bits are latched by parallel interface 406.

Interface 406 provides either encoded or unencoded data to registers 408. In some embodiments, the registers 408 are incorporated into the serializer 410, for example as latches. In some embodiments, each register 408 latches, at most, 10 bits of data, on edges of SysClk 414. In one embodiment, four registers 408 together latch as many as 40 bits of data on edges of SysClk 414, during a single clock cycle of SysClk 414. In addition to at least two word modes, in this embodiment, transceiver 400 also has at least two distinct byte modes. In a first byte mode, two bytes (groups of 8 or 10 bits) are latched simultaneously at parallel interface 406. In a second byte mode, four bytes are simultaneously latched at parallel interface 406. Thus, when transceiver 400 is in the second word mode and in the second byte mode, registers 408 latch 40 bits simultaneously. Similarly, when transceiver 400 is in the first word mode and the first byte mode, registers 408 latch 16 bits of data simultaneously.

Data latched by registers 408 is then serialized by serializer 410 at a rate controlled by transmitting clock signal 464. Clock circuitry 480 generates and outputs transmitting clock signal 464 based on SysClk 414 and, preferably, on mode signals 463 stored in mode register 461. The operation of serializer 410 is described further in connection with the discussion of FIG. 5, below. Although clock circuitry 480 is depicted in FIG. 4 as part of multi-mode PAM receiver 120, in other embodiments, clock circuitry 480 is part of multi-mode PAM output driver 110. In still other embodiments, various portions of clock circuitry 480 are distributed amongst driver 110 and receiver 120.

Serializer 410 is also provided with mode signals 463 from mode register 461. Although mode register 461 is depicted in FIG. 4 as part of multi-mode PAM receiver 120, in other embodiments, mode register 461 is part of multi-mode PAM output driver 110. In still other embodiments, mode register 461 is contained outside of both driver 110 and receiver 120. In still other embodiments, mode signals 463 are provided to serializer 410 by circuitry external to transceiver 400.

Serialized data is provided from serializer 410 to multi-mode PAM output driver 462. Driver 462 drives symbols onto a signal transmission channel via output pins 416. In some embodiments, driver 462 drives differential current-mode symbols on two complementary pins 416-1 and 416-2. In other embodiments, driver 462 drives a single pin 416. In still other embodiments, driver 462 drives voltage-mode symbols. In some embodiments, transmit equalization circuitry 412, based on the data provided to output driver 462, provides equalization correction signals to output pins 416.

The embodiments of transceiver 400 described here are capable of operating in a plurality of PAM modes. In a first PAM mode, the symbols driven by multi-mode PAM output driver 462 are N-PAM symbols. In a second mode, the symbols are M-PAM symbols. N and M are both integers, in some embodiments selected from amongst the group consisting of 2, 4, 8, 16 and 32. In one embodiment, N is 2 and M is 4. In addition to the number of PAM levels used to modulate the symbols driven onto pins 416, the rate at which driver 462 drives symbols (hereafter referred to as the symbol rate) also varies with the PAM mode of transceiver 400. In this embodiment, the symbol rate in the first PAM mode (in which the symbols are 2-PAM symbols) is twice the symbol rate in the second PAM mode (in which the symbols are 4-PAM symbols). Thus, in either PAM mode, the same data transmission rate is achieved.

Transceiver 400 also receives symbols from a data transmission channel. In one embodiment, each symbol is received via pins 450-1 and 450-2 as differential current-mode symbols. In other embodiments, the received symbols may be single-ended symbols, received via one pin 450, and may be either current-mode or voltage-mode symbols. Multi-mode PAM receiver 453 receives one or more symbols and provides the stream of symbols to deserializer and data recovery circuitry 456. In some embodiments, circuitry 453 and 456 are implemented as a clock and data recovery circuit 700 (FIG. 7) and a deserializer 800 (FIG. 8), respectively. These circuits are discussed in detail below in connection with the respective referenced figures. In some embodiments, equalizer 454, based on the output of receiver 453, adds equalizing signals to received symbols before they enter receiver 453.

In some embodiments, transceiver 400 operates in a plurality of PAM modes, as described above. The mode is determined, in some embodiments, entirely by mode signals 463 provided by mode register 461. In other embodiments, the mode of operation is influenced by commands received as part of the symbols received on pins 450. In the first PAM mode of one embodiment, the symbols received by receiver 453 are N-PAM signals, received at a first symbol rate. In the second PAM mode, the symbols are M-PAM symbols, received at a second symbol rate. For instance, in one embodiment, N is 2 and M is 4. In these embodiments, the first symbol rate is twice the second symbol rate. In addition to symbols, transceiver 400 optionally receives a symbol clock via pins 451. In other embodiments, transceiver 400 receives one or more mode signals, the state of the mode signals indicating the desired PAM mode, word mode, byte mode, or any combination thereof for transceiver 400. Differential pair 450, in some embodiments, is a single pin for receiving a single-ended signal. The one or more signals received by pins or pair 450 can be either voltage-mode or current-mode signals.

Deserializer and data recovery circuitry 456, in accordance with one or more phase vectors 469 provided by clock circuitry 480 and mode signals 463 provided by mode register 461, decodes the symbol stream from receiver 453 and provides decoded and formatted data to registers 458. Registers 458 latch the formatted data in accordance with timing provided by receiver clock signal 465. Receiver clock signal ("RxClk") 465 is optionally provided to output pin 467 as well. Data latched by registers 458 is available at output pins 460. In some embodiments, there are 40 pins 460. In other embodiments of transceiver 400, there may be 16, 20, or 32 pins 460. In some embodiment, an interface is interposed between the registers 458 and output pins 460 so as to arrange the output data on a contiguous set of pins regardless of the mode of operation.

Figure 5:
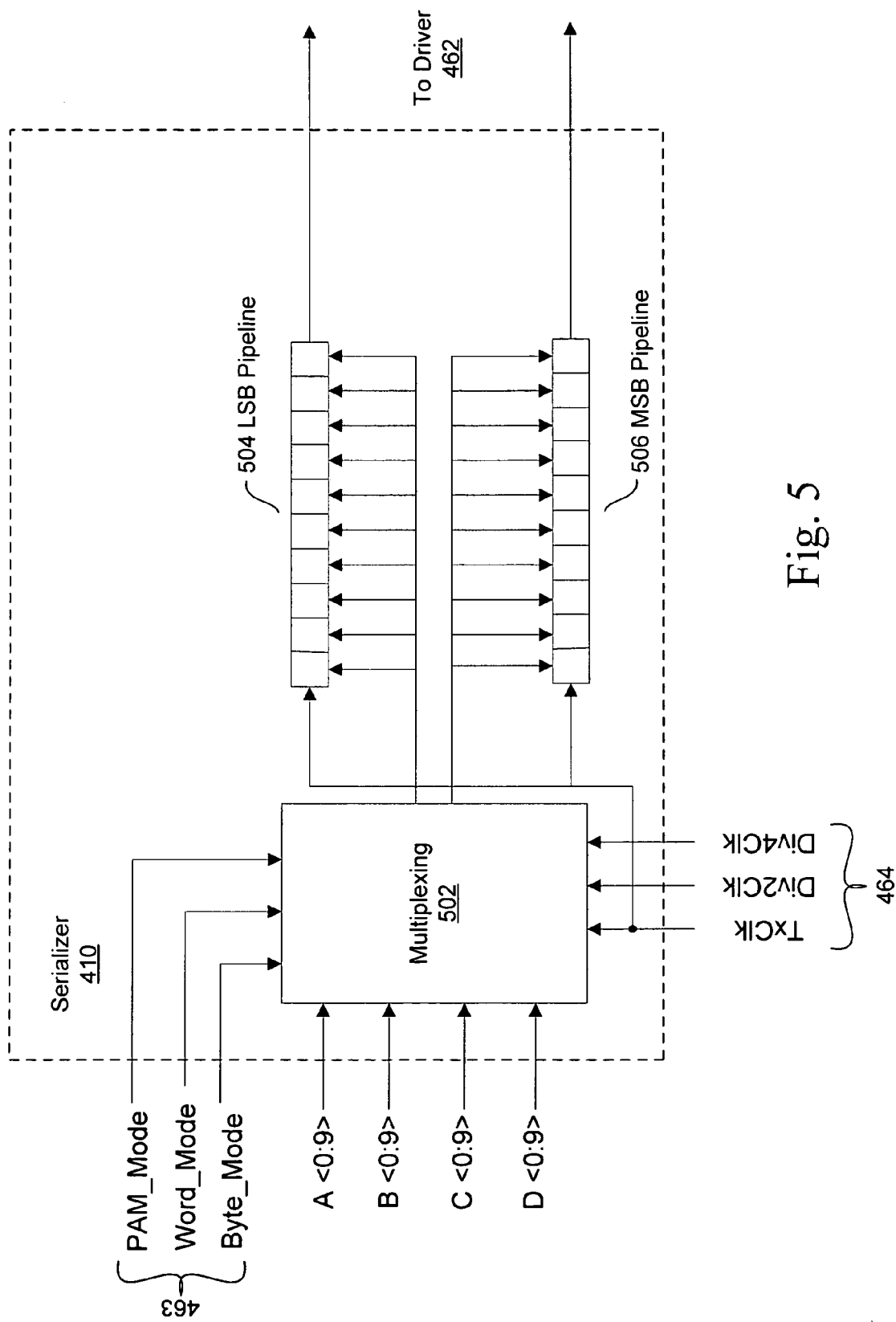
FIG. 5 illustrates the detail of an embodiment of a serializer, including two pipelines, clock selection circuitry, and multiplexing circuitry.

Serialization of data in a multi-mode PAM transmitter. Referring to FIG. 5, in an embodiment of serializer 410, data is provided from registers 408 (see FIG. 4). In one embodiment, each register 408 provides as many as 10 bits of data simultaneously. In other embodiments, registers 408 may provide more or fewer than 10 bits of data at a time. The data from each register 408 is labeled A<0:9>, B<0:9>, C<0:9>, and D<0:9>, respectively. The notation A<0:9> is used herein to refer collectively to 10 bits of data—A0, A1, A2, . . . , A9. In some word modes, eight data bits may be provided from each register 408. In these modes, one or more signal lines are held at an arbitrary logic state. Similarly, in some byte modes, less than four registers 408 provide data to serializer 410. In these modes, one or more data lines may assume arbitrary logic levels. For example, in a first byte mode, all data lines associated with the data C<0:9> and D<0:9> can assume any logic state, as only the two bytes A and B contain valid data.

In other embodiments, serializer 410 includes more than two pipelines 504 and 506. For example, in embodiments that support 8-PAM signaling, serializer 410 includes three pipelines—one for the least significant bit (LSB), one for an intermediate significant bit (ISB), and one for the most significant bit (MSB). In general, serializer 410 includes $\log_2(N)$ pipelines, where N is the maximum number of PAM levels that are used in the transmission of symbols.

Still referring to FIG. 5, the mode of operation of the multi-mode PAM transceiver 400 is specified entirely, in some embodiments, by the three mode signals 463: PAM_Mode, Word_Mode, and Byte_Mode. Mode signals 463 may be provided from a mode register (461 in FIG. 4), via pins external to the package on which transceiver 400 resides, or by any other of a variety of means. The interpretation of mode signals 463, in one embodiment, is as follows: PAM_Mode=0 signifies 2-PAM mode, PAM_Mode=1 signifies 4-PAM mode; Word_Mode=0 signifies 8 bit bytes, while Word_Mode=1 signifies 10 bit bytes; and Byte_Mode=0 signifies 2 bytes per word (i.e., two bytes per system clock cycle), and Byte_Mode=1 signifies 4 bytes per word (i.e., four bytes per system clock cycle). In other embodiments, mode signal 463 (PAM_Mode) includes more than one bit of information. For example, in a serializer 410 supporting 8-PAM, 4-PAM, and 2-PAM symbol transmission, PAM_Mode includes two bits of information so that the three distinct PAM modes can be unambiguously identified. In general, in embodiments supporting 2-PAM, 4-PAM, 8-PAM, . . . and N-PAM symbol transmission, mode signal 463 (PAM_Mode) includes at least $\log_2(N)$ bits of information.

Clock circuitry 480 (FIG. 4) provides one or more clock signals 464 to serializer 410, including TxClk, Div2Clk, and Div4Clk (FIG. 5). The generation of clock signals 464 is discussed in detail in connection with the discussion of FIGS. 6A, 6B, 6C, 6D, and 6E, below. Multiplexer 502 orders data from bytes A, B, C, and D and outputs a stream of data to least-significant bit (LSB) pipeline 504 and most-significant bit (MSB) pipeline 506. Although, as shown in FIG. 5, each of pipelines 504 and 506 comprise 10 stages, other embodiments of the pipelines may contain more or fewer stages. Pipelines 504 and 506 shift amongst stages at a rate dictated by the clock rate of TxClk. In embodiments in which symbols are transmitted twice per clock period, TxClk has a clock frequency equal to one-half the symbol transmission rate of transceiver 400. Thus, pairs of data bits exit pipelines 504 and 506 once per symbol period, and are conveyed from serializer 410 to output driver 462. In some embodiments, LSB pipeline 504 is disabled when PAM_Mode=0, signifying the 2-PAM mode of operation. In this way, the power consumption of serializer 410 is approximately the same when PAM_Mode=0 (2-PAM) and PAM_Mode=1 (4-PAM). In these embodiments, both pipelines 504 and 506 operate at a clock frequency equal to the 4-PAM symbol transmission rate when transceiver 400 is in 4-PAM mode. In 2-PAM mode, LSB pipeline 504 is disabled and MSB pipeline 506 operates at a clock frequency equal to the 2-PAM symbol transmission rate. The 2-PAM symbol transmission rate is preferably twice the 4-PAM symbol transmission rate, and thus MSB pipeline 506 consumes approximately twice as much power in 2-PAM mode relative to the power consumed by MSB pipeline 506 in 4-PAM mode. However, by disabling LSB pipeline 504 in 2-PAM mode, the additional power required by MSB pipeline 506 can be supplied without a substantial net increase in the power consumption of serializer 410.

Figure 5A:
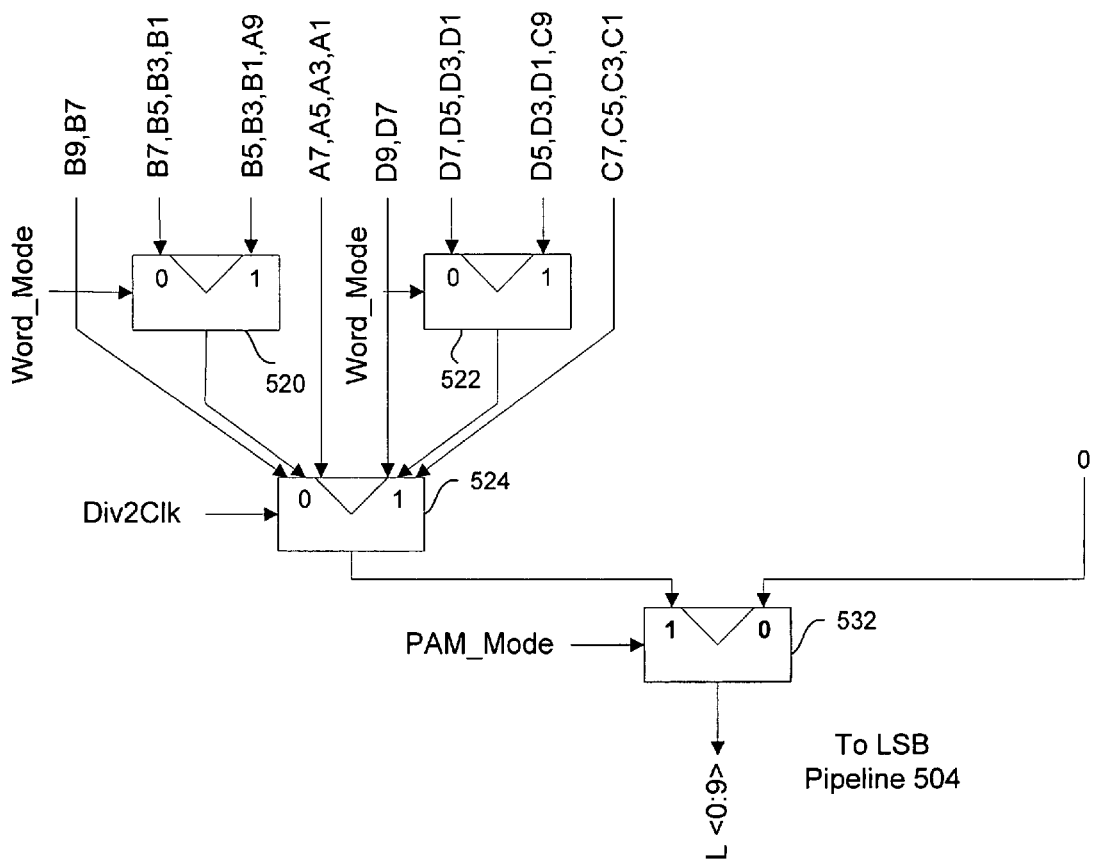
FIG. 5A illustrates the detail of a portion of the multiplexing circuitry used to load the least significant bit (LSB) pipeline in one embodiment.

Referring to FIG. 5A, the ordering of the bits L<0:9> provided to LSB pipeline 504 is illustrated. The circuits and signals illustrated in FIG. 5A are all preferably part of multiplexer 502 (FIG. 5). Each of multiplexers 520, 522, 524, and 532 are preferably 10×2 multiplexers, selecting one set of 10 lines based on a single address signal. When PAM_Mode is not asserted (=0), the system is operating in 2-PAM mode and the "0" input of multiplexer 532 is passed through multiplexer 532 to its output L<9:0>. When PAM_Mode is asserted (=1), the system is operating in 4-PAM mode, and the outputs of multiplexers 520, 522, and 524 impact the output of the circuitry depicted in FIG. 5A. Multiplexers 520, 522, and 524, which are used only in 4-PAM mode, only operate on odd input bits, which ultimately influence the contents of L<0:9>. In contrast, referring to FIG. 5B, multiplexers 540, 542, and 544 only receive even bits, the even bits ultimately influencing the contents of M<0:9> in 4-PAM mode.

Figure 5B:
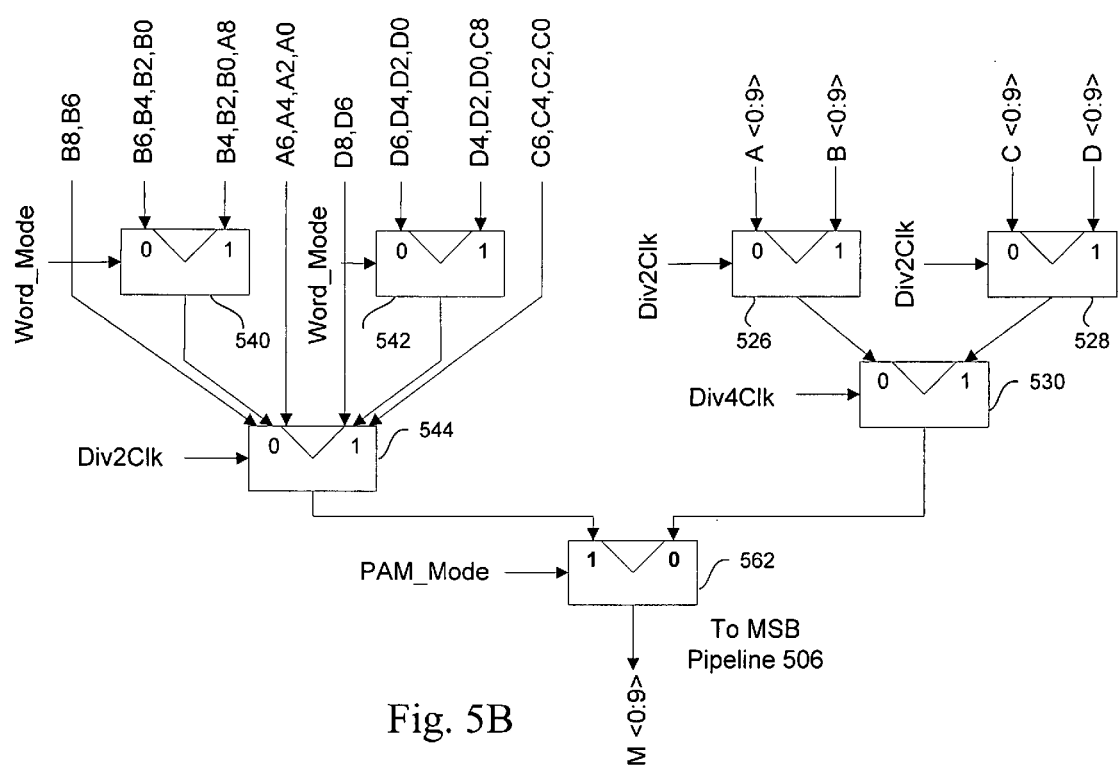
FIG. 5B illustrates the detail of a portion of the multiplexing circuitry used to load the most significant bit (MSB) pipeline in one embodiment.

Referring to FIG. 5B, multiplexers 540 and 542 direct even bits based on the Word_Mode, and multiplexer 544 selects between its "0" and "1" branch inputs based on the state of Div2Clk, thereby alternating between the A and B even bits on the one hand and the C and D even bits on the other hand. As noted above, multiplexers 540, 542 and 544 are used only in 4-PAM mode (as indicated by PAM_Mode=1). In 2-PAM mode (PAM_Mode=0), multiplexers 526, 528 and 530 are active. Multiplexer 526 alternately passes the A<0:9> and B<0:9> bits, under the control of the Div2Clk signal. Similarly, multiplexer 528 alternately passes the C<0:9> and D<0:9> bits, under the control of the Div2Clk signal. Multiplexer 530 alternates between the A and B bits and the C and D bits, under the control of the Div4Clk signal. Multiplexer 562 passes data from the left branch (from multiplexer 544) in 4-PAM mode, and passes data from the right branch (from multiplexer 530) in 2-PAM mode, to the MSB pipeline 506 (M<0:9>). In some embodiments, Div2Clk, Div4Clk, or both are statically set to logic low (=0) for multiplexers 526, 528 and 530 in some modes.

Figure 6A:
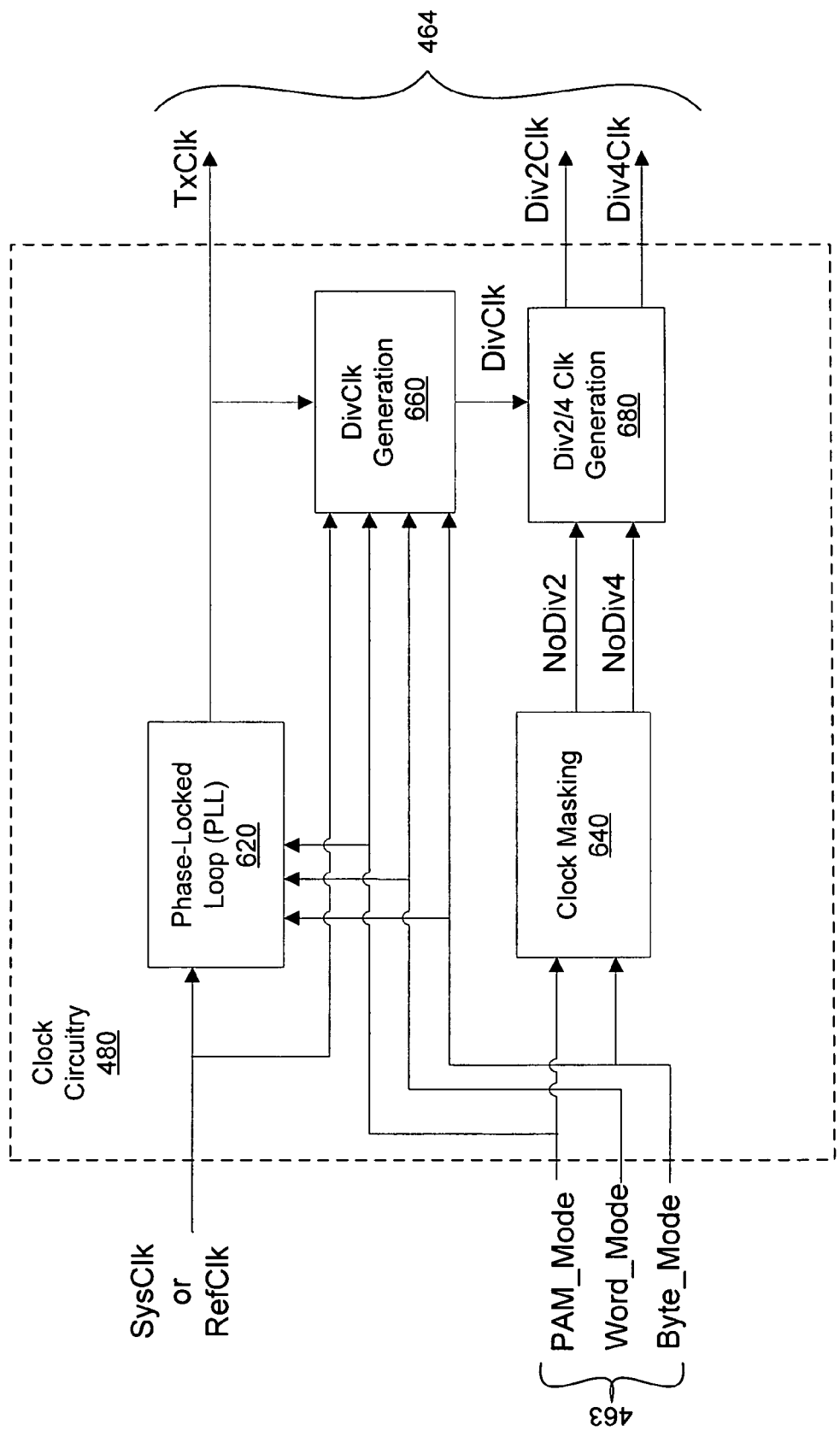
FIG. 6A illustrates an embodiment of clock circuitry for generating one or more clock signals based on one or more mode signals.

Mode-dependent clock generation for serialization. Referring to FIG. 6A, an embodiment of clock circuitry 480 for use in a multi-mode transceiver 400 is depicted. In this embodiment, clock circuitry 480 comprises a phase-locked loop (PLL) 620, clock masking circuitry 640, DivClk generating circuitry 660, and Div2/4Clk generation circuitry 680. PLL 620 preferably takes as input system clock SysClk and mode signals 463 (PAM_Mode, Word_Mode, and Byte_Mode), producing output clock TxClk. The detailed operation of an embodiment of PLL 620 is explained in connection with the description of FIG. 6B, below. DivClk generating circuitry 660 similarly takes as input system clock SysClk and mode signals 463 and outputs signal DivClk. The operation of an embodiment of circuitry 660 is described more fully in connection with the discussion of FIG. 6D, below. Clock masking circuitry 640 derives clock masks /NoDiv2 and /NoDiv4 from PAM_Mode and Byte_Mode. See the discussion of FIG. 6C, below, for a description of one embodiment of circuitry 640. Finally, based on clock masks (/NoDiv2 and /NoDiv4) as well as DivClk, Div2/4Clk generation circuitry 680 outputs Div2Clk and Div4Clk as part of clock signals 464. The detailed operation of an embodiment of circuitry 680 is discussed in connection with the discussion of FIG. 6E, below.

Figure 6B:
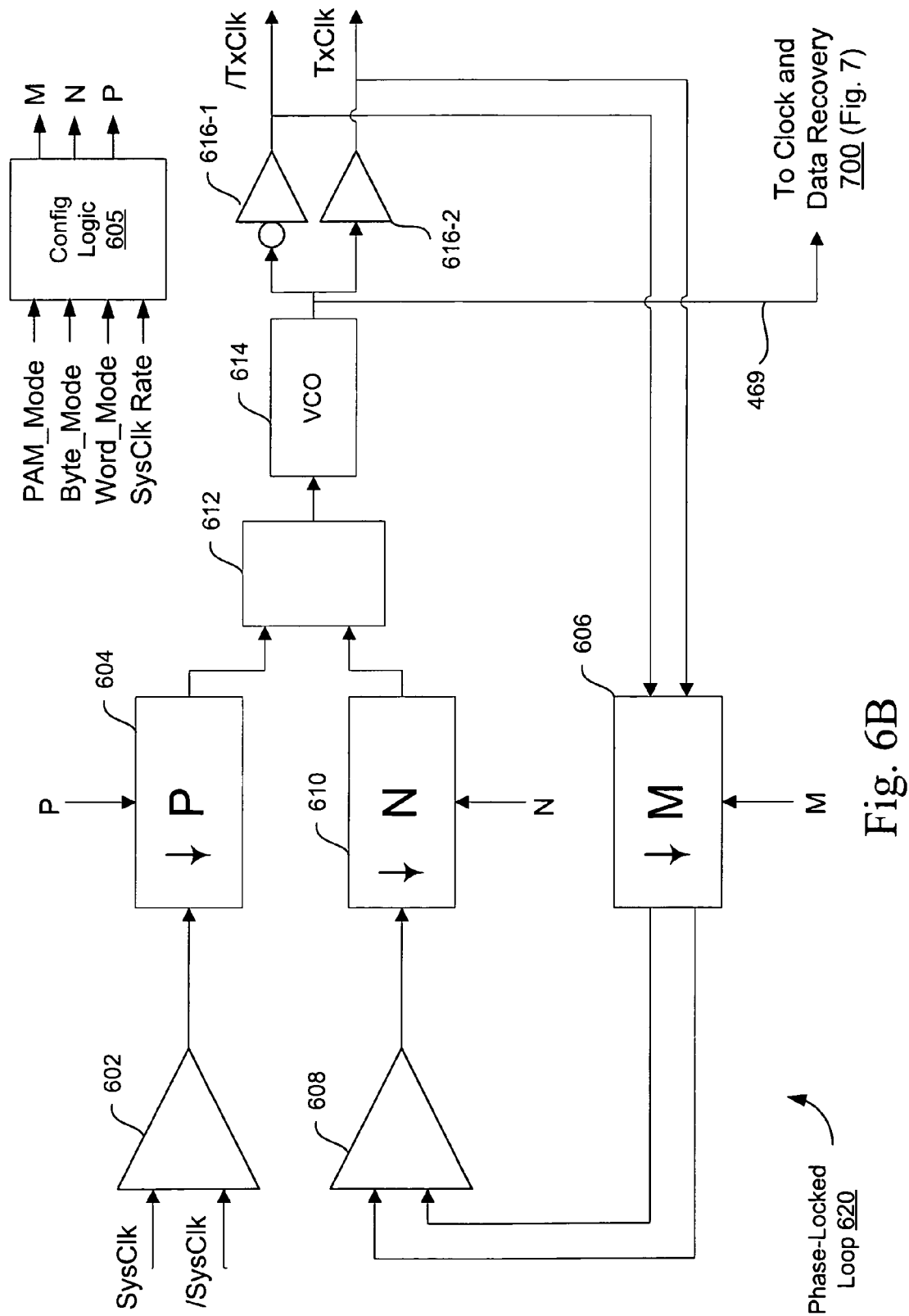
FIG. 6B illustrates an embodiment of a phase-locked loop for generating an output clock from a system clock, wherein the rate of the output clock depends on one or more mode signals.

Referring to FIG. 6B, an embodiment of phase-locked loop (PLL) 620 is depicted. Differential mode clock SysClk is provided to amplifier 602. The notation/SysClk refers to the logical complement of the signal SysClk. SysClk could be any clock signal. However, it preferably is the system clock. The single-ended output of amplifier 602 is then provided to frequency divider 604. As shown in FIG. 6B, the PLL 620 includes three frequency dividers 604, 606 and 610. These frequency dividers are configured, such as during power on or during a configuration process, to divide the frequency of their respective input signals by factors of P, M and N, respectively. The PLL clock frequency, $f_{PLL}$, which is also the frequency of the TxClk signal output by the PLL 620, is given by $$f_{PLL} = f_{SysClk} * (M*N)/P$$

where $f_{SysClk}$ is the frequency of the system clock.

The P, M and N factors are determined by configuration logic 605 in accordance with the PAM_Mode, Word_Mode, Byte_Mode and SysClk Rate. For embodiments in which symbols are transmitted at a rate of one symbol per TxClk cycle, the number S of symbols transmitted per word is equal to (M*N)/P. For instance, if P=1, M=10 and N=2, then twenty (S=20) symbols are transmitted per word. If P=2, and there are to be 20 symbols transmitted per word, then M=10 and N=4. For embodiments in which two symbols are transmitted per TxClk cycle, S=(2*M*N)/P. Some examples of settings for P, M and N are shown in Table 1, for a system in which symbols are transmitted at a rate of one per TxClk cycle. For a system in which symbols are transmitted at a rate of two per TxClk cycle, the M factor would be reduced by a factor of two to 4 or 5.

TABLE 1

Exemplary Settings for Dividers 604, 606, 610

| PAM_Mode | Word_Mode | Byte_Mode | Sym/Clock | P (604) | M (606) | N (610) |   |
|---|---|---|---|---|---|---|---|
| 0 | 1 | 0 | 20 | 1 | 10 | 2 | or |
|   |   |   |   | 2 | 10 | 4 |   |

TABLE 1-continued

Exemplary Settings for Dividers 604, 606, 610

| PAM_Mode | Word_Mode | Byte_Mode | Sym/Clock | P (604) | M (606) | N (610) | |
|---|---|---|---|---|---|---|---|
| 0 | 1 | 1 | 40 | 1 | 10 | 4 | |
| 0 | 0 | 0 | 16 | 1 | 8 | 2 | or |
|   |   |   |   | 2 | 8 | 4 | |
| 0 | 0 | 1 | 32 | 1 | 8 | 4 | |
| 1 | 1 | 0 | 10 | 2 | 10 | 2 | |
| 1 | 1 | 1 | 20 | 1 | 10 | 2 | or |
|   |   |   |   | 2 | 10 | 4 | |
| 1 | 0 | 0 | 8 | 2 | 8 | 2 | |
| 1 | 0 | 1 | 16 | 1 | 8 | 2 | or |
|   |   |   |   | 2 | 8 | 4 | |

In some embodiments, frequency divider 604 either passes its input signal to its output (i.e., P=1), or generates an output clock signal with half the clock frequency of its input clock signal (i.e., P=2) based on the state of the PAM_Mode signal and the rate of the SysClk (SysClk Rate). In other embodiments, for example in a system capable of transmitting data using 2-PAM, 4-PAM and 8-PAM modes, a wider range of values for P (e.g., 1, 2 and 4) may be used. In still other embodiments, frequency divider 604 generates an output clock signal with 1/P the frequency of its input clock signal, where P is determined in accordance with the number of bits encoded in each symbol transmitted over a serial channel. P may also be determined in accordance with the system clock rate. One of skill in the art will readily recognize that a division of any power of two in the input clock rate can be accomplished by the concatenation of binary frequency dividers.

The output clocks (TxClk and /TxClk) of PLL 620 are a differential pair of clock signals. In embodiments in which one symbol is transmitted during each clock period, as part of the feedback portion of PLL 620, frequency divider 606 divides the frequency of TxClk by a factor of either eight or ten, depending on the state of the Word_Mode signal. Examples of settings for division factor M are shown in Table 1. When Word_Mode is asserted (Word_Mode=1, corresponding to the second word mode in which each byte comprises 10 bits), divider 606 divides the frequency of TxClk by a factor of ten. Alternately, when Word_Mode is not asserted (Word_Mode=0, corresponding to the first word mode in which each byte comprises 8 bits), divider 606 divides the frequency of TxClk by a factor of eight. In embodiments in which two symbols are transmitted per clock period, divider 606 divides the frequency of TxClk by a factor of either four or five, depending on the state of the Word_Mode signal.

The output of divider 606 is then provided to amplifier 608, the single-ended output of which is passed to divider 610. Divider 610 is configured by logic 605 to divide the frequency of its input by a factor of 2 or 4, based on the state of Byte_Mode and PAM_Mode. In some embodiments, the frequency division factor N for divider 610 is also based on the system clock rate. Examples of settings for division factor N are shown in Table 1. In some other embodiments, the frequency division factor N is set to 1, 2 or 4 in accordance with the mode of operation of the transmitting device and the system clock rate.

Phase comparator 612 compares the output of divider 604 and divider 610. Comparator 612 outputs a signal proportional to the phase difference between the outputs of dividers 604 and 610 to voltage-controlled oscillator (VCO) 614. Additionally, the phase vectors 469 are also provided by the VCO 614 to clock and data recovery circuitry 700, part of the receiver 120 part of multi-mode transceiver 400 (FIG. 4).

For clock signals, the output of comparator 612 will spend the majority of time in one of two states—zero when the two clock signals are in phase, and a fixed value when they are not. VCO 614 generates a signal that oscillates with a frequency proportional to the output of comparator 612. Limiters 616 then convert this, typical sinusoidal, signal into a square-wave signal suitable for use as a clock signal. The output TxClk of limiter 616-2 and the complementary output/TxClk of limiter 616-1 are then output.

Figure 6C:
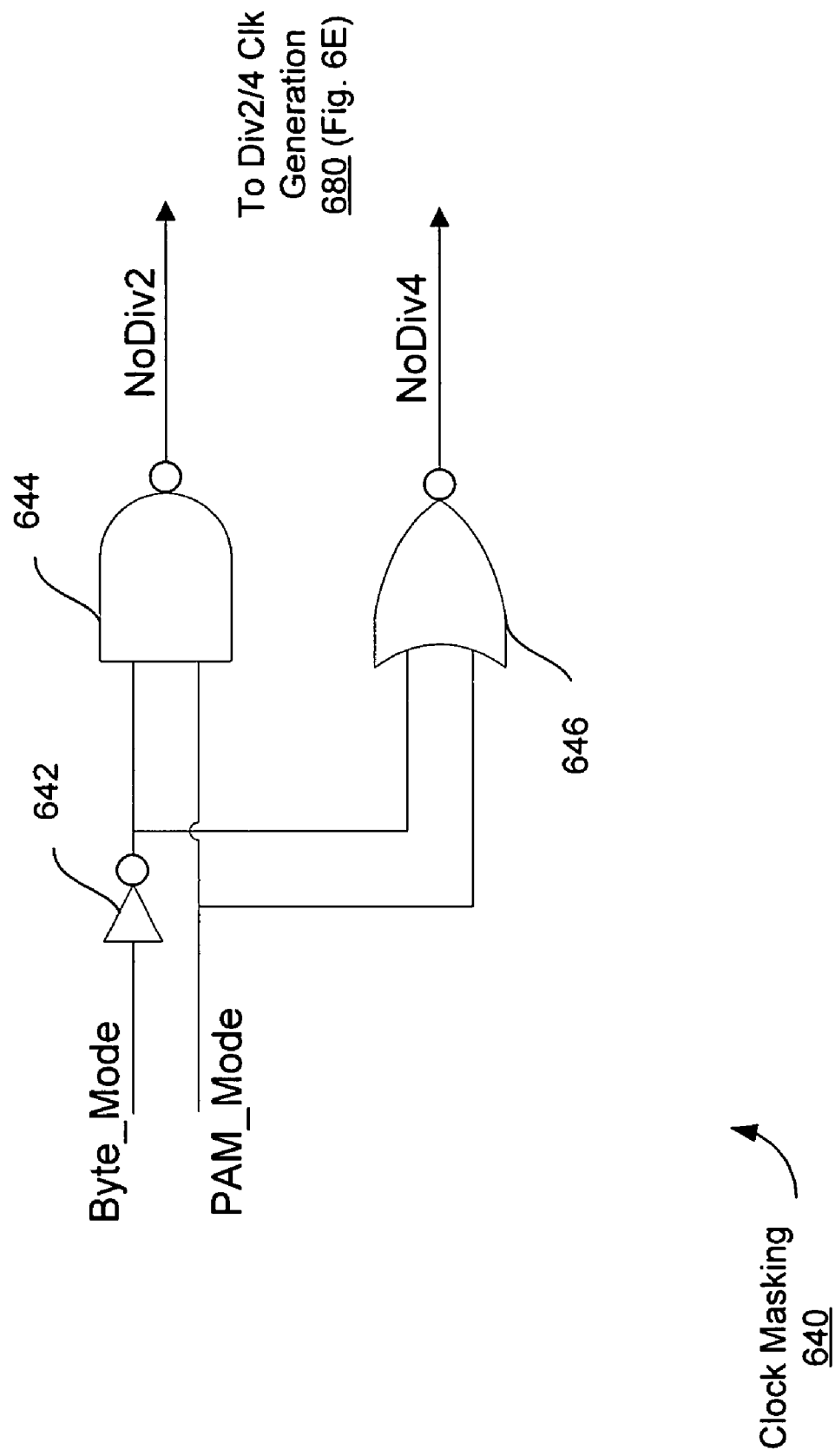
FIG. 6C illustrates an embodiment of clock masking circuitry.

To generate the auxiliary clock signals Div2Clk and Div4Clk needed by multiplexer 502 (FIG. 5) in serializer 410 (FIG. 5), first several preliminary signals are generated. Referring to FIG. 6C, clock masking circuitry 640 includes combinatorial logic for determining the state of two such preliminary signals, NoDiv2 and NoDiv4, from mode signals Byte_Mode and PAM_Mode. The first of these preliminary signals, NoDiv2, has the interpretation that when it is asserted (=1), the clock signal Div2Clk should be disabled in the logic low (=0) state. The operation of inverter 642 and NAND gate 644 results in NoDiv2 being deasserted only when Byte_Mode is deasserted (=0, corresponding to a mode wherein there are 2 bytes per word) and PAM_Mode is asserted (=1, corresponding to a mode wherein 4-PAM symbols are driven). Thus, only with this mode setting is Div2Clk disabled. In contrast, in all modes wherein 2-PAM symbols are driven or 4 bytes per word are used, NoDiv2 is deasserted and Div2Clk is enabled.

The second preliminary signal, NoDiv4, has a similar interpretation. When NoDiv4 is asserted (=1), the Div4Clk is disabled, in the logic low (=0) state. The operation of NOR gate 646 results in NoDiv4 being deasserted (=0) only when Byte_Mode is asserted (=1, signifying 4 bytes per word) and PAM_Mode is deasserted (=0, signifying 2-PAM symbols being driven). Thus, it is only with these mode settings that Div4Clk is enabled. In all modes where either PAM_Mode is asserted (=1, signifying 4-PAM symbols being driven) or Byte_Mode is deasserted (=0, signifying 2 bytes per word), NoDiv4 is asserted (=1), signifying that Div4Clk is to be disabled (held low in the logic low state).

Figure 6D:
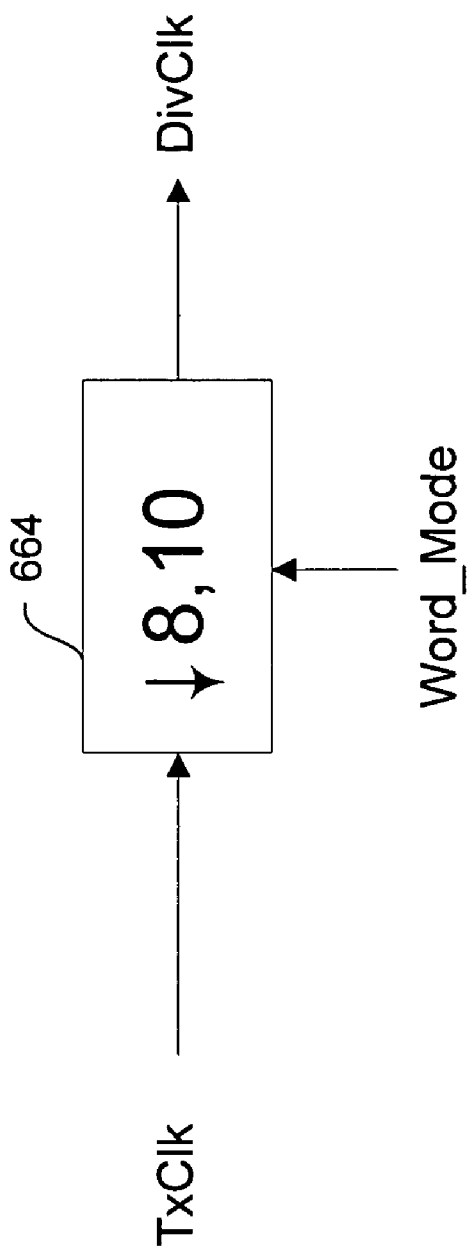
FIG. 6D illustrates an embodiment of clock generating circuitry configured to output an auxiliary clock signal ("DivClk") having a mode-dependent clock rate.

Referring to FIG. 6D, the generation of DivClk, the final preliminary signal needed by Div2/4Clk generation circuitry 680 (FIG. 6A) is accomplished by DivClk generation circuitry 660. TxClk is received from PLL 620 (FIG. 6B) and input to frequency divider 664. When Word_Mode is deasserted (=0, signifying a mode of operation wherein there are 8 bits per byte), frequency divider 664 divides the frequency of its input by a factor of eight. Thus, when Word_Mode=0, DivClk generation circuitry 660 outputs clock signal DivClk with one-eighth the frequency of TxClk. Conversely, when Word_Mode is asserted (=1, signifying a mode of operation wherein there are 10 bits per byte), frequency divider 664 divides the frequency of its input by a factor of ten. Thus, when Word_Mode=1, DivClk generation circuitry 660 outputs clock signal DivClk with one-tenth the frequency of TxClk. In embodiments in which two symbols are transmitted per clock period, divider 664 divides the frequency of TxClk by a factor of either four or five, depending on the state of the Word_Mode signal.

Figure 6E:
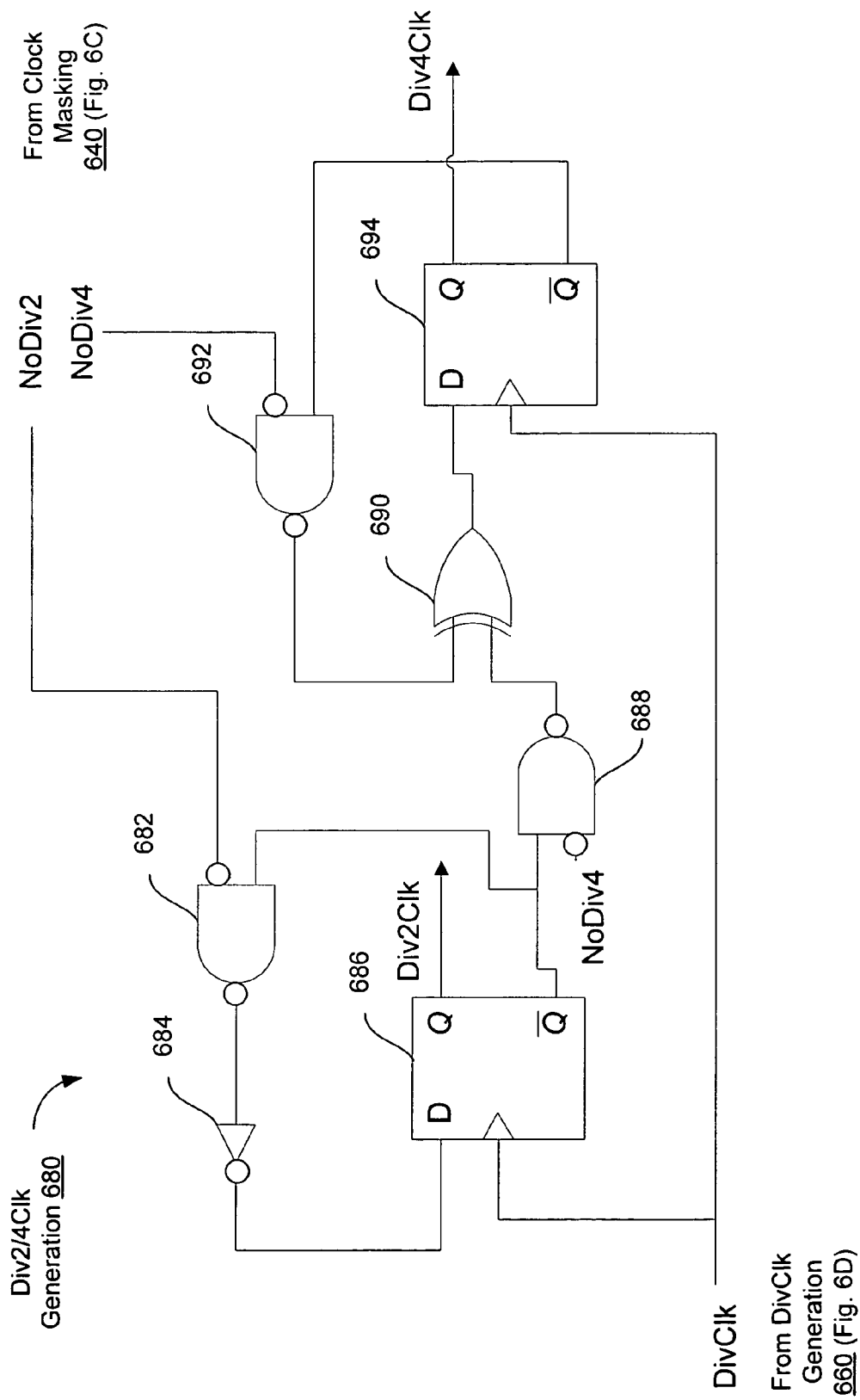
FIG. 6E illustrates an embodiment of clock generating circuitry configured to output two auxiliary clock signals ("Div2Clk" and "Div4Clk"), the auxiliary clock signals having mode-dependant clock rates.

Referring now to FIG. 6E, an embodiment of Div2/4Clk generation circuitry 680 is illustrated. Clock mask signals NoDiv2 and NoDiv4 are received from clock mask circuitry 640 (FIG. 6C) and DivClk is received from DivClk generation circuitry 640. When NoDiv2 is deasserted (=0, indicating that Div2Clk is to be enabled), flip-flop 686, NAND gate 682, and inverter 684 together form a frequency divider of a factor of two. Thus, in this case, Div2Clk has one-half the frequency of DivClk. In contrast, when NoDiv2 is asserted (=1, indicating that Div2Clk is to disabled), gate 682 breaks the feedback loop and, together with inverter 684 and flip-flop 686, cause Div2Clk to assume a constant, logic low (=0) value.

Still referring to FIG. 6E, when NoDiv4 is asserted (=1, indicating that Div4Clk is to be disabled), the outputs of gates 692 and 688 are both constant at logic high (=1), and therefore the output of XOR gate 690 is constant at logic low (=0). Therefore, when NoDiv4 is asserted, Div4Clk assumes a constant value at logic low (=0). On the other hand, when NoDiv4 is deasserted (=0, indicating that Div4Clk is to be enabled), gates 692 and 688 serve as inverters with respect to their inputs. Thus, if Div2Clk is also enabled, flip-flop 694, NAND gate 692, and XOR gate 690 form a feedback loop. The exclusive-or (XOR) operation of gate 690 together with the delay of flip-flop 694 have the effect of halving the frequency of Div2Clk, resulting in a Div4Clk generated with one-fourth the clock frequency of DivClk.

Figure 16:
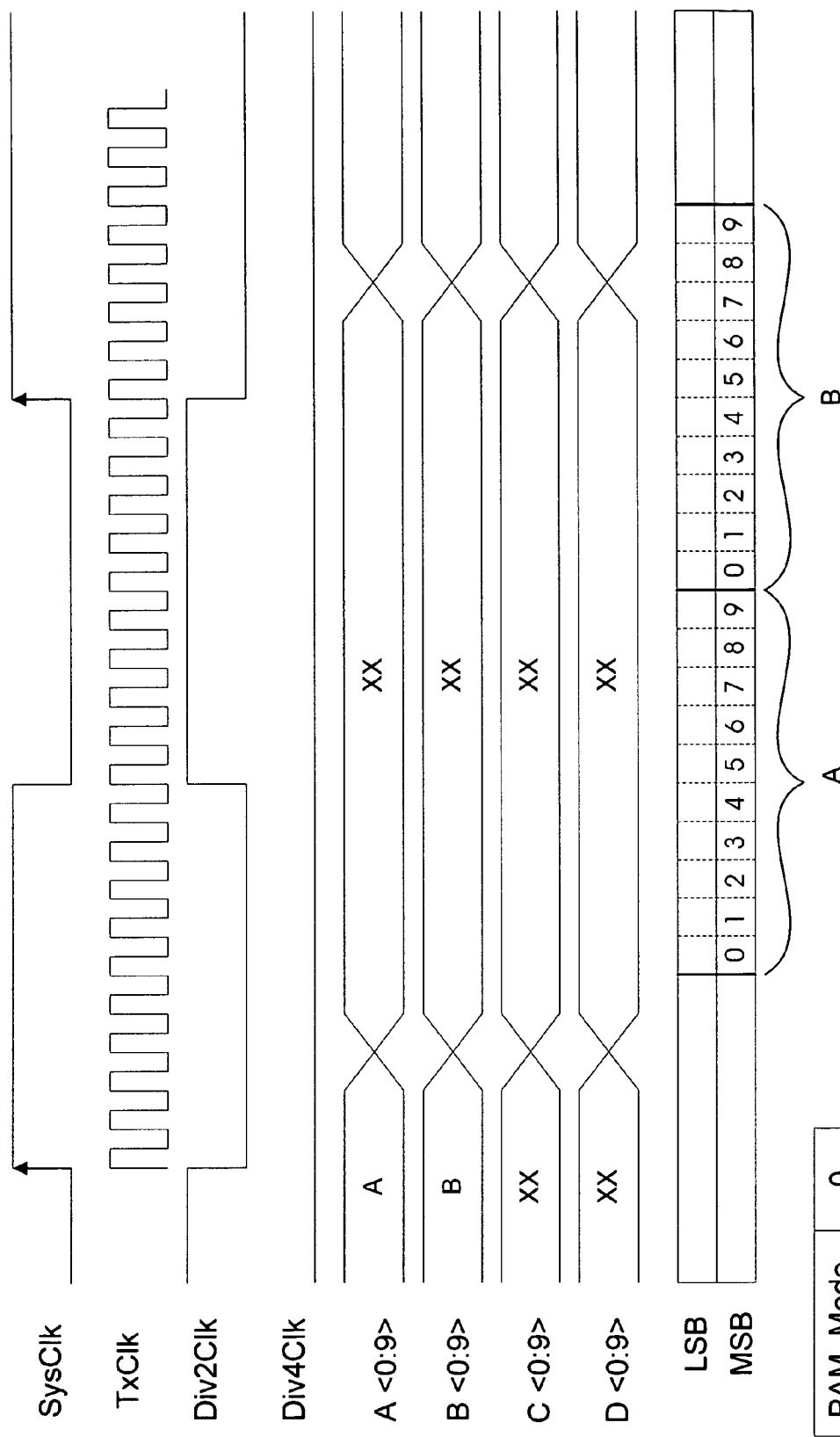
FIG. 16 is a timing diagram showing the relationship between the timing of the parallel input data, various clock signals, and the transmit pipelines in a 2-PAM, 10 bit-word, 2 byte mode.

Timing relationships of signals in various modes. To understand the operation of the 2-PAM mode more clearly, reference is now made to FIG. 16. In FIG. 16, the timing relationships of SysClk, TxClk, Div2Clk, Div4Clk, and the MSB and LSB pipelines is illustrated. In 2-PAM, 2 bytes per word, 10 bites per byte mode (as indicated by Word_Mode=1, PAM_Mode=0, and Byte_Mode=0), A and B are latched on the rising edge of SysClk. TxClk operates at a rate twenty times that of SysClk, and a bit is loaded into each of MSB pipeline and LSB pipeline once per period of TxClk. Div2Clk, in this mode, operates at the rate, but 180 degrees out of phase, of SysClk. Div4Clk, in this mode, is never asserted. The LSB pipeline, in accordance with multiplexer 562 (FIG. 5B) is loaded only with zeros. The MSB pipeline is loaded with ten bits from A, A0, A1, . . . , A9, and then the ten bits from B-B0, B1, . . . , B9. Referring to FIG. 5B, multiplexer 530 constantly selects its "0" input when Div4Clk is de-asserted. Multiplexer 526 alternately provides A<0:9> and B<0:9> in accordance with the state of Div2Clk. Thus, M<0:9> alternately assumes the values of A<0:9> and B<0:9>.

Figure 17:
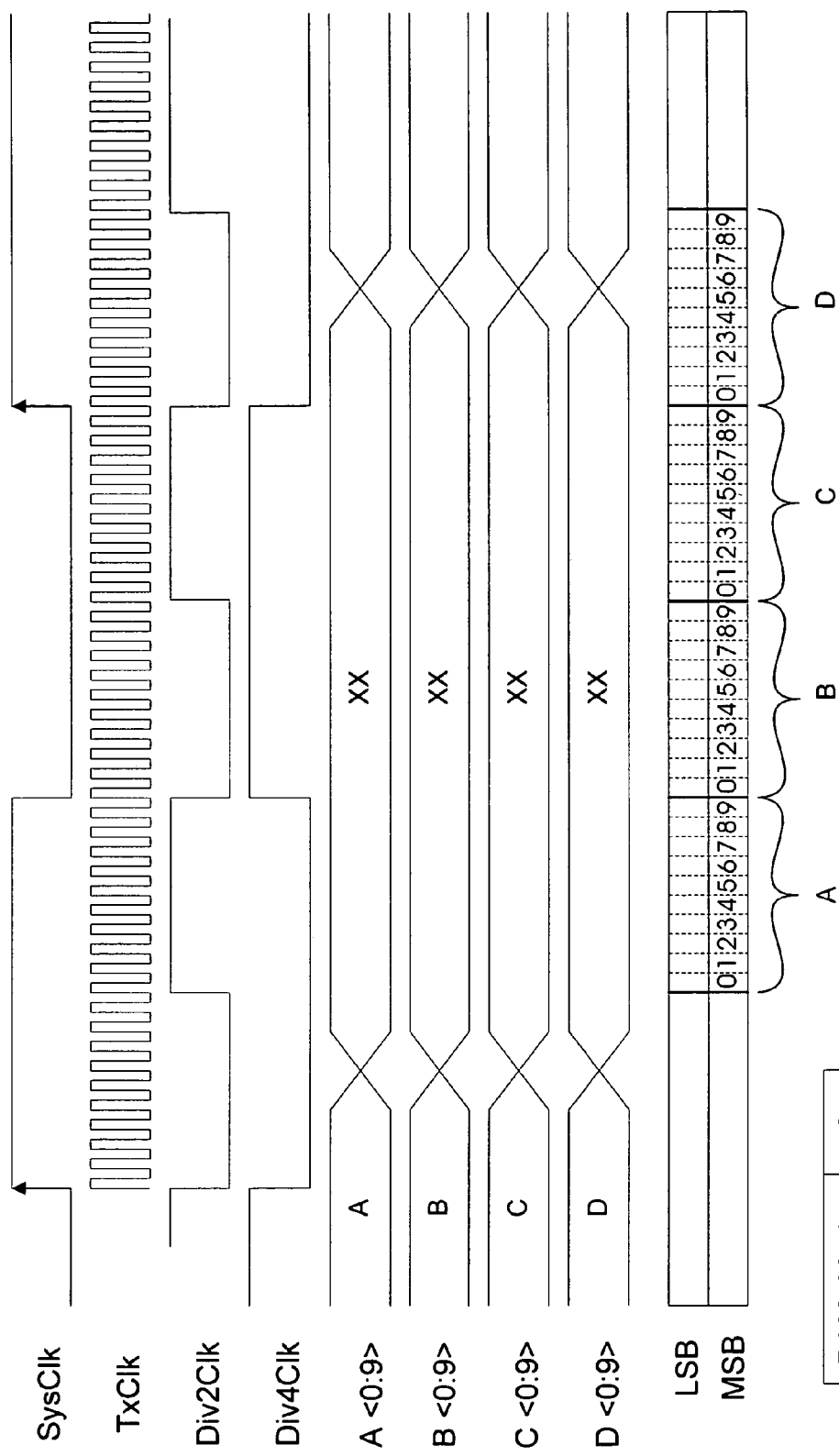
FIG. 17 is a timing diagram showing the relationship between the timing of the parallel input data, various clock signals, and the transmit pipelines in a 2-PAM, 10 bit-word, 4 byte mode.

Referring to FIG. 17, a 2-PAM, 4 byte per word, 10 bits per byte mode (as indicated by Word_Mode=1, PAM_Mode=0, and Byte_Mode=1) is illustrated. Here, Div2Clk operates at twice the rate of SysClk, and Div4Clk operates at the same rate as SysClk, but 180 degrees out of phase. TxClk operates at a rate forty times that of SysClk. Thus, referring to FIG. 5A, multiplexer 530 will alternately select the output of multiplexers 526 and 528. Multiplexer 526 and 528, in turn, alternately select their inputs at twice the rate of multiplexer 530's alternation. Thus, A<0:9>, B<0:9>, C<0:9>, and D<0:9> will each appear, in sequence, at output M<0:9>. Referring again to FIG. 17, this is seen to indeed be the desired bit pattern in the MSB pipeline for this mode.

Figure 18:
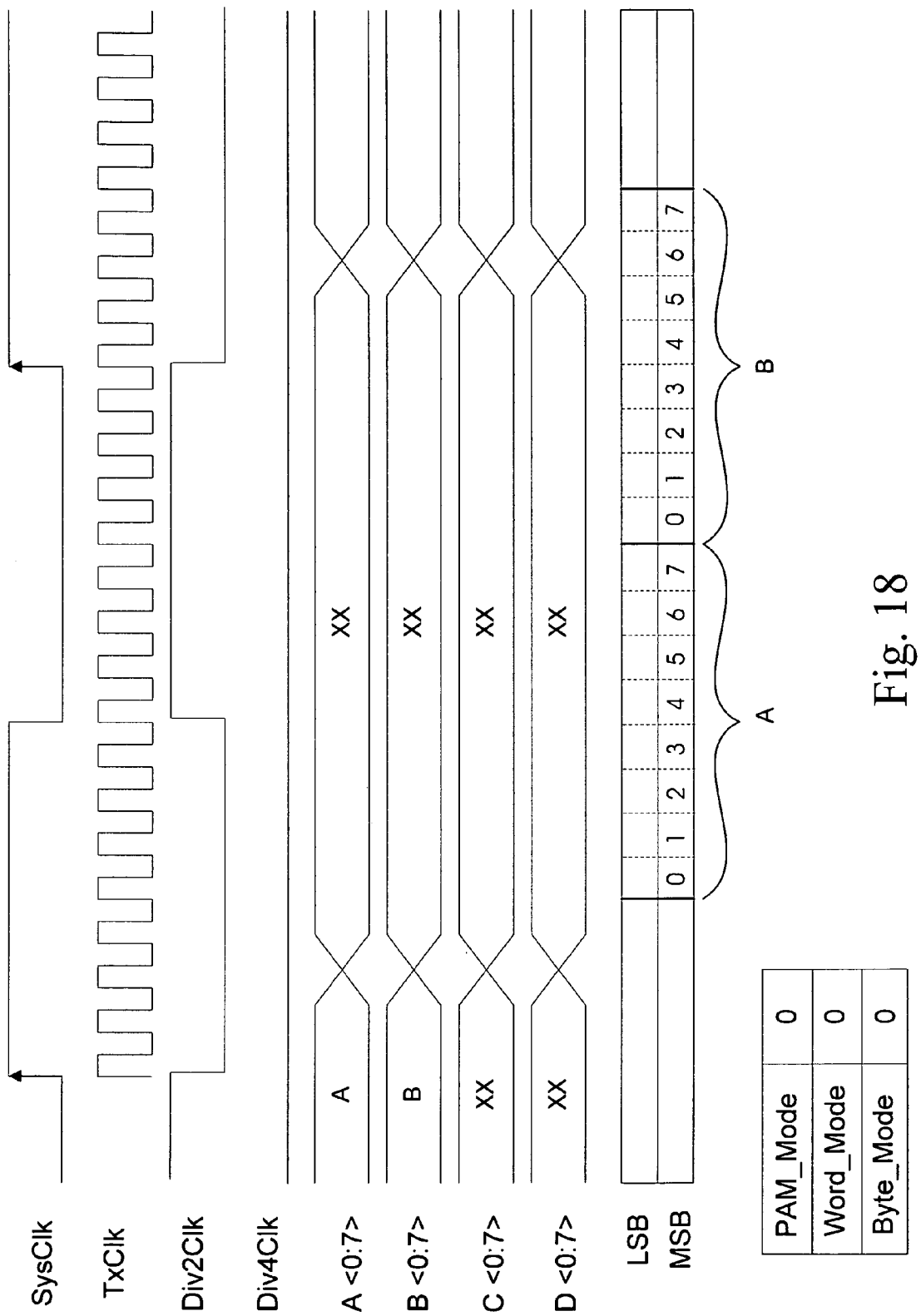
FIG. 18 is a timing diagram showing the relationship between the timing of the parallel input data, various clock signals, and the transmit pipelines in a 2-PAM, 8 bit-word, 2 byte mode.
Figure 19:
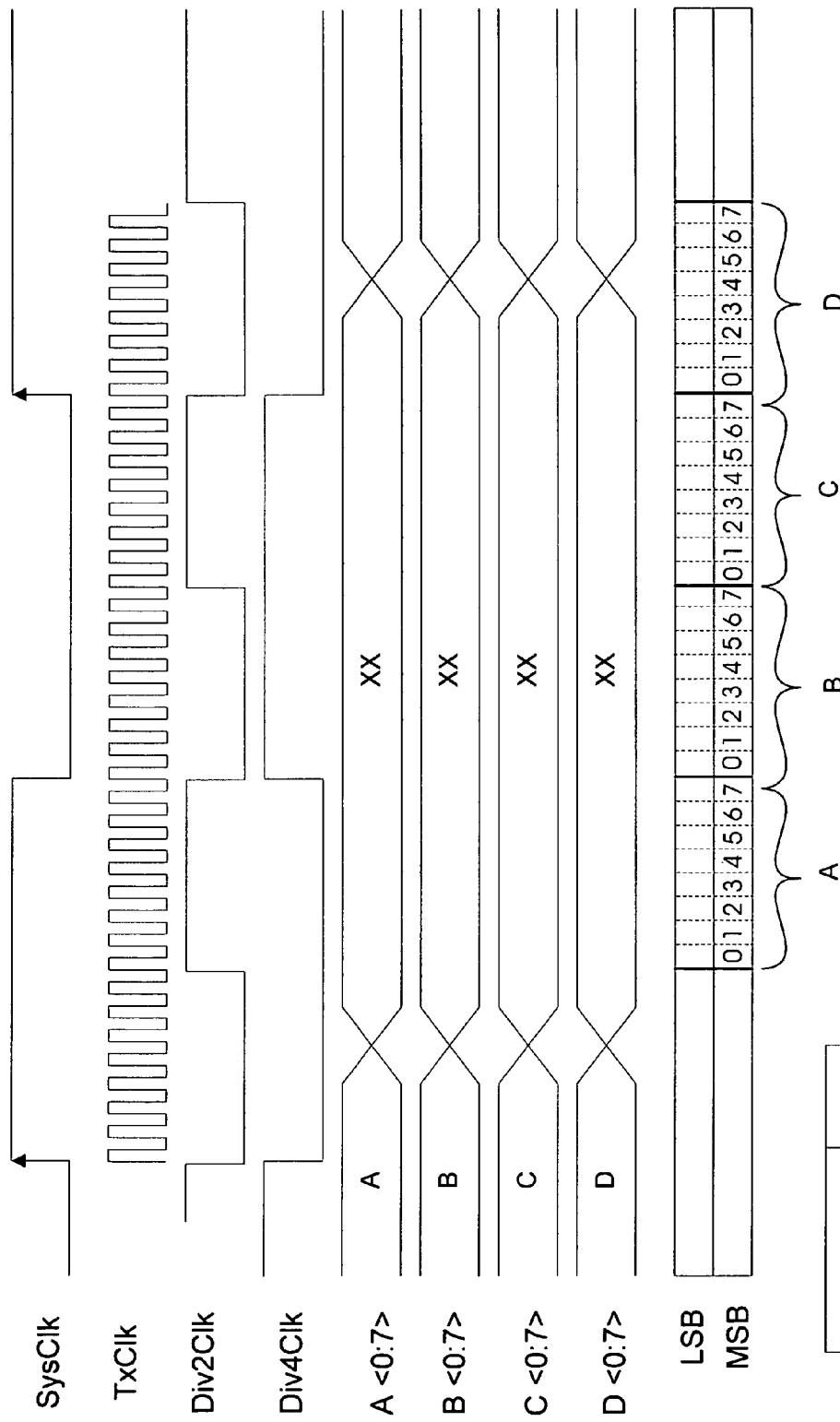
FIG. 19 is a timing diagram showing the relationship between the timing of the parallel input data, various clock signals, and the transmit pipelines in a 2-PAM, 10 bit-word, 4 byte mode.
Figure 20:
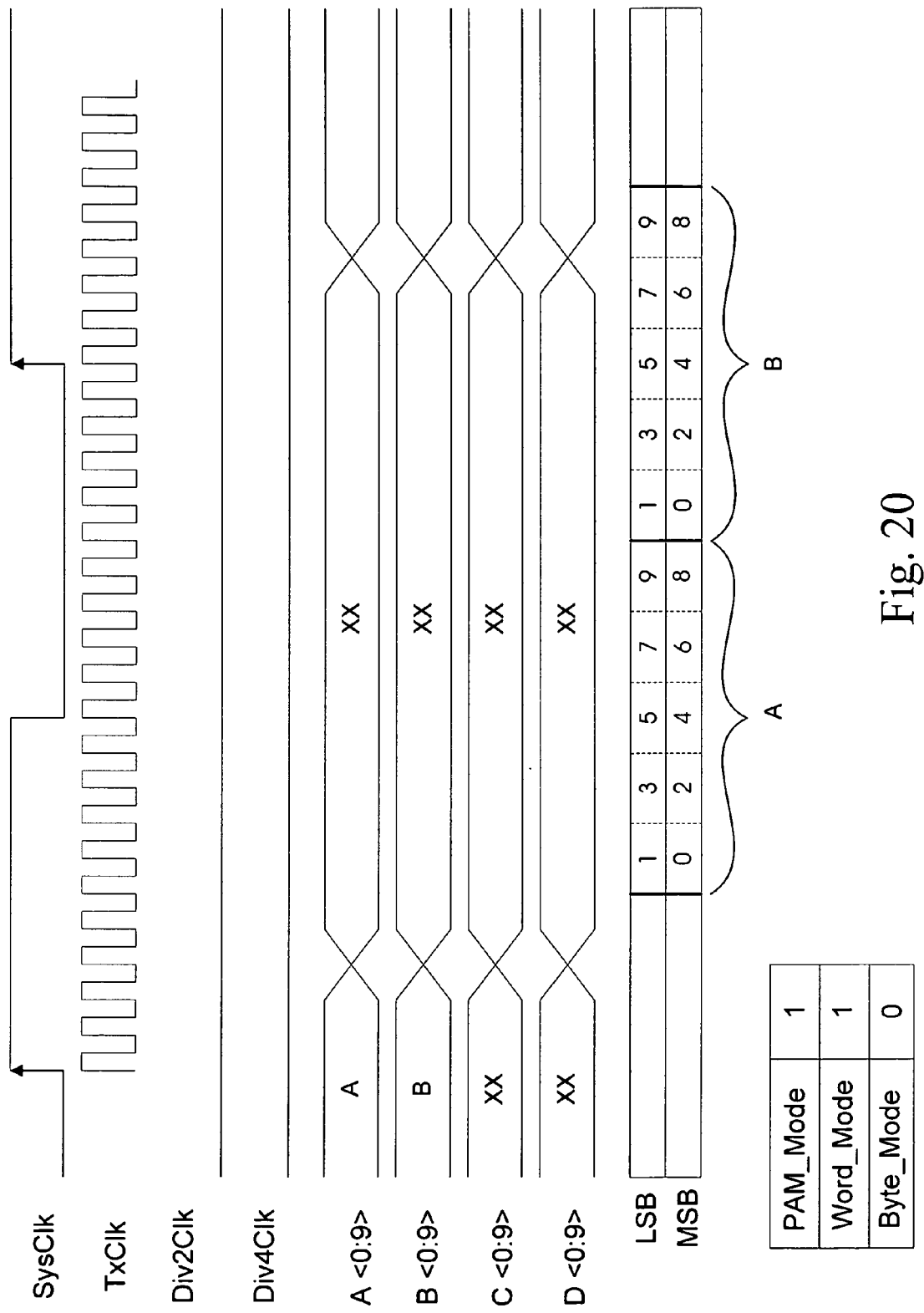
FIG. 20 is a timing diagram showing the relationship between the timing of the parallel input data, various clock signals, and the transmit pipelines in a 4-PAM, 10 bit-word, 2 byte mode.
Figure 21:
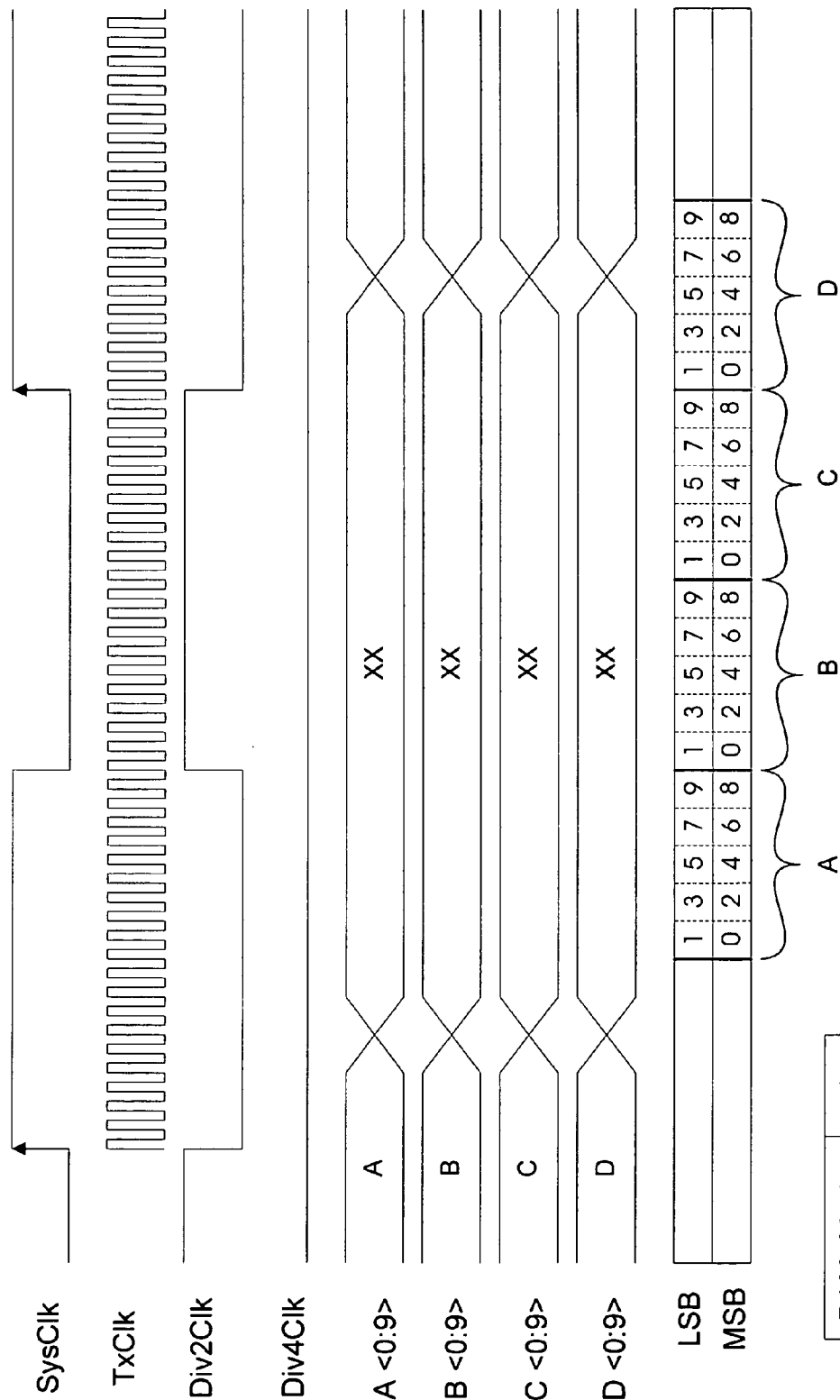
FIG. 21 is a timing diagram showing the relationship between the timing of the parallel input data, various clock signals, and the transmit pipelines in a 4-PAM, 10 bit-word, 4 byte mode.
Figure 22:
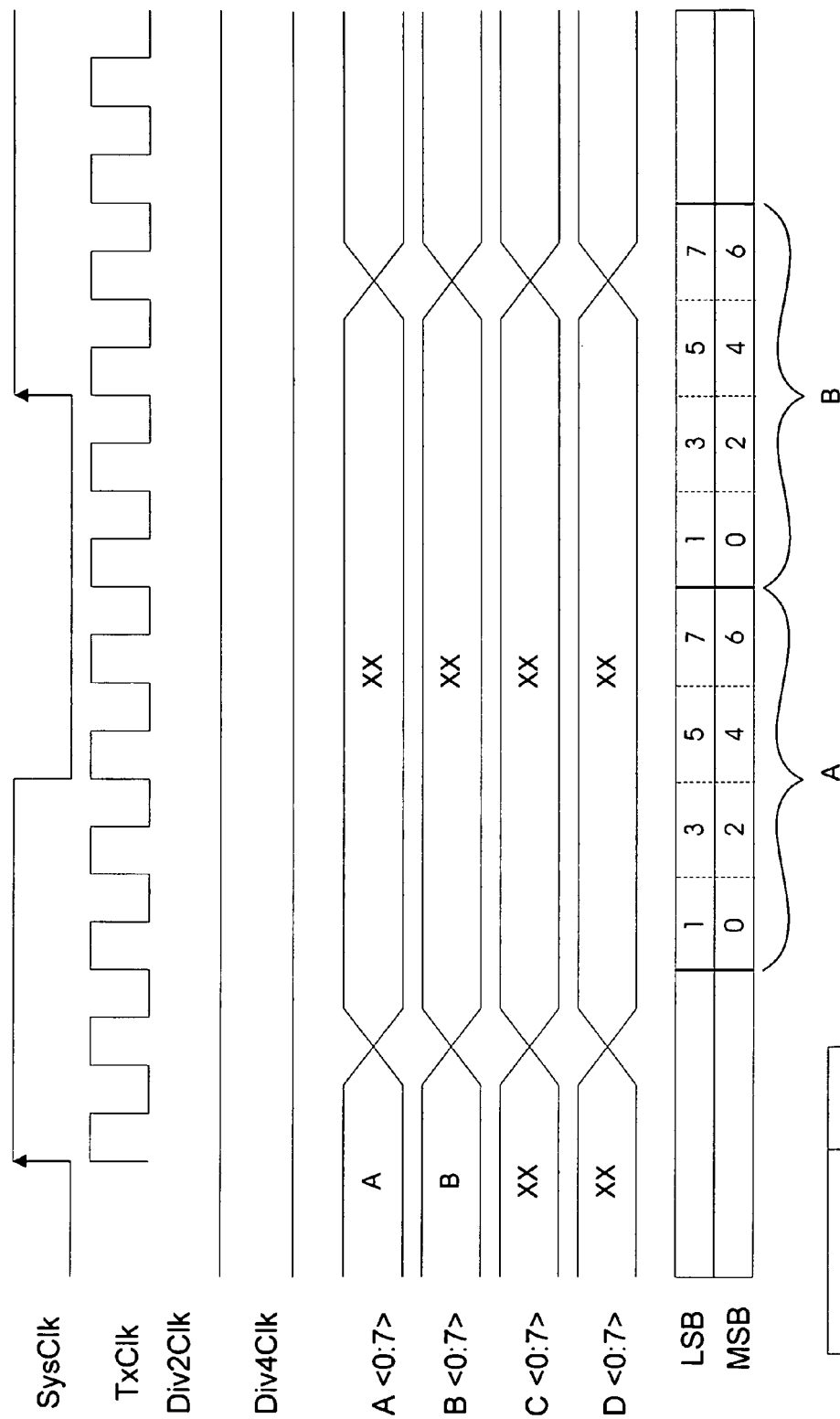
FIG. 22 is a timing diagram showing the relationship between the timing of the parallel input data, various clock signals, and the transmit pipelines in a 4-PAM, 8 bit-word, 2 byte mode.
Figure 23:
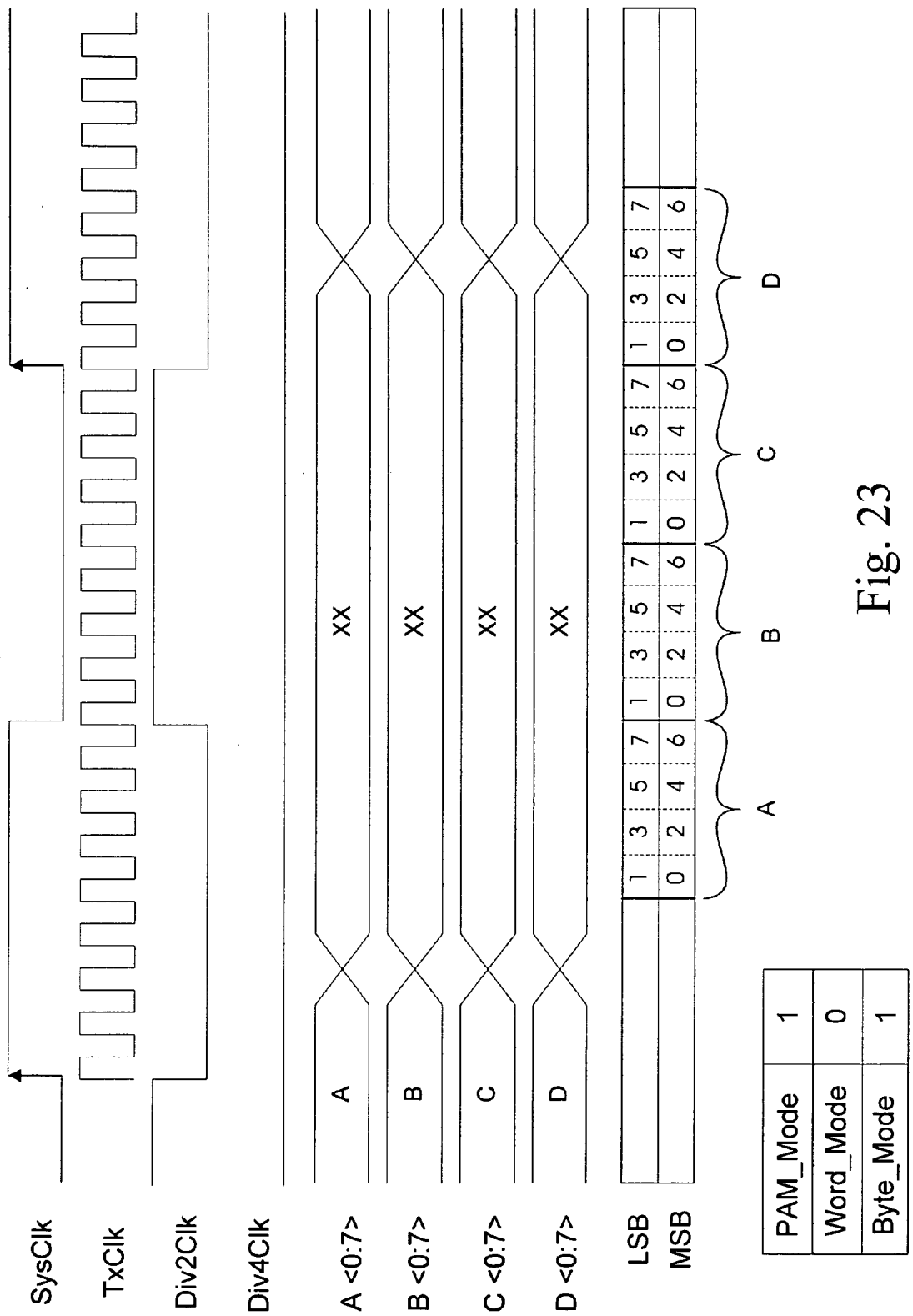
FIG. 23 is a timing diagram showing the relationship between the timing of the parallel input data, various clock signals, and the transmit pipelines in a 4-PAM, 10 bit-word, 4 byte mode.

Referring to FIGS. 18 and 19, it is clearly seen that the operation of 2-PAM modes where a byte comprises eight bits (Word_Mode=0) is entirely analogous to the modes already discussed. A key difference is that TxClk is adjusted relative to SysClk in these modes so that only the first eight bits <0:7> get cleared from the MSB pipeline.

To understand the operation of 4-PAM modes, reference is first made to FIGS. 20, 21, 22, and 23. It is readily apparent that, in each 4-PAM mode depicted, the "even" bits (i.e. bits referenced by the numbers 0, 2, 4, and so on) are placed in the MSB pipeline and the "odd" bits (i.e. those reference by the numbers 1, 3, 5, and so on). Thus, referring to FIG. 5A, it is seen that multiplexers 520, 522, and 524 (which are the only relevant multiplexers by virtue of multiplexer 532 persistently selecting its "1" input) involve only odd bits, which ultimately influence the contents of L<0:9>. In contrast, referring to FIG. 5B, multiplexers 540, 542, and 544 only receive even bits, the even bits ultimately influencing the contents of M<0:9>, as expected.

Referring again to FIGS. 22, and 23, it can be seen that, in modes where the number of bits per byte is eight, it is desired that, for example, an MSB of B0, be transmitted immediately after the MSB of A6. The MSB pipeline is of length ten in some embodiments, and outputs one bit per symbol clock (TxClk) cycle. Thus, although in 2-PAM mode the distinction between eight-bit bytes and ten-bite bytes was of little consequence (because the last two bits loaded into the pipeline were never transmitted), in 4-PAM mode the distinction must impact the loading of the MSB pipeline. Were one to naively load the pipelines in the same manner as in 2-PAM, the MSB pipeline, for example, would contain A0, A2, A4, and A6 in M<0:3> and B0, B2, B4, and B6 in M<5:9>. In modes where a byte comprises eight bits, however, it is required that the first MSB of B (B0) be adjacent to the last MSB of A (A6). Thus M4 should hold the contents of B0. Referring back to FIG. 5A, multiplexer 520, when Word_Mode=0, assigns A1, A3, A5, and A7 to M<0:3> and B1, B3, B5, and B7 to M<4:7>, as is needed. When Word_Mode=1, the natural assignment of A1 through A9 to M<0:4> and B1 through B9 to M<5:9> occurs. Multiplexer 522 operates in a completely analogous manner with respect to bits from C and D. Referring to FIG. 5B, the operation of multiplexers 540 and 542 on the even bits is completely analogous to that of multiplexers 520 and 522, respectively, on the odd bits.

Multiplexers 544 (FIG. 5B) and 524 (FIG. 5A) alternately select bits from the first two bytes A and B and from the second two bytes C and D, based on the state of Div2Clk. As is apparent from FIGS. 19, 20, 21, and 22, in modes where four bytes are transmitted per system clock cycle (Byte_Mode =1), Div2Clk is locked in frequency to, but 180 degrees out of phase with, SysClk. In contrast, in modes where the number of bytes to be transmitted per SysClk cycle is two (Byte_Mode=0), Div2Clk is never asserted. Thus, information from C and D never propagates to the MSB or LSB pipelines, by virtue of the persistent selection of the "0" inputs of multiplexers 544 (FIG. 5B) and 524 (FIG. 5A).

Figure 7:
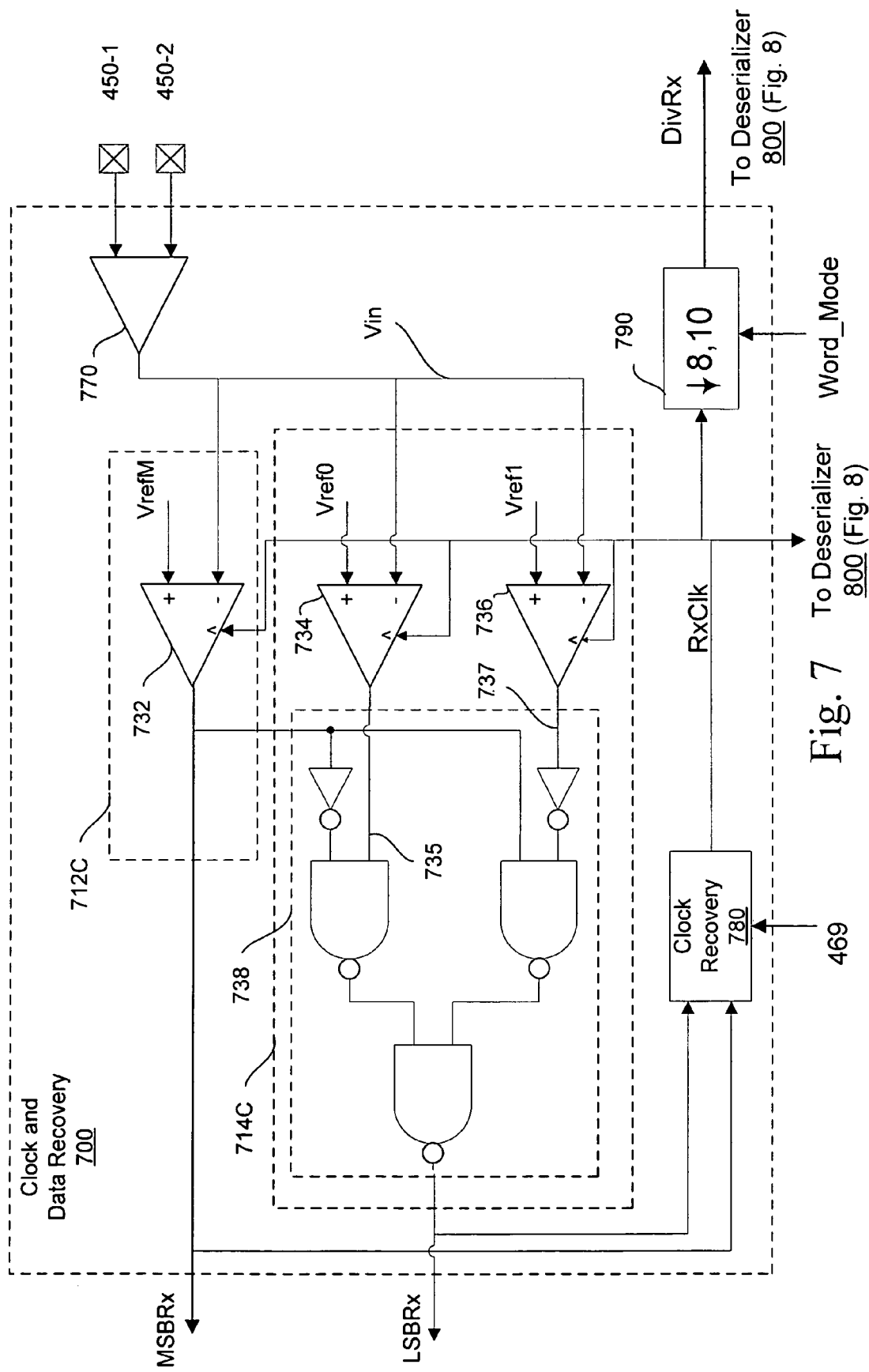
FIG. 7 illustrates an embodiment of clock and data recovery circuitry for use in a multi-mode PAM receiver.

Multi-mode PAM Receiver Circuit. Referring to FIG. 7, clock and data recovery circuitry 700 (part of multi-mode PAM receiver circuit 453, FIG. 4) is illustrated. Multi-mode PAM symbols arrive on pins 450, preferably as differential current-mode symbols. Multi-mode PAM symbols are then received and decoded into one or more decoded bits. The embodiment depicted in FIG. 4 is capable of decoding 4-PAM and 2-PAM symbols. Thus, two decoded bits, MSBRx and LSBRx, are generated by clock and data recovery circuitry 700. Various systems and methods for the reception and decoding of differential mode symbols are described in U.S. patent application Ser. No. 09/478,916, filed Jan. 6, 2000 and entitled "Low Latency Multi-Level Communication Interface," which is hereby incorporated by reference in its entirety. In some embodiments, more than two decoded bits are generated by circuitry 700. For example, some embodiments of circuitry 700 are configured to receive 8-PAM symbols and generate three decoded bits—one corresponding to the least significant bit of information in the symbol (LSBRx), one corresponding to a bit of intermediate significance in the symbol (ISBRx), and one corresponding to the most significant bit of information in the symbol (MSBRx). In still other embodiments, circuitry 700 is configured to receive N-PAM symbols and generate $\log_2(N)$ decoded bits. In these embodiments, the state of each decoded bit corresponds to one bit of information in the received symbol.

The embodiment of FIG. 7 operates essentially on single ended symbols. Double-ended to single-ended amplifier 770 first converts the symbols to single-ended signal Vin. Receiver 453 includes a plurality of subcircuits. For example, MSB receiver subcircuit 712C, contains a latching comparator 732 to compare the value of the voltage of the received input signal Vin to the reference voltage VrefM and latch the value of the result of the comparison, MSBRx. VrefM is typically one-half the maximum signal level of the signaling system. Thus, for a binary coded or gray coded 4-PAM or 2-PAM symbol, MSBRx will be asserted if and only if the received signal value is greater than one-half the maximum signal value. The state of MSBRx, then, represents the most significant bit (MSB) of the received symbol, as it will be asserted only if a 2-PAM "1" is received, a 4-PAM "10" is received, or a 4-PAM "11" is received.

A second subcircuit 714C, includes two latching comparators 734 and 736. Latching comparators 734 and 736 compare the value of the voltage of the received input signal Vin to the reference voltages Vref0 and Vref1, and latch the value of the result of the comparisons 735 and 737. Vref0, in an embodiment, is one-sixth the maximum signal level, and Vref1 is five-sixths the maximum signal level. To decode the least significant bit of the received symbol, MSBRx and comparison signals 735 and 737 are processed by combinatorial logic 738. The combinatorial logic 738 decodes Gray coded signals, so that LSBRx is asserted when the symbol represents "11" or "01", having levels approximately equal to one-half or one-third the maximum signal level, respectively. When multi-mode PAM receiver 453 (FIG. 4) is in a 2-PAM mode, subcircuit 714C need not be energized at all, as the result LSBRx is not needed to decode the received symbol. The power consumption associated with latching comparators 734 and 736 can be substantial. However, in 2-PAM mode, latching comparator 732 latches symbols twice as frequently, consuming more power itself in 2-PAM than in 4-PAM mode. Thus, the savings afforded by de-energizing subcircuit 714C can, in some cases, keep power usage within a predefined budget. In embodiments where symbols arrive on both edges of a receive clock, two receivers 453 are used: one for odd data, and one for even data.

Latching comparators 732, 734, and 736 are each clocked, in an embodiment, by RxClk. RxClk, in turn, recovered from the decoded symbol bits LSBRx and MSBRx by clock recovery circuit 780. In some embodiments, clock and data recovery circuitry 700 is part of a multi-mode PAM transceiver. Thus, phase vectors 469 are available, for example, from PLL 620 (FIG. 6B), and can be used to assist in clock recovery. RxClk runs at the symbol rate of the symbols received on pins 450. For deserialization, an additional clock, DivRx, is used in some embodiments. As shown in FIG. 7, DivRx is derived from RxClk by frequency divider 790. When Word_Mode is deasserted (=0, signifying 8 bits per byte), frequency divider 790 generates a clock DivRx having one-eighth the frequency of RxClk. Conversely, when Word_Mode is asserted (=1, signifying 10 bits per byte), frequency divider 790 generates a clock DivRx having one-tenth the frequency of RxClk. In embodiments in which two symbols are transmitted per clock period, divider 790 divides the frequency of RxClk by a factor of either four or five, depending on the state of the Word_Mode signal.

Figure 8:
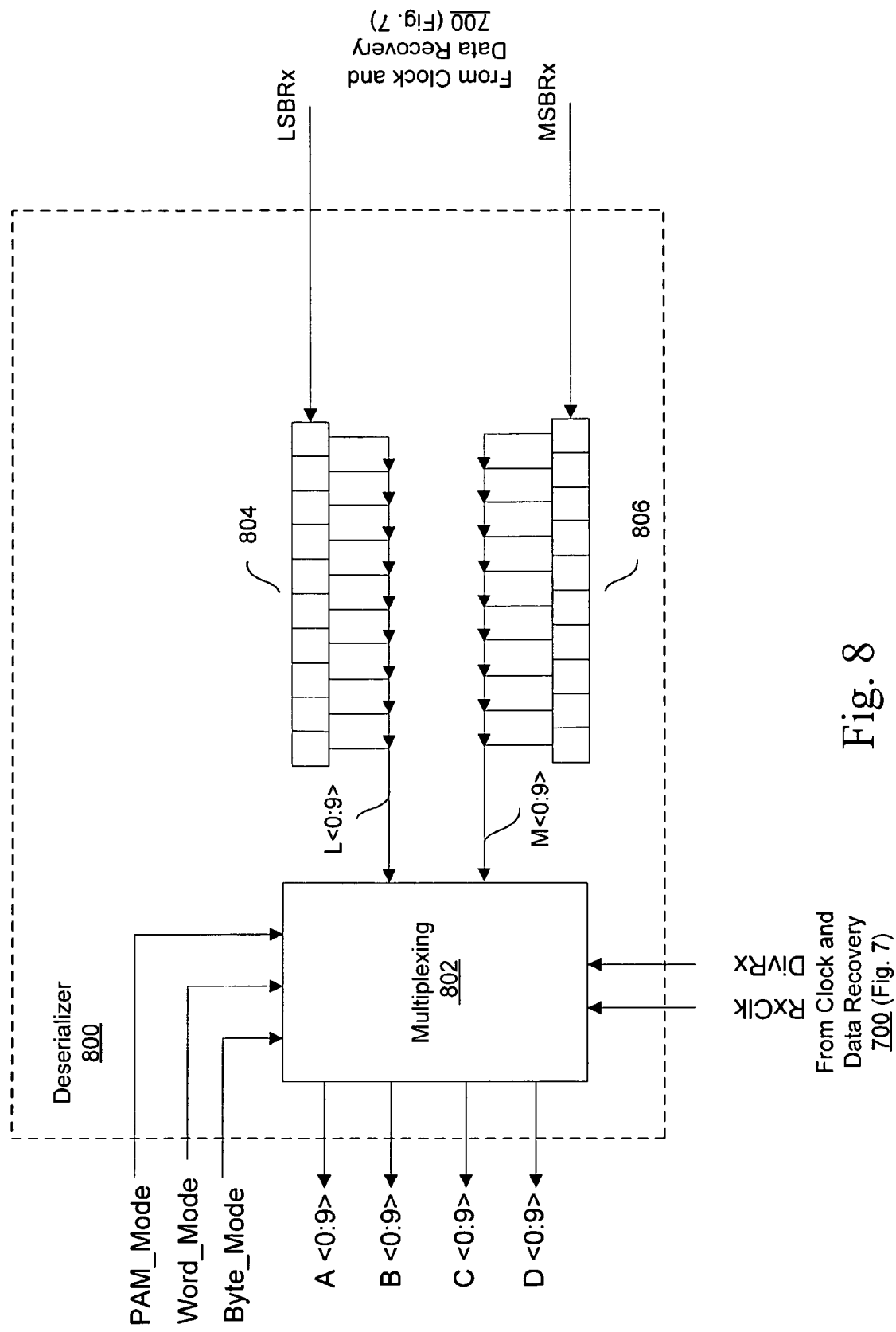
FIG. 8 is a diagram of an embodiment of a deserializer for use in a multi-mode PAM receiver.

Deserializing Multi-PAM Symbols. Referring now to FIG. 8, deserializer 800 (part of deserializer and data recovery circuit 456, FIG. 4) is illustrated. Deserializer 800 includes MSB pipeline 806, LSB pipeline 804, and multiplexer circuitry 802. Multiplexer circuitry 802, as discussed below in connection with FIGS. 11, 12, 13, 14, and 15, is configured to order data from the data streams MSBRx and LSBRx from receiver 453 (FIG. 4). The ordering of data is performed in accordance with the states of PAM_Mode, Word_Mode, and Byte_Mode. Furthermore, the formatting of the data stream is performed based on two clock signals, RxClk and DivRx, both provided by clock and data recovery circuitry 700. As a result of the formatting, signal lines A<0:9>, B<0:9>, C<0:9>, and D<0:9> contain data provided to an output interface (not shown) coupled to an output of the multiplexer circuitry. The output interface is configured to output data words from the formatted data stream at a rate determined, at least in part, by the state of PAM_Mode. In some modes the multi-mode PAM receiver 120, only a subset of the signal lines A, B, C, and D carry data. For example, in 2-byte mode (Byte_Mode deasserted), only A and B will carry valid data. In 8-bit per word mode (Word_Mode deasserted) and 4-byte mode (Byte_Mode asserted), only A<0:7>, B<0:7>, C<0:7>, and D<0:7> will contain valid data.

Figure 11:
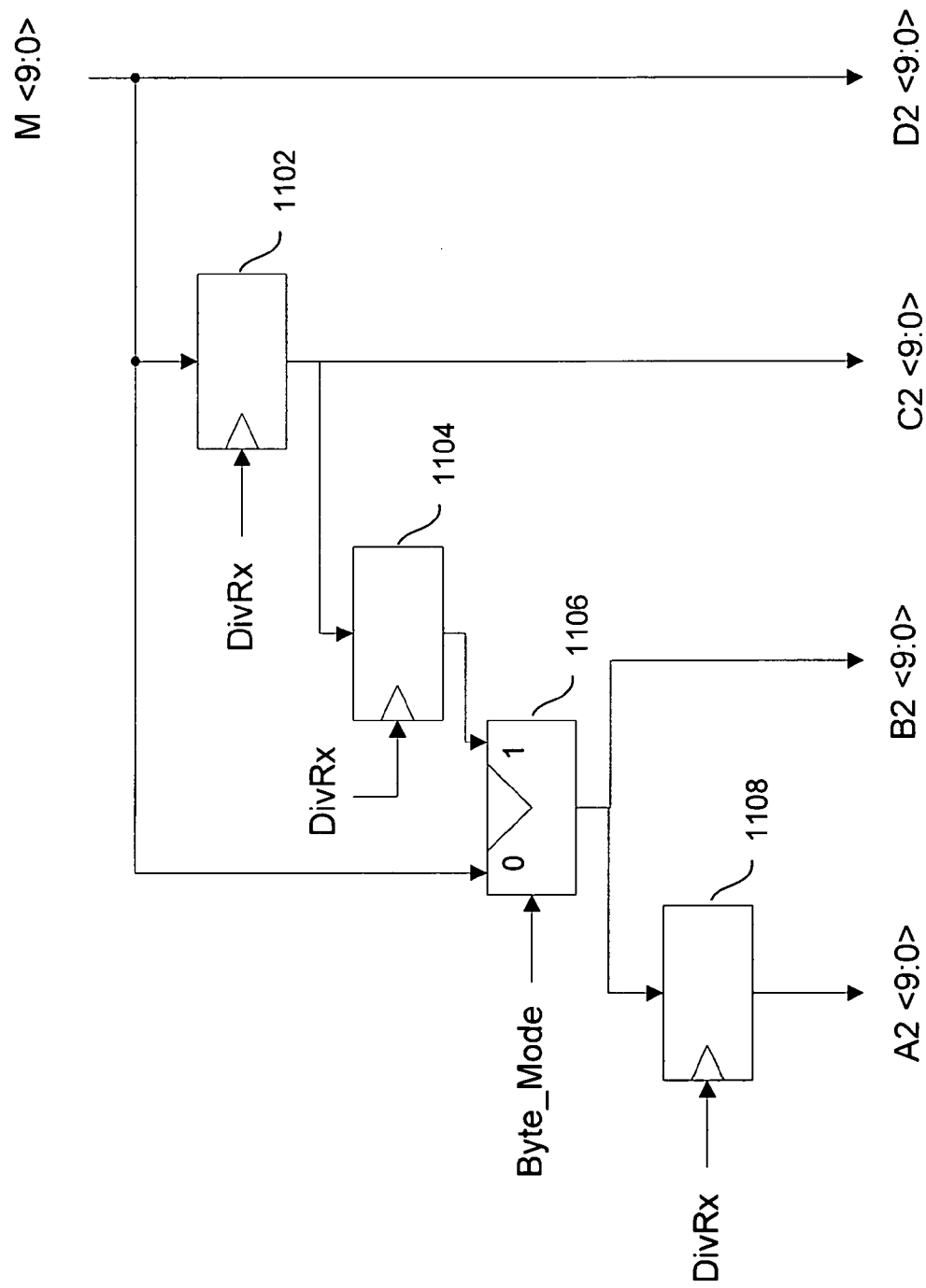
FIG. 11 illustrates a first stage of an embodiment of a deserializer for use in a multi-mode PAM receiver.

FIG. 11 illustrates one stage of the circuitry in multiplexer 802. The stream of data bits MSBRx is purged from MSB pipeline once every ten or eight receive clock cycles, resulting in MSB word M<9:0>. If Byte_Mode is de-asserted, corresponding to two-byte mode, then M<9:0> passes through the "0" input of multiplexer 1106 and is latched by latch 1108 once per two word clock cycles, on an edge of DivRx. DivRx has half the frequency of a word clock. Thus, the first set of bits M<9:0> in a sequence are latched as A2<9:0>, and the next set of bits appear on B2<9:0>. The state of C2<9:0> and D2<9:0> is of no consequence when the desired mode is a two-byte mode.

Still referring to FIG. 11, when Byte_Mode is asserted (corresponding to a four-byte mode), latches 1102, 1104, and 1108 together act as one-word delays, sending the first word received at M<9:0> to A2<9:0>, the second to B2<9:0>, the third to C2<9:0>, and the fourth to D2<9:0>. Note that the input of latch 1104 responds to the opposite edge of DivRx relative to latches 1102 and 1108. Finally, referring now to FIG. 15, another portion of multiplexer 802 passes A2<9:0> to A<9:0>, B2<9:0> to B<9:0>, C2<9:0> to C<9:0>, and D2<9:0> to D<9:0> when PAM_Mode is de-asserted, corresponding to any 2-PAM mode.

Figure 12:
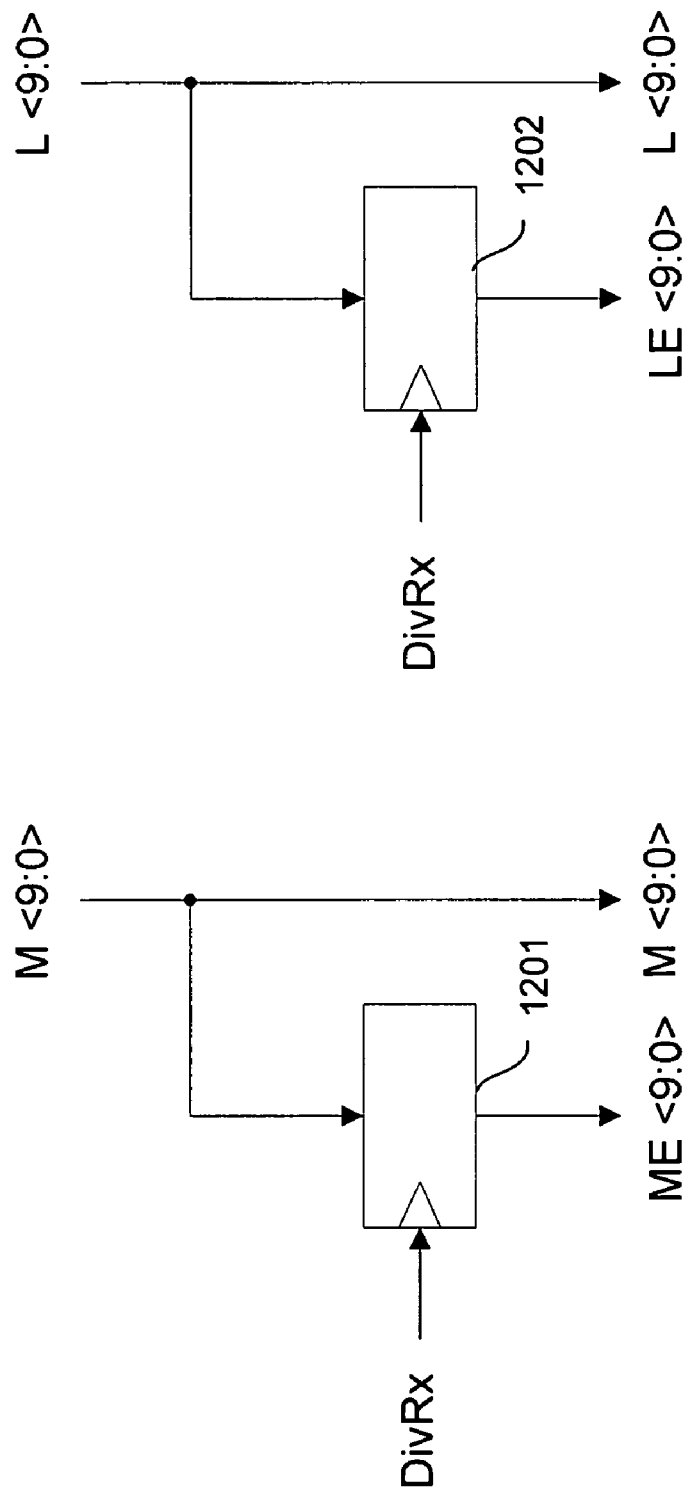
FIG. 12 illustrates a second stage of an embodiment of a deserializer for use in a multi-mode PAM receiver.
Figure 13:
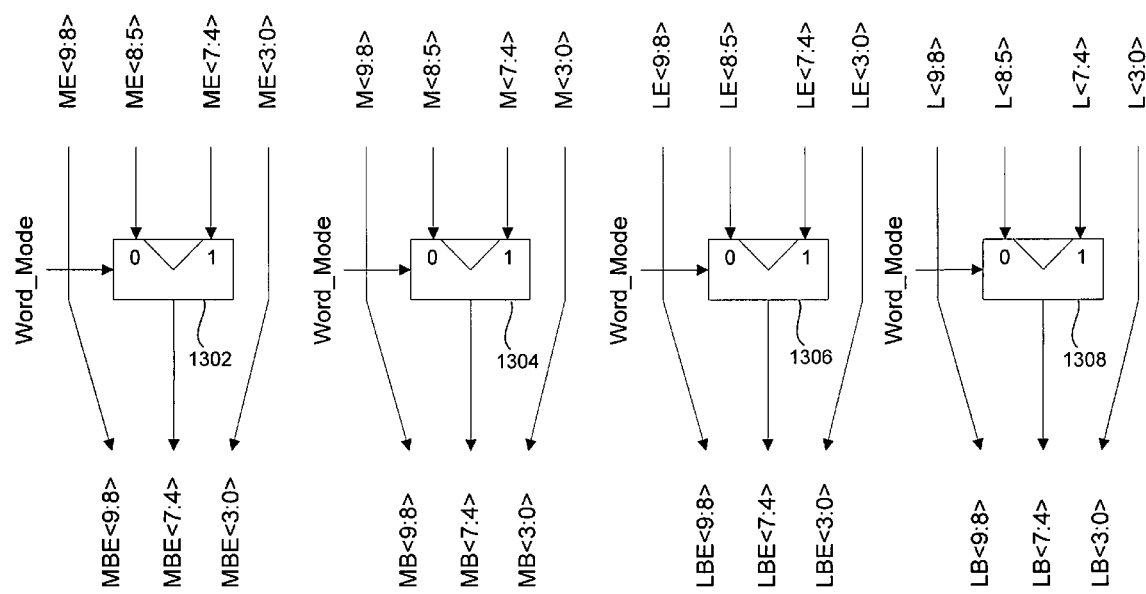
FIG. 13 illustrates a third stage of an embodiment of a deserializer for use in a multi-mode PAM receiver.
Figure 14:
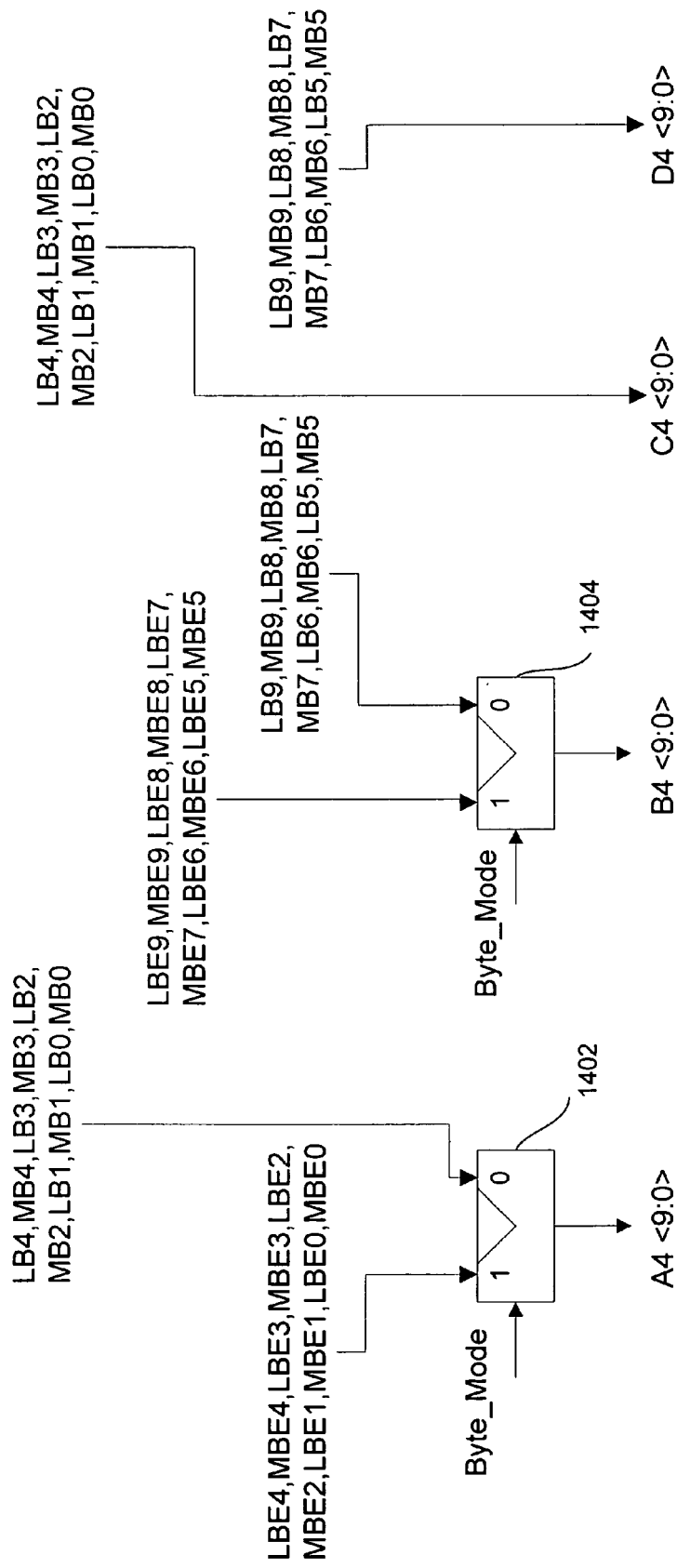
FIG. 14 illustrates a fourth stage of an embodiment of a deserializer for use in a multi-mode PAM receiver.
Figure 15:
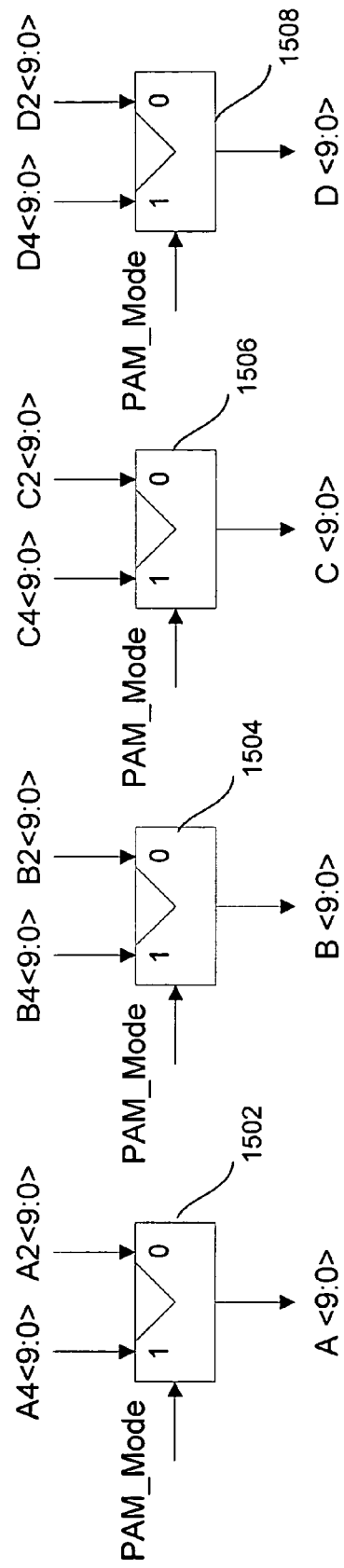
FIG. 15 illustrates a fifth stage of an embodiment of a deserializer for use in a multi-mode PAM receiver.

To illustrate the operation of multiplexer 802 when the multi-mode PAM receiver 120 is in 4-PAM mode, attention is now turned to FIGS. 12, 13, and 14, all of which illustrate various circuits in multiplexer 802. Referring to FIG. 12, DivRx causes latch 1201 to latch the first byte to appear in the output M<9:0> of MSB pipeline 806 (FIG. 8). The second byte of MSB pipeline is passed, unaltered, as M<9:0>. Similarly, an "early" byte of the output L<9:0> of LSB pipeline 804 is latched by latch 1202 on an edge of DivRx, and the "late" byte passed as L<9:0>.

Referring to FIG. 13, adjustments are made to the data contained in M, ME, L, and LE based on the state of Word_Mode. When Word_Mode is asserted (corresponding to a mode where 10 bits are contained in each byte), the "1" input of each of multiplexers 1302, 1304, 1306, and 1308 is selected. Thus, ME<9:0> is passed, unaltered to MBE<9:0>, M<9:0> to MB<9:0>, LE<9:0> to LBE<9:0>, and L<9:0> to LB<9:0>. When Word_Mode is de-asserted (corresponding to modes where a byte comprises 8 bits), the "0" input of each of multiplexers 1302, 1304, 1306, and 1308 is selected. In this case, an adjustment to the outputs MBE, MB, LBE, and LB needs to be made, as only the first four bits in each belong to a particular byte. Thus, ME<8:5> becomes bits 7 through 4 of MBE (MBE<7:4>), since the second set of four bits in ME (7 through 4) represent the first four MSBs of a byte. Similarly, multiplexers 1304, 1306, and 1308 operate so as to move bits M<8:5>, LE<8:5>, and L<8:5> to bits MB<7:4>, LBE<7:4>, and LB<7:4>, respectively. Now that an adjustment for word mode has been performed, the data can be treated as if there were only one word mode, i.e., 10 bits per byte.

Referring now to FIG. 14, an adjustment is made to data MBE, MB, LBE, and LB for the byte mode. When Byte_Mode is asserted, corresponding to four bytes per word, all early bytes from the pipelines are interpreted as being either byte A or B, and late bytes from the pipeline as being either bytes C or D. Thus, multiplexers 1402 and 1404 assign the early portions of LBE and MBE to bytes A4 and B4, while late bytes MB and LB are passed to C4 and D4. Adjustment is also made for the manner in which LSBs and MSBs must be properly interleaved to convert the 4-PAM symbol into the appropriate binary sequence. In contrast, when Byte_Mode is de-asserted, only A and B are expected to contain valid data. Thus, multiplexers 1402 and 1404 disregard all the early bytes LBE and MBE from the pipelines and pass LB and MB, with appropriate interleaving, to A4 and B4. Finally, referring to FIG. 15, when PAM_Mode is asserted, corresponding to operation in 4-PAM mode, the "1" inputs of multiplexers 1502, 1504, 1506, and 1508 are selected, and A4, B4, C4, and D4 are interpreted as A, B, C, and D, respectively. When PAM_Mode is deasserted, corresponding to operation in 2-PAM mode, the "0" inputs of multiplexers 1502, 1504, 1506, and 1508 are selected, and A2, B2, C2, and D2 (see FIG. 11) are interpreted as A, B, C, and D, respectively.

Figure 9:
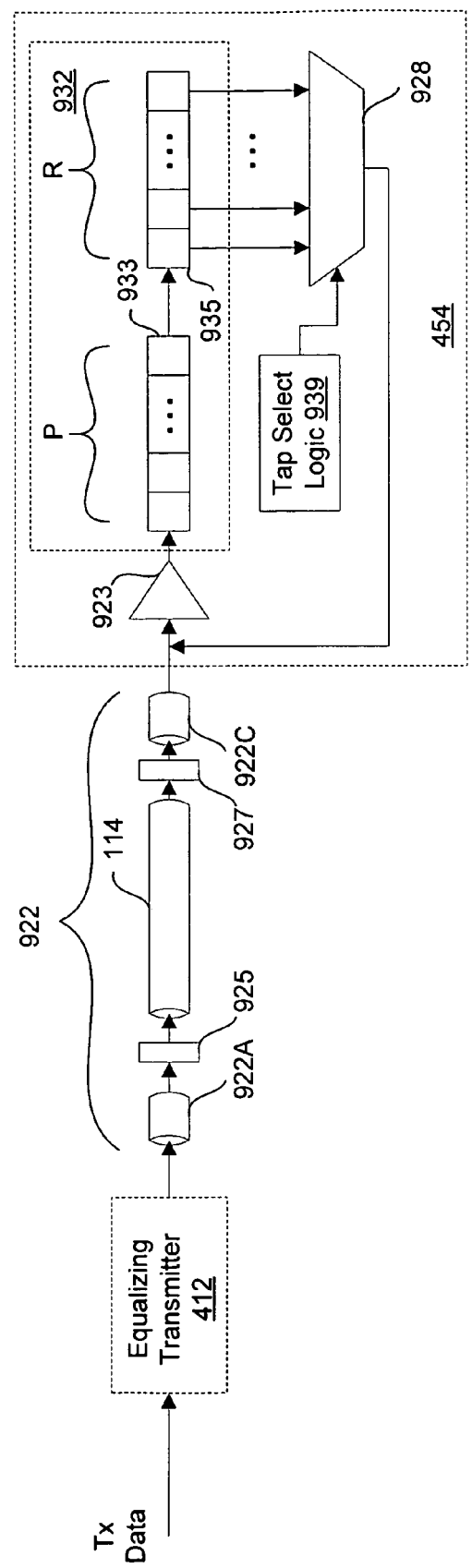
FIG. 9 illustrates the details of an embodiment of a transmit equalization and reflection canceling (RFC) equalizer used in a signaling system.

Equalization. FIG. 9 illustrates a signaling system including an equalizing transmitter 412 and equalizer 454 coupled to one another via a high-speed signal path 922. In one embodiment, the signal path 922 is formed by component signal paths 922A and 922C (e.g., transmission lines that introduce nonzero propagation delays and exhibit respective impedance characteristics), each disposed on a circuit board that are coupled to one another via circuit board interfaces 925 and 927 (e.g., connectors). In a specific implementation, a signal path 114, as part of channel 114, is formed on a backplane and signal paths 922A and 922C are formed on respective daughterboards (e.g., line cards) that are removably coupled to the backplane via interfaces 925 and 927.

The equalizing transmitter 412 and equalizer 454 are, in some embodiments, implemented in respective integrated circuit (IC) devices that are mounted on the daughterboards. Equalizing transmitter 412 can be any one of several well known types of equalizing transmitters, as would be appreciated by one of ordinary skill in the art of data transmission. For example, equalizing transmitter 412, in some embodiments, includes a pre-emphasis section, the pre-emphasis section including one or more delay elements, tap weight multipliers, and summers.

Still referring to FIG. 9, the receive-side equalizer 454 includes a sampling circuit 923, buffer 932, tap select circuit 928 and tap select logic 939. Symbols are sampled by the sampling circuit 923, then stored in the buffer 932 for eventual use by application logic (not shown). Because the buffered data is stored for at least a predetermined time, and represents historical data up to a predetermined number of symbol latencies, the buffered data forms an ideal source of post-tap data values. Additionally, the tap select circuit 928 enables a subset of data values within the buffered data to be selected to source equalizer taps in a receive-side equalizer circuit. Because the subset of data values may be selected according to the precise symbol latencies of reflections and other high-latency distortions, a relatively small number of data values may be selected to form receive-side equalization taps having latencies that match the latencies of the distortions. By this arrangement, high latency distortions may be reduced by receive-side equalization without dramatically increasing the parasitic capacitance of the receiver (i.e., as would result from a large number of receive-side equalization taps).

In one embodiment, the tap select logic 939 is a configuration circuit that outputs a tap select signal according to a configuration value. The configuration value may be automatically generated by a data transmission system (e.g., at system startup) or may be empirically determined and stored within the configuration circuit or elsewhere within system.

Still referring to FIG. 9, the distribution of low- and high-latency equalization functions between transmit equalization and receive equalization is achieved through use of a dead range within the receive-side buffer 932. That is, the range of stored data values that may be selected to source receive-side equalization taps (i.e., R) is offset from the sampling instant by a number of symbol times, P. In the embodiment of FIG. 9, buffer 932 is formed by a shift register having a dead range component 933 and a selectable-range component 935, the tap selector 928 being coupled to the selectable-range component 935 to select the subset of tap data sources therefrom. In alternative embodiments, the dead range component 933 of the buffer 932 may include fewer than P storage elements or even zero storage elements, depending on the time required to receive data and transfer data into the buffer 932. Finally, the buffer 932 may include one or more parallel registers in addition to (or instead of) the shift register formed by components 933 and 935.

Figure 10:
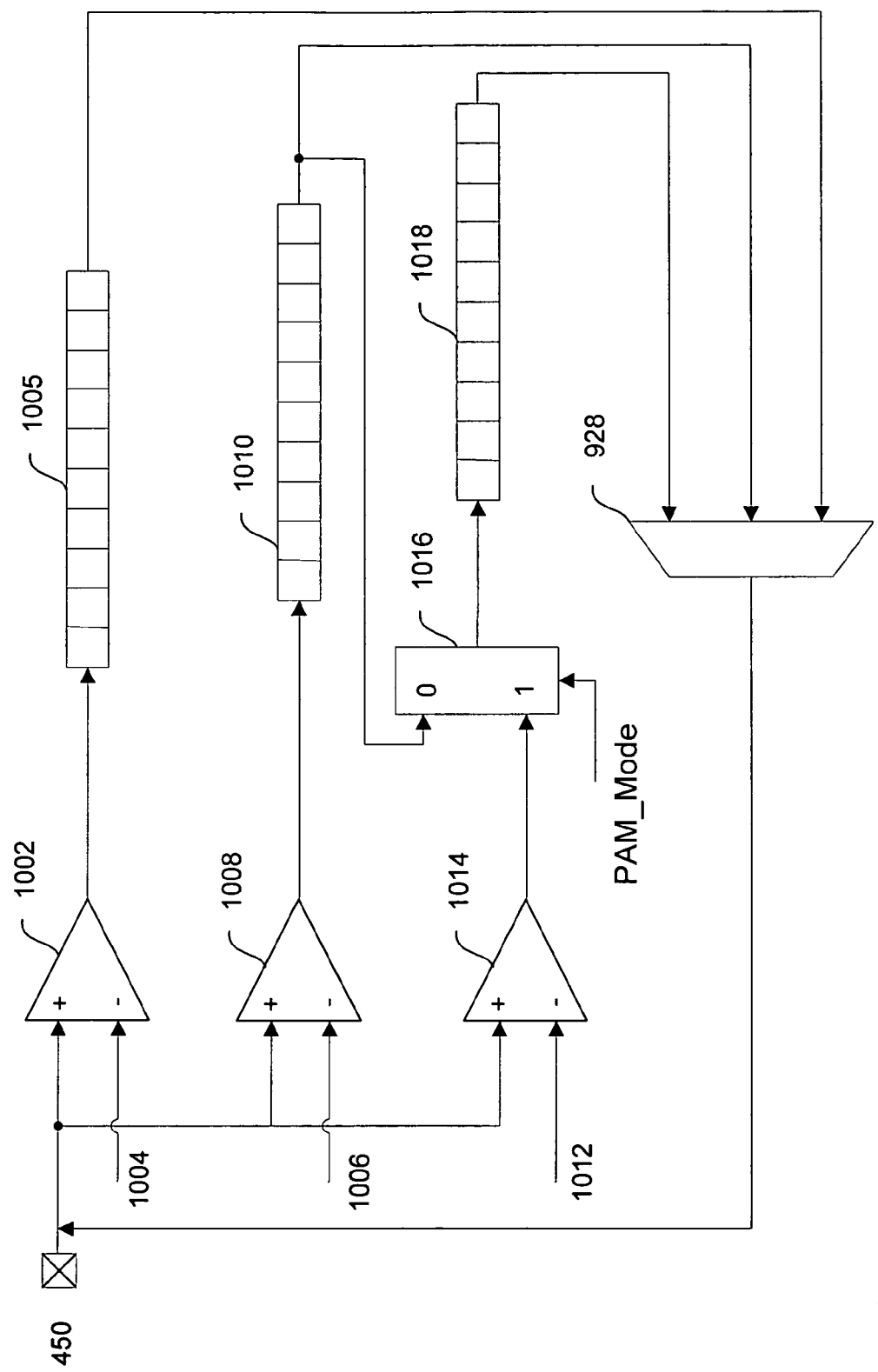
FIG. 10 illustrates the reuse of pipelines in an embodiment of an RFC equalizer for use in a multi-mode PAM receiver.

Having seen the importance of buffers in equalization, attention is now turned to an embodiment of equalizer 454, suitable for inclusion in a multi-mode PAM receiver. Referring to FIG. 10, symbols arrive for reception at pin 450. Three comparators 1002, 1008, and 1014 generate the three respective binary comparisons necessary to decode a 4-PAM symbol. Thus, reference signal 1004 is typically one-sixth the maximum received signal level, signal 1006 one-half the maximum, and signal 1012 five-sixths the maximum. When PAM_Mode is asserted, the "1" input of multiplexer 1016 is selected, and the three binary comparison signals output by comparators 1002, 1006, and 1012 enter buffers 1005, 1010, and 1018, respectively. Tap selector 928 then computes an equalization signal based on the contents of these buffers, and provides a 4-PAM equalization signal to add to the symbol on pin 450.

Still referring to FIG. 10, when PAM_Mode is de-asserted, one of the buffers 1018 is used to extend the effective buffer length of equalizer 454 to twice the number of symbols of the effective buffer length of equalizer 454 when in 4-PAM mode. Multiplexer 1016, when PAM_Mode is de-asserted, combines buffers 1010 and 1018 to create a buffer having a length equal to the sum of the two. Because 2-PAM symbols arrive at twice the symbol rate of 4-PAM symbols, it is important to have additional taps to effectively cancel reflections spanning the same latency. The equalizer 454 thus uses twice as many stored symbols in 2-PAM mode as in 4-PAM mode, covering the same amount of absolute time, allowing for cancellation of reflections caused by the same physical discontinuities in the system.

Automatic determination of PAM Mode. In many data transmission systems, it is difficult to predict a priori whether 2-PAM or 4-PAM signaling will result in the highest achievable data transmission rate. This difficulty is only exacerbated when the data transmission system is further configured to transmit and receive more than two distinct PAM mode symbols. For example, some embodiments are configured to transmit and receive 2-PAM, 4-PAM, 8-PAM, 16-PAM, and 32-PAM symbols. Thus, some embodiments provide a system and a method for determining, based on measurements of symbol quality over a transmission channel, the PAM mode that will yield the highest possible data transmission rate.

Figure 24:
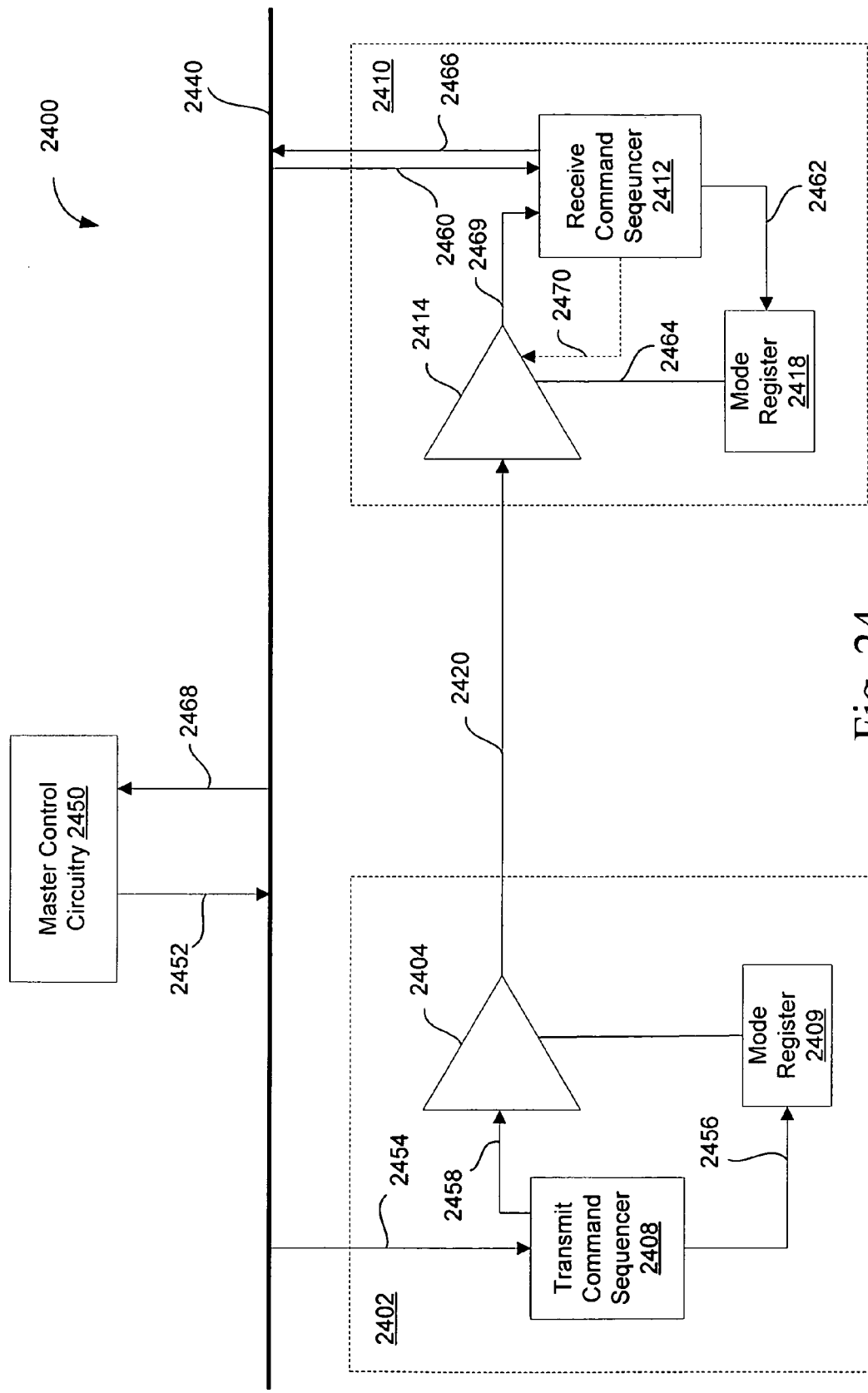
FIG. 24 illustrates a data transmission system.

Referring to FIG. 24, in an embodiment, data transmission system 2400 includes a transmitting device 2402, a receiving device 2410, and master control circuitry 2450. In some embodiments, master control circuitry 2450 is disposed on a different integrated circuit from those on which transmitting device 2402 and receiving device 2410 are disposed upon, respectively. In these embodiments, master control circuitry 2450 is coupled to devices 2402 and 2410 by a distinct command channel 2440. Command channel may be a low-speed parallel or serial data communications channel, comprised of any one of a number of physical media including, but not limited to, printed circuit board (PCB) traces and coaxial cabling. For example, referring back to FIG. 1, in these embodiments master control circuitry (2450 in FIG. 24) is included as one of the components of controller circuitry 116. Multi-mode PAM output driver (2404 in FIG. 24) corresponds to output driver 110 of FIG. 1, and multi-mode PAM receiver (2414 in FIG. 24) to receiver 120 of FIG. 1. Referring back to FIG. 24, in these embodiments command channel 2440 is physically distinct from data communications channel 2420. In other embodiments, data communications channel 2420 and command channel 2440 may comprise the same physical medium. In some of these embodiments, high-speed data communications are achieved on channel 2420 over a predetermined frequency band, whereas low-speed command channel communications are accomplished over channel 2440 outside of this band. For example, in some embodiments channel 2420 carries PAM symbols modulated at a predetermined carrier frequency, while command channel 2440 carries on-off keyed (OOK) command symbols in the baseband.

In embodiments in accordance with FIG. 24, master control circuitry 2450 coordinates an automated test of the performance of data transmission system 2400 in one or more PAM modes. To this end, master control circuitry 2450 transmits a test command onto channel 2440 via coupling 2452. The test command includes information specifying an operation code (OpCode), transmit device identifier (TxID), a receive device identifier (RxID), and a PAM mode (PAM_Mode). Transmit command sequencer 2408 receives the test command from channel 2440 via coupling 2454. Sequencer 2408, based on the OpCode in the command, recognizes that the command is a test command. Sequencer 2408 then compares a device identifier corresponding to device 2402 to the transmitting device identifier (TxID) in the test command. The device identifier corresponding to device 2402 is, in some embodiments, stored in a register internal to command sequencer 2408. In other embodiments, it is stored in a register (not shown) internal to device 2402. Upon determining that TxID matches the identifier corresponding to device 2402, command sequencer 2408 configures multi-mode PAM output driver 2404 to operate in a specified PAM mode. The specified PAM mode is determined by the PAM_Mode portion of the test command. Sequencer 2408 configures multi-mode PAM output driver 2404 to operate in the specified PAM mode by setting the state of one or more PAM mode bits in mode register 2409.

Once the PAM mode of driver 2404 has been set, transmit command sequencer 2408 configures multi-mode PAM output driver 2404 to transmit a sequence of symbols. The sequence of symbols is, in some embodiments, a predetermined sequence of symbols stored by command sequencer 2408. In other embodiments, the sequence of symbols is computed on-the-fly by command sequencer 2408. For example, the sequence of symbols may be a pseudo-random noise (PN) symbol sequence, computed based on a random seed provided as part of the test command (or alternately, based on a predefined seed). Sequencer 2408 presents the symbols to be transmitted to a parallel bit-wise interface of the multi-mode PAM output driver 2404 via coupling 2458. Multi-mode PAM output driver, based on the symbols at its input, begins transmitting the sequence of symbols on data communications channel 2420.

To obtain a measurement of a metric of symbol quality corresponding to signal transmission from device 2402 to device 2410 through channel 2420, receiving device 2410 includes receive command sequencer 2412. Receive command sequencer 2412 receives the test command issued by master control circuitry 2450 via coupling 2460. Upon comparing the receiving device identifier (RxID) contained therein, sequencer 2412 compares RxID to a device identifier corresponding to device 2410 and determines that device 2410 will be receiving symbols in the pending test. The device identifier corresponding to device 2410 is, in some embodiments, stored in a register internal to command sequencer 2412. In other embodiments, it is stored in a register (not shown) internal to device 2410, the register coupled to sequencer 2412.

Next, receive command sequencer 2412 configures multi-mode PAM receiver 2414 to operate in a specified PAM mode. The specified PAM mode is determined by the PAM_Mode portion of the test command. Sequencer 2412 configures multi-mode PAM receiver 2414 to operate in the specified PAM mode by setting the state of one or more PAM mode bits in mode register 2418.

Once the PAM mode of receiver 2410 has been set, sequencer 2412 awaits the arrival of the sequence of symbols transmitted by device 2402 on channel 2420. When symbols begin to arrive at multi-mode PAM receiver 2414 (as indicated, for example, by the output of clock and data recovery circuitry contained within the receiver 2414), command sequencer 2412 begins measuring one or more metrics of symbol quality.

In some embodiments, sequencer 2412 is aware, independently of any transmissions on channel 2420, of the sequence of symbols transmitted by device 2402. In some of these embodiments, the predetermined sequence of symbols stored by transmit command sequencer 2408 is also stored by receive command sequencer 2412. In other of these embodiments, the sequence of symbols is computed on-the-fly by receive command sequencer 2412. For example, the sequence of symbols may be a pseudo-random noise (PN) symbol sequence, computed based on a random seed provided as part of the test command (or alternately, based on a predefined seed).

Upon the arrival of a symbol at receiver 2414, receive command sequencer 2412 measures and/or computes one or more symbol quality metrics. For example, in embodiments in which receive command sequencer 2412 is aware of the symbol transmitted by device 2402 corresponding to the symbol received, the computation of the one or more symbol quality metrics preferably includes a computation of symbol error. For example, in some embodiments, receive command sequencer 2412, before reception of a symbol by device 2410, sends a first set of a series of sets of voltage and timing sampling parameters to multi-mode PAM receiver 2414 via coupling 2470. Then, receive command sequencer 2412 receives a first set of decoded symbols from multi-mode PAM receiver 2414 via coupling 2469 and computes a first symbol error rate, defined as the ratio of symbols from the subset incorrectly decoded to the total number of symbols received. Then the receive command sequencer 2412 sends a second set of the series of sets of voltage and timing sampling parameters to multi-mode PAM receiver 2414 via coupling 2470. Next, receive command sequencer 2412 receives a second set of decoded symbols from receiver 2414 and computes a second symbol error rate. One of ordinary skill in the art of data reception will readily appreciate that this process may be repeated, and voltage and timing margins for multi-mode PAM receiver 2414 computed. In some of these embodiments, the voltage and timing margins so computed are provided to master control circuitry 2450 via coupling 2466.

The test command is typically issued during a power-up handshake amongst master control circuitry 2450, transmitting device 2402, and receiving device 2410. One or more test commands may be issued, each corresponding to a predetermined PAM mode. In some of these embodiments, master control circuitry 2450 issues a test command indicating a 4-PAM test. Master control circuitry 2450 then waits for the test to be completed, and reads a first set of symbol quality metrics from receive device 2410 via coupling 2468. Next, master control circuitry 2450 issues a test command indicating a 2-PAM test. A second set of symbol quality metrics from the 2-PAM test are then, upon completion of the test sequence, received by master control circuitry from receive device 2410 via coupling 2468. Based on the values of the first and second sets of symbol quality metrics, master controller circuitry determines an optimal PAM mode for data transmission on channel 2420. Then, to enforce this PAM mode, circuitry issues a ready command to channel 2440, the ready command including a ready OpCode and the determined PAM mode. Command sequencers 2408 and 2412 then receive the ready command via couplings 2454 and 2460, respectively. Based on the PAM mode indicated in the ready command, transmit command sequencer 2408 sets one or more PAM mode bits in mode register 2409, configuring multi-mode PAM output driver 2404 to operate in the PAM mode indicated in the ready command. Similarly, receive command sequencer 2412 sets one or more PAM mode bits in mode register 2418, configuring multi-mode PAM receiver 2414 to operate in the PAM mode indicated in the ready command. Data transmission system 2400 then stands ready for data transmission across channel 2420, enabling communication from application circuitry (not depicted) in device 2402 to application circuitry (not depicted) in device 2410.

In other embodiments, three or more test commands are issued by master control circuitry 2450, three or more sets of symbol quality metrics received by circuitry 2450, and one of the three or more PAM modes are selected and enforced via a ready command. For example, 8-PAM, 4-PAM, and 2-PAM transmission over channel 2420 may be each tested, and the PAM mode with the optimal set of symbol quality metrics selected and enforced.

In some embodiments, system 2400 includes two or more transmitters and two or more receivers, and is configured to measure one or more symbol quality metrics for a multi-hop signal path. In some embodiments, system 2400 is configured to measure one or more symbol quality metrics over a round-trip signal path. In some of these embodiments, system 2400 includes one or more transceivers (not shown in FIG. 24).

Figure 25:
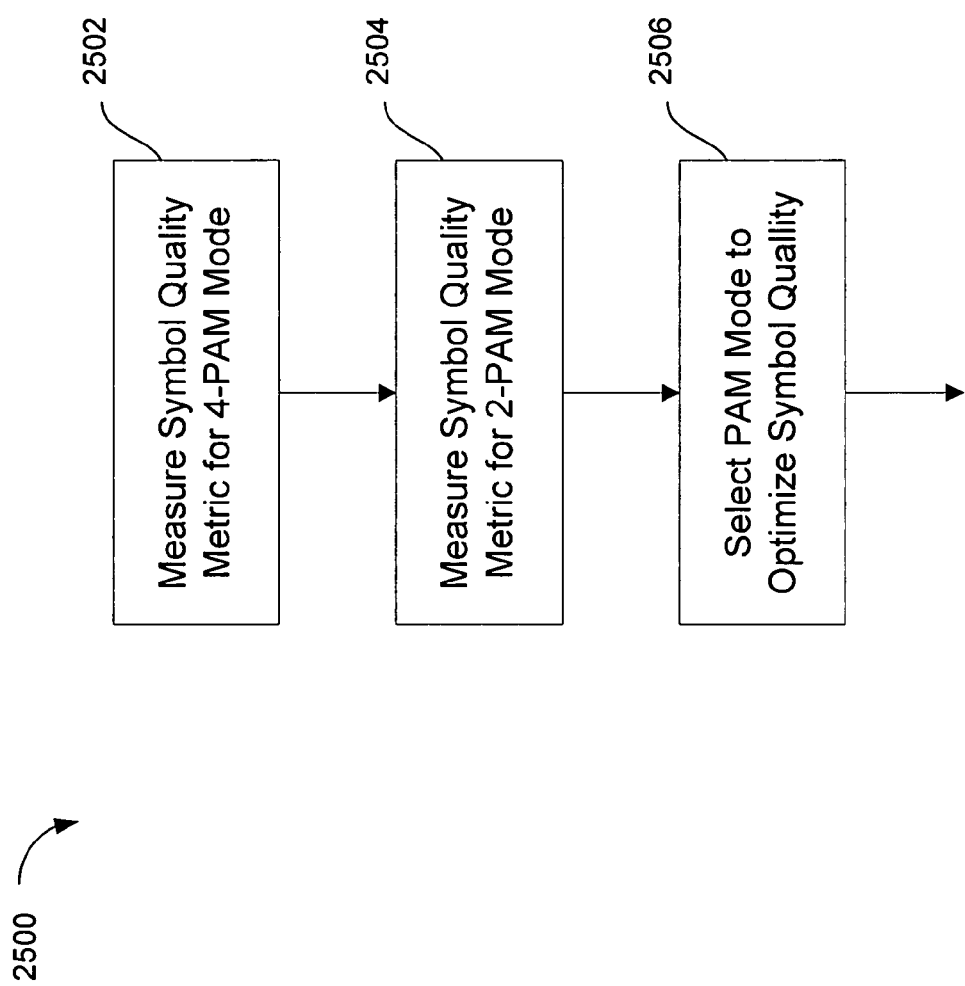
FIG. 25 illustrates a method of determining a PAM mode to optimize a symbol quality metric over a physical channel.

Referring to FIG. 25, in a method 2500 of determining the optimal PAM mode for data transmission, a symbol quality metric is first measured for a first mode (e.g., a 4-PAM mode) at a first symbol rate in procedure 2502. Referring back to FIG. 24, procedure 2502 includes master control circuitry 2450 issuing a test command, sequencer 2408 receiving the test command, and sequencer 2408 setting an appropriate bit (PAM_Mode=1) in mode register 2409, signifying 4-PAM signaling. Multi-mode PAM output driver 2404 is then configured to drive 4-PAM symbols. Procedure 2502 (FIG. 25) further includes sequencer 2408 sending test bits via coupling 2458 to multi-mode PAM output driver 2404. Driver 2404 then drives, at a first symbol rate, a first sequence of one or more 4-PAM symbols that encode the test bits onto channel 2420.

In some embodiments, procedure 2502 further includes setting the contents of mode register 2418 in accordance with 4-PAM mode (i.e., PAM_Mode=1). Thus, multi-mode PAM receiver 2414 is configured to receive the one or more 4-PAM symbols from channel 2420. Receive command sequencer 2412 then receives decoded test bits from receiver 2414 via coupling 2469. The decoded test bits are then, in some embodiments, provided by sequencer 2412 to master controller circuitry 2450. In other embodiments, sequencer 2412 performs computations to determine one or more symbol quality metrics and provides the values of the metrics so computed to master controller circuitry 2450. The symbol quality metrics so computed, in some embodiments, include a bit error rate. For example, sequencer 2412 compares one or more of the test bits originally provided to driver 2404 to one or more of the decoded bits received from receiver 2414. A bit error rate (determined as the number of bits that differ divided by the total number of bits compared) is then computed for 4-PAM signaling by receive command sequencer 2412. The bit error rate, or some quantity derived from it, is provided to master control circuitry 2450 as the symbol quality metric for 4-PAM signaling. In alternate embodiments, the symbol quality metrics computed by sequencer 2412 include a margin. This margin may be a voltage margin, timing margin, or any one of a number of other analog characteristics of the symbols received by receiver 2414. For example, receive command sequencer 2412, in some embodiments, measures and stores the equalized voltage levels (see, for example, levels 316, 318, and 319 in FIG. 3B) used by receiver 2414 to decode 4-PAM symbols. As another example, receive command sequencer 2412, in some embodiments, measures and stores a timing margin related to the reception of 4-PAM symbols by receiver 2414. This timing margin could be, for example, the average signal settling time for each possible symbol transition, determined as the time that the received and equalized voltage level takes to settle to within a fixed range of its sampled value. The measured margin, or some quantity derived from it, is provided to master control circuitry 2450 as the symbol quality metric for 4-PAM signaling.

Referring again to FIG. 25, in method 2500, procedure 2504 repeats the entire process described above for a second mode, (e.g., 2-PAM mode). Referring again to FIG. 24, sequencer 2408 sets an appropriate bit (PAM_Mode=0) in mode register 2409, signifying 2-PAM signaling. Multi-mode PAM output driver 2404 is thereby configured to drive 2-PAM symbols. Sequencer 2408 then sends test bits to multi-mode PAM output driver 2404. Driver 2404 then drives, at a second symbol rate, a second set of one or more 2-PAM symbols that encode the test bits onto channel 2420. The second symbol rate is preferably twice the first symbol rate used in procedure 2502.

Register 2418 is set by receive command sequencer 2412 to store the appropriate bit for 2-PAM signaling (i.e., PAM_Mode=0). Multi-mode PAM receiver 2414 is then configured to receive the one or more 2-PAM symbols from channel 2420. Sequencer 2412 then receives decoded test bits from receiver 2414. The decoded test bits, in some embodiments, are then provided by receive command sequencer 2412 to master control circuitry 2450. The master control circuitry 2450 then determines and stores a set of symbol quality metrics for 2-PAM signaling. In other embodiments, the set of symbol quality metrics is computed by receive command sequencer 2412 and provided to master control circuitry 2450.

Referring again to FIG. 25, master controller circuitry 2450 (FIG. 24), in step 2506, compares the stored symbol quality metrics for 4-PAM and 2-PAM signaling and selects the PAM mode that yields the minimum bit-error rate. Alternately, circuitry 2450 compares the stored symbol quality metrics for 4-PAM and 2-PAM signaling and selects the PAM mode that yields the maximum voltage or timing margins.

Although, as depicted in FIG. 24, the stored symbol quality metrics are determined based on a one-way transmission of symbols interchanged between devices 2410, in other embodiments symbol quality metrics are determined based on two-way symbol transmissions.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents.

What is claimed is:

1. A multi-mode PAM output driver for driving a sequence of symbols, the output driver comprising:
   an input interface configured to receive data to be output as the sequence of symbols;
   an interface configured to receive a PAM mode signal specifying a PAM mode;
   multiplexer circuitry configured to output the received data in an order determined by the PAM mode signal;
   a clock circuit configured to generate an output clock having a clock rate determined by the PAM mode signal;
   a driver circuit coupled to the clock circuit and to an output of the multiplexer circuit, the driver circuit configured to drive the sequence of symbols, the symbols driven in the order output by multiplexer circuit.

2. The multi-mode PAM output driver of claim 1,
   wherein the sequence of symbols are N-PAM symbols when the PAM mode is a first PAM mode;
   wherein the sequence of symbols are M-PAM symbols when the PAM mode is a second PAM mode; and
   wherein N is not equal to M.

3. The multi-mode PAM output driver of claim 2, wherein N and M are each selected from the group consisting of 2, 4, 8, 16, and 32.

4. The multi-mode PAM output driver of claim 2, wherein N and M are each selected from the group consisting of 2 and 4.

5. The multi-mode PAM output driver of claim 1, wherein the multiplexer circuitry and the clock circuit are configured such that a total output data rate of the multi-mode PAM output driver is the same for a first PAM mode and a second PAM mode.

6. The multi-mode PAM output driver of claim 2, wherein the multiplexer circuitry and clock circuit are configured such that a total output data rate of the multi-mode PAM output driver is the same for the first PAM mode and the second PAM mode.

7. The multi-mode PAM output driver of claim 2,
   wherein the clock rate in the first PAM mode is twice the clock rate in the second PAM mode, and
   wherein each symbol in the sequence of symbols output in the second PAM mode carries twice as much information as each symbol in the sequence of symbols output in the first PAM mode.

8. The multi-mode PAM output driver of claim 1, further comprising control circuitry configured to determine the PAM mode.

9. The multi-mode PAM output driver of claim 1,
   further comprising an interface configured to receive a word length mode signal specifying a word length mode;
   wherein the multiplexer circuitry is further configured to order the received data in accordance with the word length mode; and
   wherein the clock circuit is configured to generate the output clock at a clock rate determined, at least in part, by the PAM mode signal and the word length mode.

10. The multi-mode PAM output driver of claim 1,
    further comprising an interface configured to receive a byte length mode signal specifying a byte length mode;
    wherein the multiplexer circuitry is configured to order the received data in an order determined, at least in part, by the PAM mode signal and the byte length mode signal.

11. The multi-mode PAM output driver of claim 10,
wherein the clock circuit is configured to generate the output clock at a clock rate determined, at least in part, by the PAM mode signal and the byte length mode signal.

12. The multi-mode PAM output driver of claim 1, wherein the driver circuit comprises a first pipeline and a second pipeline, the first and second pipeline configured to store the ordered data received from the multiplexer circuit.

13. The multi-mode PAM output driver of claim 12, wherein the driver circuit is configured to disable the first pipeline when the PAM mode is a first PAM mode.

14. A multi-mode PAM receiver for receiving a sequence of symbols, the receiver comprising:
an interface configured to receive a PAM mode signal specifying a PAM mode;
a receive clock signal;
a receiver circuit configured to receive the sequence of symbols at a clock rate of the receive clock signal and to generate a corresponding data stream;
multiplexer circuitry configured to order data from the data stream in accordance with the PAM mode signal so as to produce a formatted data stream; and
an output interface coupled to an output of the multiplexer circuitry, the output interface configured to output data words from the formatted data stream at a rate determined, at least in part, by the PAM mode.

15. The multi-mode PAM receiver of claim 14,
wherein the sequence of symbols are N-PAM symbols when the PAM mode is a first PAM mode;
wherein the sequence of symbols are M-PAM symbols when the PAM mode is a second PAM mode; and
wherein N is not equal to M.

16. The multi-mode PAM receiver of claim 15, wherein N and M are selected from the group consisting of 2, 4, 8, 16, and 32.

17. The multi-mode PAM receiver of claim 15, wherein N and M are selected from the group consisting of 2 and 4.

18. The multi-mode PAM receiver of claim 14, wherein the receiver circuit is configured to operate so as to receive N-PAM symbols when the PAM mode is the first PAM mode and is configured to operate so as to receive M-PAM symbols when the PAM mode is the second PAM mode.

19. The multi-mode PAM receiver of claim 14, wherein the receiver circuit is configured to disable a portion of the receiver circuit when the PAM mode is the first PAM mode.

20. The multi-mode PAM receiver of claim 15, wherein the receiver circuit includes a reflection cancellation equalizer circuit having a delay circuit configured to have a first symbol length when the PAM mode is the first PAM mode and to have a second symbol length when the PAM mode is the second PAM mode.

21. The multi-mode PAM receiver of claim 20, wherein the first symbol length is longer than the second symbol length.

22. The multi-mode PAM receiver of claim 20, wherein the first symbol length is twice the second symbol length.

23. The multi-mode PAM receiver of claim 15, wherein the receiver circuit and multiplexer circuitry are configured such that a total data rate of the multi-mode PAM receiver is the same for the first PAM mode and the second PAM mode.

24. The multi-mode PAM receiver of claim 14,
further comprising an interface configured to receive a byte length mode signal specifying a byte length mode;
wherein the multiplexer circuitry is further configured to order the data from the data stream in accordance with the byte length mode.

25. The multi-mode PAM receiver of claim 24, including a clock circuit configured to generate a byte clock signal from the receive clock signal, the byte clock signal having a clock rate determined, at least in part, by the byte length mode.

26. The multi-mode PAM receiver of claim 14,
further comprising an interface configured to receive a byte length mode signal specifying a byte length mode;
wherein the multiplexer circuitry, when the PAM mode is a first predefined PAM mode, is configured to order the data from the data stream in accordance with the byte length mode.

27. The multi-mode PAM receiver of claim 26, including a clock circuit configured to generate a byte clock signal from the receive clock signal, the byte clock signal having a clock rate determined, at least in part, by the byte length mode.

28. The multi-mode PAM receiver of claim 14, wherein the receiver circuit comprises a first receiver subcircuit and a second receiver subcircuit, each of the first and the second receiver subcircuits configured to output one or more signals.

29. The multi-mode PAM receiver of claim 28,
wherein the signals output by the first receiver subcircuit represent a sequence of most significant bits (MSB) corresponding to the sequence of symbols; and
wherein the signals output by the second receiver subcircuit represent a sequence of least significant bits (LSB) corresponding to the sequence of symbols.

30. The multi-mode PAM receiver of claim 28, wherein the receiver circuit is configured to disable the second receiver subcircuit when the PAM mode is a first predefined PAM mode.

31. A multi-mode PAM transceiver comprising:
a multi-mode PAM output driver, configured to output a first sequence of symbols and to receive a PAM mode signal specifying a PAM mode;
a multi-mode PAM receiver, configured to receive a second sequence of symbols and to receive the PAM mode signal;
wherein the first sequence of symbols includes an N-PAM symbol when the PAM mode is a first PAM mode;
wherein the first sequence of symbols includes an M-PAM symbol when the PAM mode is a second PAM mode;
wherein N is not equal to M.

32. The multi-mode PAM transceiver of claim 31, wherein the multi-mode PAM output driver and multi-mode PAM receiver are embodied on a single integrated circuit.

33. The multi-mode PAM transceiver of claim 31, wherein the multi-mode PAM output driver and multi-mode PAM receiver are embodied on a single printed circuit board.

34. The multi-mode PAM transceiver of claim 31,
wherein the first sequence of symbols is output at a first symbol rate when the PAM mode is a first PAM mode;
wherein the first sequence of symbols is output at a second symbol rate when the PAM mode is a second PAM mode; and
wherein the first symbol rate is greater than the second symbol rate.

35. The multi-mode PAM transceiver of claim 34, wherein N, M, the first symbol rate and the second symbol rate are related in such a way that a data rate of the first sequence of symbols is approximately when the multi-PAM transceiver is in the first PAM mode and when the multi-PAM transceiver is in the second PAM mode.

36. The multi-mode PAM transceiver of claim 34, wherein a ratio between the first symbol rate and the second symbol rate is approximately equal to $\log_2(M)/\log_2(N)$.

37. The multi-mode PAM transceiver of claim 31, further comprising control circuitry configured to generate the PAM mode signal.

38. The multi-mode PAM transceiver of claim 37, wherein the multi-mode PAM output driver, the multi-mode PAM receiver, and the control circuitry are embodied on a single integrated circuit.

39. The multi-mode PAM transceiver of claim 37, wherein the multi-mode PAM output driver, the multi-mode PAM receiver, and the control circuitry are embodied on a single printed circuit board.

40. The multi-mode PAM transceiver of claim 37,
wherein the control circuitry is coupled to the multi-PAM receiver;
wherein the control circuitry is configured to read, from the multi-PAM receiver, data derived from the second sequence of symbols; and
wherein the control circuitry is further configured to generate the PAM mode signal based, at least in part, on the read data.

41. The multi-mode PAM transceiver of claim 31, further comprising a clock circuit configured to generate an output clock having a clock rate determined by the PAM mode signal.

42. A method of symbol transmission, comprising:
configuring a multi-mode PAM output driver to operate in a specified PAM mode, the specified PAM mode selected from a plurality of predefined PAM modes;
using the multi-mode PAM output driver, outputting a sequence of symbols;
wherein the sequence of symbols includes an N-PAM symbol when the PAM mode is a first PAM mode;
wherein the sequence of symbols includes an M-PAM symbol when the PAM mode is a second PAM mode; and
wherein N is not equal to M.

43. The method of claim 42, wherein M and N are both integers selected from the group consisting of 2, 4, 8, and 16.

44. The method of claim 42, wherein M and N are both integers selected from the group consisting of 2 and 4.

45. A method of data transmission comprising:
operating the multi-mode PAM output driver so as to drive a first sequence of symbols onto a channel at a first symbol rate, the sequence comprising a plurality of symbols, each symbol having a respective level of a predetermined first number of PAM levels;
receiving, at a multi-mode PAM receiver, the first sequence of symbols from the channel;
determining, based on a relationship between the sequence of driven symbols and the sequence of received symbols, a first symbol quality metric;
operating the multi-mode PAM output driver so as to drive a second sequence of symbols onto a channel at a second symbol rate, the sequence comprising a plurality of symbols, each symbol having a respective level of a predetermined second number of PAM levels; and
receiving, at a multi-mode PAM receiver, the second sequence of symbols from the channel;
wherein the predetermined first and second numbers of PAM levels are different.

46. The method of claim 45, wherein the first and second symbol rates are different.

47. The method of claim 45, wherein the first and second symbol rates and first and second numbers of PAM levels are related so that a data rate of the sequence of symbols is constant.

48. The method of claim 45, wherein the second symbol rate is twice the first symbol rate.

49. The method of claim 45,
wherein the first number of PAM levels is denoted by N;
wherein the second number of PAM levels is denoted by M; and
wherein the ratio between the second symbol rate and the first symbol rate is equal to $\log_2(N)/\log_2(M)$.

50. A method of data transmission comprising:
operating a multi-mode PAM output driver so as to drive a first sequence of symbols at a first symbol rate selected from a plurality of predetermined symbol rates, the sequence comprising a plurality of symbols, each symbol having a respective level of a first number of PAM levels, the first number of PAM levels selected from a plurality of available PAM levels;
receiving at a multi-mode PAM receiver the first sequence of symbols;
determining a first symbol quality metric corresponding to the first symbol rate and to the first number of PAM levels;
operating the multi-mode PAM driver so as to drive a second sequence of symbols at a second symbol rate selected from the plurality of predetermined symbol rates, the second sequence comprising a plurality of symbols, each symbol having a respective level of a second number of PAM levels, the second number of PAM levels selected from the plurality of available PAM levels;
receiving at the multi-mode PAM receiver the second sequence of symbols;
determining second symbol quality metric corresponding to the second symbol rate and to the second level of predetermined number of PAM levels;
based on the first and the second symbol quality metrics, choosing a mode of operation of the system, the mode of operation specified, at least, by a number of PAM levels.

51. The method of claim 50, wherein the symbol quality metrics are bit error rates.

52. The method of claim 50, wherein the symbol quality metrics are voltage margins.

53. The method of claim 50, wherein the symbol quality metrics are timing margins.

54. The method of claim 50, wherein the choosing a mode of operation includes setting a state of a PAM mode signal.

55. A multi-mode PAM transceiver comprising:
means for outputting a first sequence of symbols in accordance with a PAM mode signal specifying a PAM mode;
means for receiving a second sequence of symbols and for receiving the PAM mode signal;
wherein the first sequence of symbols includes an N-PAM symbol when the PAM mode is a first PAM mode;
wherein the first sequence of symbols includes an M-PAM symbol when the PAM mode is a second PAM mode;
wherein N is not equal to M.

* * * * *